(12) United States Patent
Beijer

(10) Patent No.: US 9,471,083 B2
(45) Date of Patent: *Oct. 18, 2016

(54) PHOTO-VOLTAIC MAXIMUM POWER POINT TRACKERS

(75) Inventor: Paul Arnold Christiaan Beijer, Udenhout (NL)

(73) Assignee: Technische Universiteit Eindhoven, Eindhoven (NL)

( * ) Notice: Subject to any disclaimer, the term of this patent is extended or adjusted under 35 U.S.C. 154(b) by 534 days.

This patent is subject to a terminal disclaimer.

(21) Appl. No.: 14/116,194

(22) PCT Filed: May 8, 2012

(86) PCT No.: PCT/EP2012/058471
§ 371 (c)(1),
(2), (4) Date: Nov. 7, 2013

(87) PCT Pub. No.: WO2012/152799
PCT Pub. Date: Nov. 15, 2012

(65) Prior Publication Data
US 2014/0054969 A1    Feb. 27, 2014

Related U.S. Application Data

(60) Provisional application No. 61/518,697, filed on May 10, 2011, provisional application No. 61/628,154, filed on Oct. 25, 2011.

(51) Int. Cl.
G05F 3/06      (2006.01)
G05F 1/67      (2006.01)

(52) U.S. Cl.
CPC .............. *G05F 1/67* (2013.01); *Y10T 307/691* (2015.04); *Y10T 307/718* (2015.04)

(58) Field of Classification Search
CPC .................................. H02J 1/00; H02J 17/00
USPC ........................................................ 307/151
See application file for complete search history.

(56) References Cited

U.S. PATENT DOCUMENTS 8,754,627 B1 * 6/2014 Le ............................ G05F 1/67
                                                   323/299
2010/0002470 A1    1/2010 Kiamilev et al.

FOREIGN PATENT DOCUMENTS

DE      19614861      7/1997
EP       1643611      4/2006

* cited by examiner

*Primary Examiner* — Dharti Patel
(74) *Attorney, Agent, or Firm* — Lumen Patent Firm

(57) ABSTRACT

A maximum power point tracking (MPPT) device is provided that includes a converter, having a switched mode topology, where the switched mode topology includes a boost topology that establishes a variable transfer ratio between a variable input voltage and a variable output voltage of the converter, where the switched mode topology changes according to a power load on a power generator. The MPPT device further includes a control section, where the control section maximizes an output power of the power generator by controlling the variable transfer ratio, where the MPPT device optimizes an electrical operating point, of the power generator.

10 Claims, 58 Drawing Sheets

PHOTO-VOLTAIC MAXIMUM POWER POINT TRACKERS

CROSS-REFERENCE TO RELATED APPLICATIONS

This application is a U.S. 371 Application of PCT/EP2012/058471 filed May 8, 2012. PCT/EP2012/058471 claims the benefit of 61/518,697 May 10, 2011 and 61/628,154 May 25, 2011.

FIELD OF THE INVENTION

The present invention relates generally to power generators. More particularly, the invention relates to circuitry that steers the electrical operating point of electrical sources that exhibit a power limited output towards an optimum.

BACKGROUND OF THE INVENTION

PV arrays are generally built by arranging multiple individual PV cells into a larger panel. These cells can either be connected in series or in parallel or a combination of both. Larger arrays may also include multiple panels. One single PV cell has only one unambiguous optimum operating point for a given rate of insolation and temperature. If all cells in a PV array are identical and subjected to equal insolation and temperature conditions, the array as a whole will also have only one single optimum operating point. The total output power at this point will be the sum of the power optima of all individual cells. If however the individual cells do not have completely identical properties due to production tolerances or aging, or if not all cells experience equal insolation due to fouling, damage or partial shading, the total output power will be less than the sum of the individual optima. The maximum achievable output power of such an array will be sub-optimal. It may even have multiple local maxima in its power curve, which makes finding the true optimum difficult.

When connecting panels in parallel the voltage across their terminals will be equal by definition. If the panels are not identical or if they experience different insolation or temperature conditions, the panels will have different voltages where their maximum power points occur. This implies that it will be impossible to find a load that will cause each panel to work at its optimum operating point. Analogues, when connecting panels in series their current will be forced equal. This also prevents each panel to work at its maximum power point (MPP) if they are not completely identical or subjected to different conditions. A maximum power point tracker (MPPT) connected to a PV array having multiple panels can at best reach an average optimum point of operation, where none of the individual panels may work at their MPP.

Up to now finding the peak in the power curve only of PV panels has been considered. For small PV panels this locking to the nearest peak in the power curve from the current point of operation is adequate since these typically exhibit one single maximum power point. Large PV arrays however, may show multiple power peaks and valleys if the individual PV cells are ill matched or exposed to unequal lighting conditions or temperature. Without further measures a MPPT will lock to one of these peaks, which may or may not be the peak with the highest magnitude.

In other applications, a single MPPT is used for the entire PV array. These MPPTs need an elaborate way of control in order to handle the potential presence of multiple peaks in the power curve.

To address the needs in the art, maximum power point tracking performed locally for each panel is provided. The output power of these individual MPPTs can then be summed and fed to the load.

SUMMARY OF THE INVENTION

To address the needs in the art, a maximum power point tracking (MPPT) device is provided that includes a converter, where the converter includes a switched mode topology, where the switched mode topology includes a boost topology that establishes a variable transfer ratio between a variable input voltage and a variable output voltage of the converter, where the switched mode topology changes according to a power load on a power generator. The MPPT device further includes a control section, where the control section maximizes an output power of the power generator by controlling the variable transfer ratio, where the MPPT device optimizes an electrical operating point of the power generator.

According to one aspect of the invention, the power generator can include a photo voltaic cell, a fuel cell, a Thermo-Electric Generator (TEG) or a wind turbine.

In another aspect of the invention, the power generator includes an array of the power generators, where outputs of the MPPT are connected i) in series, ii) in parallel, or i) and ii). In one aspect, when the MPPT outputs are connected in parallel, each of the MPPTs will operate at a point of constant power, where the output voltage equals a voltage at a load, where an output current is shared in proportion to each of the power generator's contribution in power. In a further aspect, when the MPPT outputs are connected in series an output current of all the MPPTs will be equal to a load current, where the voltage will be shared proportionally among each of the power generators.

According to one aspect of the invention, the boost topology includes a differential Schmitt-trigger that drives a power switch according to a difference between a voltage from the power generator and the reference voltage, where the power generator voltage oscillates around the reference voltage.

In a further aspect of the invention, the boost topology includes a circuit that uses a differential Schmitt-trigger to implement an oscillator for driving a power switch, where the oscillator inherently controls both an average power generator voltage and a amplitude of a ripple voltage of the power generator. In one aspect, the oscillator employs an input bulk capacitor ESR and a boost inductor for fixing its frequency to form a self-oscillating system. In a further aspect a frequency of the oscillator is determined by a resistor, a capacitor and a hysteresis of the differential Schmitt-trigger, wherein the power generator voltage is equal to Vcontrol, where a ripple voltage of the power generator is independent of the hysteresis of the Schmitt-trigger.

In a further aspect of the invention, a switching duty-cycle of the converter inherently adapts to a ratio of an output voltage of the power generator and a load voltage.

According to another aspect of the invention, the converter operates in i) continuous mode, i) discontinuous mode, or i) and ii), where an average power generator voltage inherently follows a value of Vcontrol generated by the control section, where a ripple voltage from the power generator is set by a hysteresis of a Schmitt-trigger in the boost topology.

In yet another aspect of the invention, the boost topology provides a hysteretically controlled input voltage.

According to one aspect of the invention, a square wave signal perturbs the point of operation of the power generator, where the square wave oscillates at a frequency below a switching frequency of the converter, where the power generator voltage ramps up and down linearly where an average value of the power generator voltage will remain steady, where the power load exhibits positive impedance. In one aspect, a binary signal corresponds to a time-derivative of momentary power produced by the power generator, where the binary signal is provided by a delta modulator.

In a further aspect of the invention, a duty-ratio of a pulse width modulated signal to the converter is controlled.

According to one aspect of the invention, a multiplier is employed to generate a signal proportional to an output power of an array of the power generators when a peak in a load current or load voltage does not coincide with the maximum power point, or when an output current or output voltage cannot be used as a measure for output power. In one aspect a signal related to the output power of the power generator is used to feed the control loop.

According to another aspect of the invention, a Buck or Buck-boost converter provides hysteretic control of an input voltage.

In yet another aspect of the invention, the control section includes an integrator, where the integrator includes a capacitor and a differential Schmitt-trigger. In one aspect, the converter has functions that include an oscillator, PV voltage stabilization, PV ripple voltage stabilization or loop integrator. In a further aspect, the differential Schmitt-trigger is a single-ended Schmitt-trigger. I.e. Schmitt trigger with a single input.

BRIEF DESCRIPTION OF THE DRAWINGS

FIG. 1b shows the amplitude of the PV ripple voltage as dictated by the hysteresis of the Schmitt-trigger from the embodiment shown in FIG. 1a.

FIG. 2b shows the ripple amplitude at the input of the Schmitt-trigger is forced to be equal to the hysteresis of the Schmitt-trigger from the embodiment shown in FIG. 2a.

DETAILED DESCRIPTION

Figure 1A:
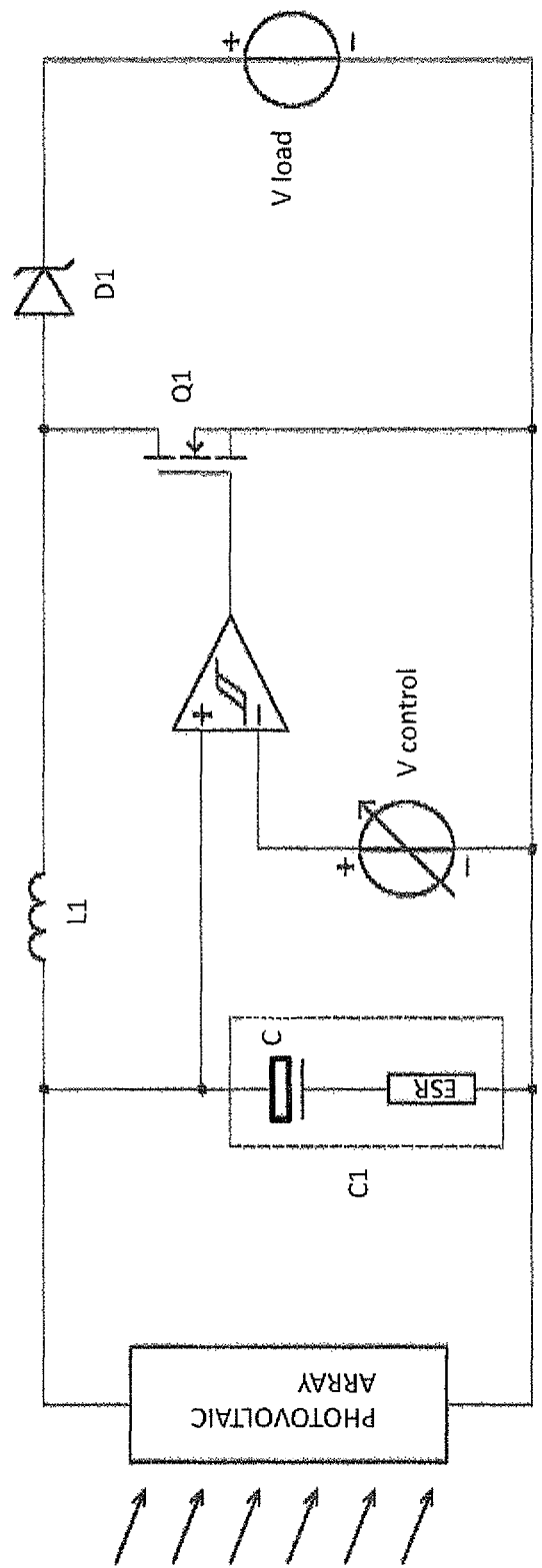
FIG. 1a shows the schematic diagram of one embodiment of the power section for a maximum power point tracker, according to one embodiment of the invention.

In order to extract the maximum possible amount of power from a photo-voltaic array (PV array) under varying insolation conditions and temperature, one embodiment of the current invention provides a circuit that steers the electrical operating point of the PV array towards an optimum. The maximum power point tracker (MPPT) imposes a load to the PV array such that its output power is maximized at the given conditions. A MPPT generally includes a power section and a control section. The power section or converter includes a form of switched mode topology that adapts the load to the PV array. The control section maximizes the output power by controlling the transfer ratio of the converter. This function can be implemented either in software or in analog or digital hardware.

In one embodiment of the invention, the power output of a non-ideal PV array is maximized, where maximum power point tracking is performed locally instead of centralized. In a further embodiment, maximum power point tracking is applied to each individual PV cell. The level to which this is useful and economically justified depends strongly on the complexity and cost of the used MPPT circuit. Also the power consumption of the circuit itself plays an important role. The current invention simplifies MPPT circuits and makes them less expensive. This enables economical use of MPPT circuits on a more local scale. Local MPPT circuits may even be physically integrated into the PV panel.

Although the current description of the invention primarily aims at photovoltaic applications, its principles apply to any electrical source that exhibits a power limited output characteristic. The PV array as shown in the embodiments of the invention may be replaced by such a generic power limited source. One practical example of a power limited source besides PV arrays would be fuel-cells, a Thermo-Electric Generator (TEG) or a wind turbine, which also show an optimum operating point where output power is maximal.

One aspect of the current invention provides a topology for the power section. In another aspect a circuit implementation is provided that eliminates the need for an expensive analog multiplier in MPPTs that utilize ripple correlation control (RCC). In a further aspect, a control topology is provided that reduces complexity.

The converter topology, according to an embodiment of the invention, doesn't use a typical PWM control scheme for the switched-mode converter. The converter is based on the boost topology. Instead of a typical PWM controller, the circuit uses a single differential Schmitt-trigger to implement the oscillator for driving the power switch. This oscillator is constructed in such a way that it inherently controls both the average PV voltage and the amplitude of the PV ripple voltage. The switching duty-cycle of the converter will inherently adapt itself to the ratio of input and output voltages without any control loop. In one embodiment of the invention the oscillator employs the input bulk capacitor equivalent series resistance (ESR) and the boost inductor for fixing its frequency and as such is a self-oscillating system that doesn't require any external timing components. An alternative embodiment is given that only controls the PV average voltage for applications where the PV ripple voltage needs to be very small.

In many MPPT control schemes of the current invention, an integrator is part of the control loop. The converter implementation of one embodiment of the current invention can be modified to include this integrating function by adding just one capacitor. As a bonus the differential Schmitt-trigger can be replaced with a single ended logic Schmitt-trigger in that case. This reduces the complexity of the circuit to an absolute minimum. Essentially one Schmitt-trigger gate and one capacitor in addition to the typical boost topology perform the following functions in the converter: 1) Oscillator 2) PV voltage stabilization 3) PV ripple voltage stabilization 4) Loop integrator.

The oscillator not only controls the PV average voltage but also the PV ripple voltage amplitude. This feature makes it extremely well suited (but not exclusively) for ripple correlation control schemes. Traditional RCC implementations employ an analog multiplier for generating a voltage proportional to the output power of the PV panel. All the relevant gradient information is in the AC portion, or ripple voltage, of this signal. The DC part, which is generally large, compared to the ripple, is irrelevant for the RCC scheme, but it consumes a big part of the multiplier's headroom nevertheless. The implementation of an embodiment of the current invention doesn't need an analog multiplier but uses two inexpensive operational transconductance amplifiers (OTA) for generating the power ripple signal. The circuit has no DC output, leaving its full headroom available for the ripple signal.

Another category of MPPTs converge to the summit of the power curve by maximizing the output current or voltage at the load. In one embodiment of the invention, an implementation of this method is provided.

FIG. 1a shows the schematic diagram of the power section for a maximum power point tracker according to one embodiment of the current invention. The circuit is based on the typical boost topology. A differential Schmitt-trigger drives the power switch based upon the difference between the PV voltage and the reference voltage $V_{control}$. The PV voltage will oscillate around this reference voltage. It is understood that the value of $V_{control}$ can be generated by the control section of the MPPT. The topology resembles the boost variant of the hysteretic controlled Buck converter, whereas here the input voltage is the controlled parameter instead of the output voltage.

In continuous mode the current in L1 has a triangular shape and its average value equals the output current of the PV array. The amplitude of the ripple voltage across the PV array should be kept small in order not to deviate too far from the maximum power point during each oscillation cycle. This means that the ripple current through the PV array will also be small and consequently the triangular ripple current through L1 must also flow through C1.

The voltage ripple across C1 is the sum of the voltage across the ESR and the AC voltage across its capacitance C. If the first is dominant then the amplitude of the ripple voltage will predominantly be determined by the amount of hysteresis of the Schmitt-trigger. The switching frequency will be determined by L1 and the ESR of capacitor C1. The PV voltage and the output voltage ($V_{load}$) will also have an influence on the frequency as they determine the current slope in L1.

$$f_{sw} = \frac{ESR \cdot V_{pv} \cdot (V_{load} - V_{pv})}{L1 \cdot V_{hys} \cdot V_{load}}$$

If the average output current of the PV array becomes smaller than the amplitude of the ripple current in L1, the converter enters discontinuous mode. When this happens the value of C1 and the PV output current will start to contribute to the frequency of the oscillator. In discontinuous mode the frequency will drop as the PV output current becomes lower. This is a beneficial side effect because at low power levels this will reduce the switching losses in the converter. The amplitude of the PV ripple voltage will not change.

In both continuous and discontinuous mode the average PV voltage will inherently follow the value of $V_{control}$ and the PV ripple voltage will be set by the hysteresis of the Schmitt-trigger. In one embodiment of the current invention this is accomplished without any form of control loop or typical duty-cycle control scheme. This makes it inherently stable and extremely fast. In a typical MPPT controller the PV voltage (or current) is set indirectly by either manipulating the duty-cycle of the converter, or by means of a local control loop that controls the PV voltage (or current). The first method changes dynamic behavior of the MPPT control loop, depending on whether the converter operates in continuous or discontinuous mode and also on the type of load connected to the converter. The second method adds more time-lag in the loop.

In the topology of one embodiment of the current invention, the MPPT control loop has direct control over the PV voltage, eliminating both drawbacks. The relation between control voltage and PV voltage will be unity under all circumstances. This significantly simplifies the design of the MPPT control loop.

Some attempts to address the need in the art use hysteretic control for the input current of the converter. This approach has the advantage of inherent stability and speed, but has the disadvantage of needing a current sense resistor or other means of current measurement. Also at low power levels if the average PV output current becomes too low to span the hysteresis window, the oscillator will stop. Due to the nature of PV arrays this is not likely to occur in the topology of the current invention. At low power levels the PV current will become very low, but the PV voltage at the MPP will not drop dramatically. This will ensure that the converter keeps working even at low power levels.

Figure 1B:
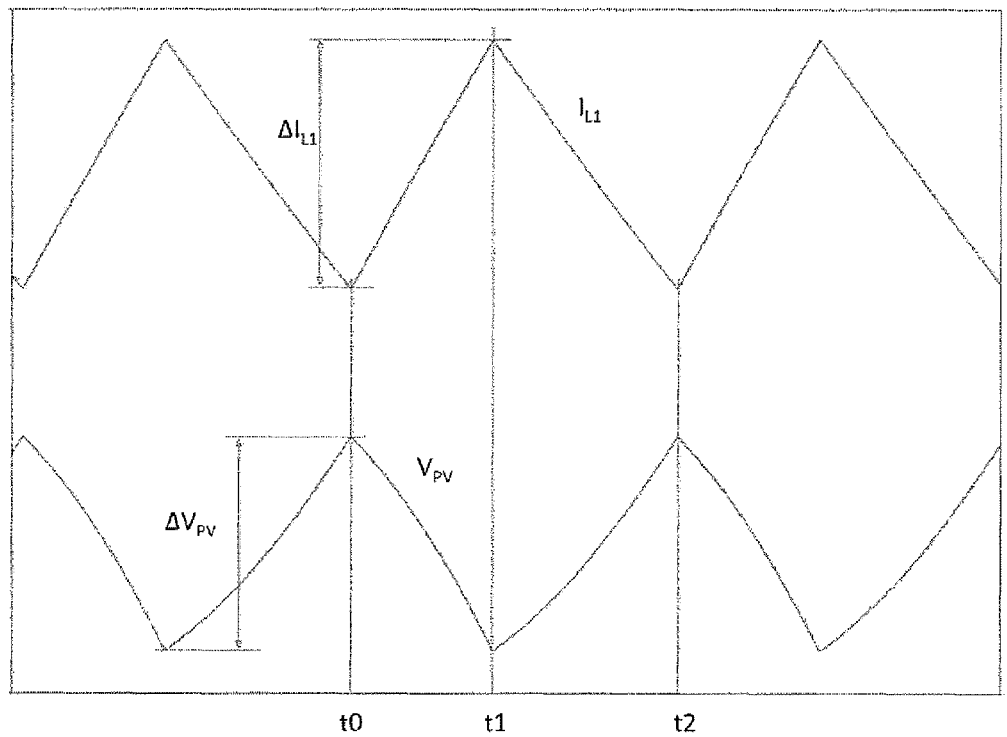

Referring now to FIG. 1b, which shows the amplitude of the ripple voltage as dictated by the hysteresis of the Schmitt-trigger from the embodiment shown in FIG. 1a. If the value of C1 is chosen such that the voltage ripple across it, is predominantly determined by the ripple current and the ESR, then this voltage ripple will approximately be uniform with the ripple current in L1. In that case the amplitude of the ripple voltage across C1 (ΔVpv) is dictated by the hysteresis of the Schmitt-trigger.

During interval t0-t1 the increase in current through L1 is given by:

$$\Delta I_{L1} = \frac{V_{pv} \cdot (t1 - t0)}{L1}$$

And the decrease during t1-t2:

$$\Delta I_{L1} = \frac{(V_{load} - V_{pv}) \cdot (t2 - t1)}{L1}$$

Considering the mentioned uniformity between PV voltage ripple and current ripple this yields:

$$\Delta V_{pv} \approx \frac{ESR \cdot V_{pv} \cdot (t1 - t0)}{L1}$$

And:

$$\Delta V_{pv} \approx \frac{ESR \cdot (V_{load} - V_{pv}) \cdot (t2 - t1)}{L1}$$

The ripple amplitude is forced to be equal to the hysteresis of the Schmitt-trigger:

$$\Delta V_{pv} = V_{hys}$$

The switching frequency of the converter is defined as:

$$f_{sw} = \frac{1}{t2 - t0}$$

Solving yields:

$$f_{sw} \approx \frac{ESR \cdot V_{pv} \cdot (V_{load} - V_{pv})}{L1 \cdot V_{hys} \cdot V_{load}}$$

If, for some reason, it is not desired to rely on the ESR of capacitor C1 for timing, or if the PV ripple voltage is required to be very small, an alternative embodiment of the current invention can be used at the expense of two extra components. (See FIG. 2a and FIG. 2b). Here the frequency is determined by components R1 and C2 and the hysteresis of the Schmitt-trigger. The PV voltage will still be equal to $V_{control}$ because the average voltage across inductor L1 is zero. The PV ripple voltage is now independent of the hysteresis of the Schmitt-trigger and can be made arbitrarily small by choosing an appropriate value for C1.

In an MPPT the PV voltage is the very parameter that needs to be controlled. The fact that a PV panel is a power limited source enables the use of this type of oscillator. And it's also the reason why an MPPT is needed.

Figure 2A:
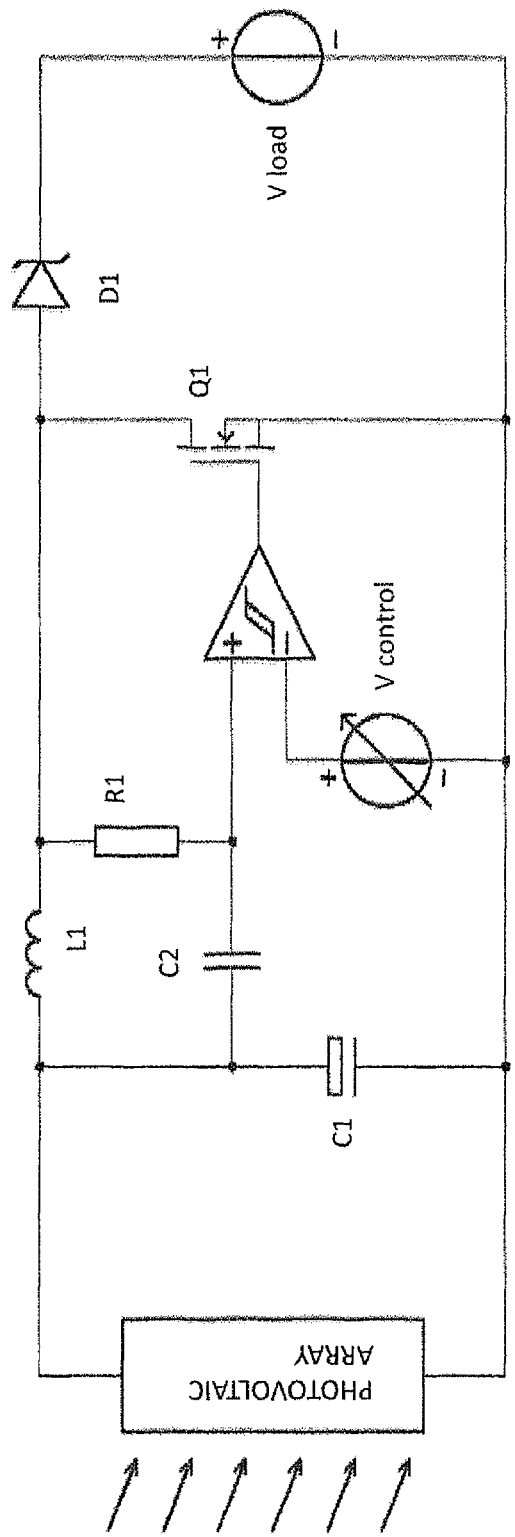
FIG. 2a shows the schematic diagram of an alternative embodiment of the power section of a maximum power point tracker, according to one embodiment of the invention.
Figure 2B:
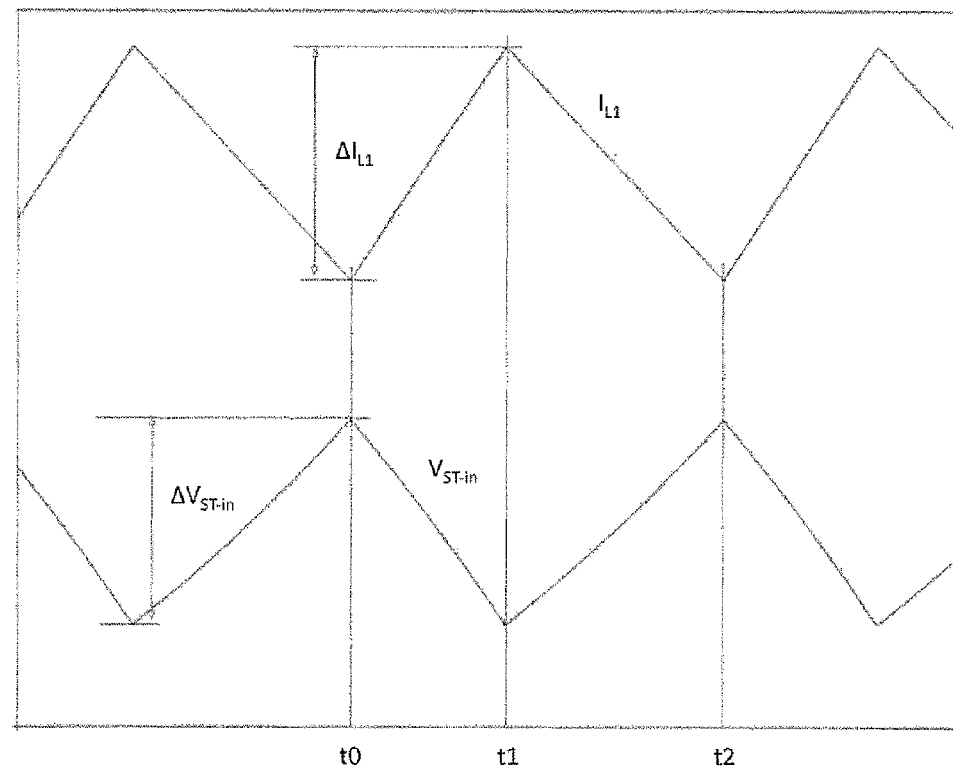

Referring now to FIG. 2b, which shows the ripple amplitude at the input of the Schmitt-trigger is forced to be equal to the hysteresis of the Schmitt-trigger in the embodiment shown in FIG. 2a and approaches a triangular shape. Here, if the hysteresis window of the Schmitt-trigger is small compared to the PV voltage and to the load voltage, then R1 can be considered a current source that charges and discharges C2 linearly. In that case the voltage at the input of the Schmitt-trigger ($V_{ST-in}$) approaches a triangular shape. The average value of $V_{ST-in}$ is equal to the PV voltage during oscillatory operation.

During interval t0-t1 the decrease in voltage of $V_{ST-in}$ is:

$$\Delta V_{ST-in} \approx \frac{V_{pv} \cdot (t1 - t0)}{R1 \cdot C2}$$

And the increase during t1-t2:

$$\Delta V_{ST-in} \approx \frac{(V_{load} - V_{pv}) \cdot (t2 - t1)}{R1 \cdot C2}$$

The ripple amplitude is forced to be equal to the hysteresis of the Schmitt-trigger:

$$\Delta V_{ST-in} = V_{hys}$$

The switching frequency of the converter is defined as:

$$f_{sw} = \frac{1}{t2 - t0}$$

Solving yields:

$$f_{sw} \approx \frac{V_{pv} \cdot (V_{load} - V_{pv})}{R1 \cdot C2 \cdot V_{hys} \cdot V_{load}}$$

Figure 3:
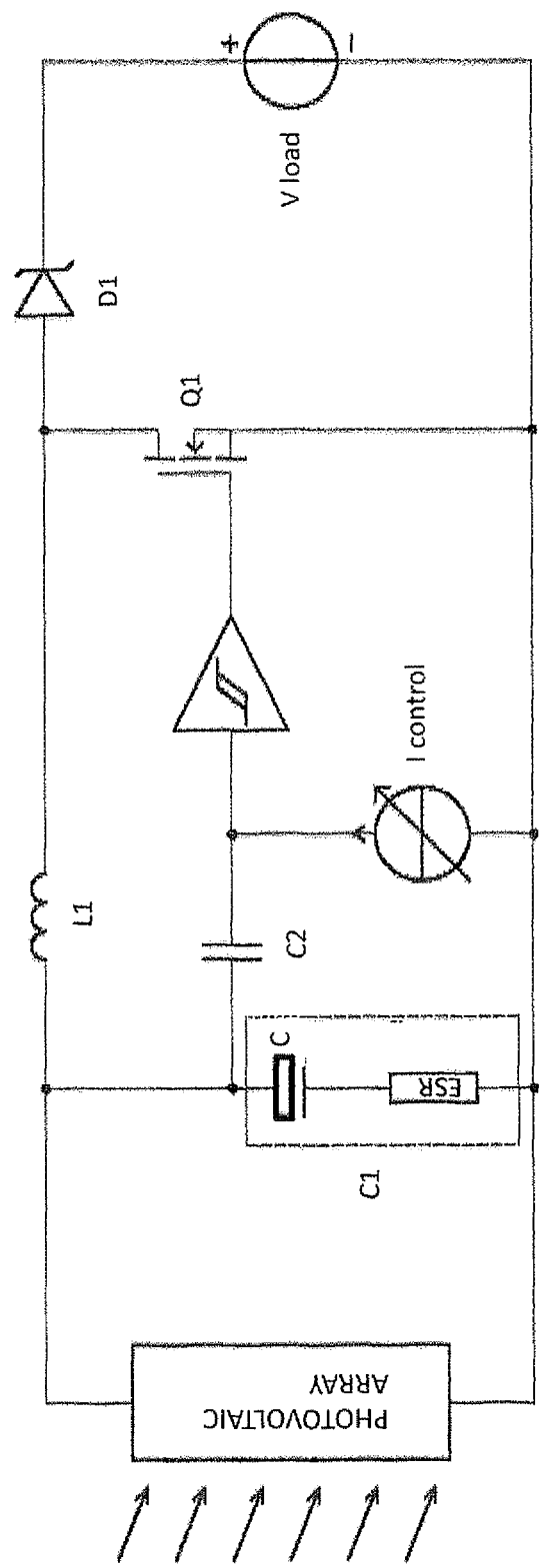
FIG. 3 shows how one power section embodiment of the invention can be adapted to incorporate an integrator and make the circuit implementation simpler and less expensive in the process.

Many MPPT schemes require an integrator in the control loop. The power section embodiment presented above can be adapted to incorporate an integrator and even make the circuit implementation simpler and less expensive in the process (FIG. 3).

The only component added is capacitor C2. The differential Schmitt-trigger has been replaced with a single-ended version. In a physical implementation this means that the Schmitt-trigger can be realized with logic buffers or inverters instead of a (fast) comparator, which is significantly more expensive. The average PV voltage is now determined by the sum of the average threshold voltage of the Schmitt-trigger and the voltage across C2. The latter is proportional to the time integral of current $I_{control}$.

During normal operation of the power section, the average voltage at the input of the Schmitt-trigger is almost constant. The voltage travels between the limits set by the hysteresis window, but the average value will be centered in between the upper and lower threshold. This implies that the input of the Schmitt-trigger can be observed as a virtual ground point for signals within the bandwidth of the MPPT control loop. The current source $I_{control}$ can then be replaced with a voltage source and a resistor in real designs. The control voltage then needs to have an offset equal to the average threshold voltage of the Schmitt-trigger.

One embodiment of the maximum power point tracker employs the naturally occurring ripple voltage and current of the converter to extract the necessary power slope gradient information. This eliminates the need for an externally imposed perturbation as used in most other methods. Because the inherent perturbation occurs at the switching frequency of the converter, this has the potential of very fast convergence. This category of MPPTs is referred to as Ripple Correlation Control (RCC).

Figure 4:
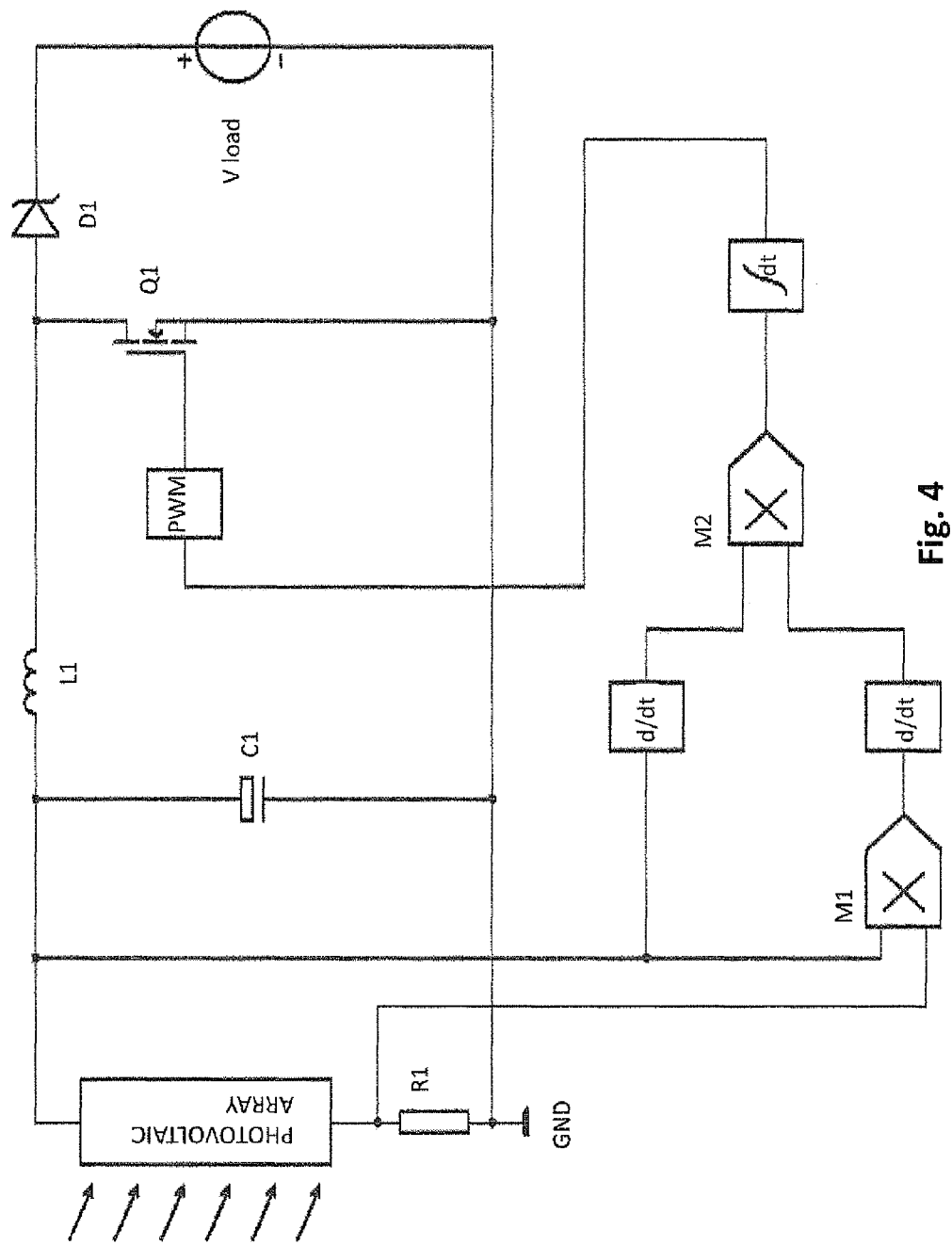
FIG. 4 shows a schematic diagram of a typical Ripple Correlation Control (RCC) maximum power point tracker.

The diagram of a typical RCC maximum power point tracker is given in FIG. 4. Analog multiplier M1 is used for generating a signal proportional to the PV output power. The PV voltage and current signals are fed to the multiplier, which produces a signal proportional to the product. Since both PV voltage and current are DC signals with a relatively small ripple portion, the product of the two will also contain a large DC part and hence the multiplier will operate in 1 quadrant only. The output headroom of the multiplier will have to accommodate this signal. The necessary gradient information for the RCC scheme however, is contained in the AC ripple portion of the signal only. The DC part has no added value but it limits the maximum allowable gain of the multiplier in order to keep the signal within the available headroom.

The power ripple signal can be generated without the undesired DC part and without using an expensive analog multiplier, using the following calculation.

The output power of the PV array $P_{pv}$ is equal to the product of the PV voltage ($V_{pv}$) and the PV current ($I_{pv}$).

$$P_{pv} = V_{pv} \cdot I_{pv}$$

Both $V_{pv}$ and $I_{pv}$ can be considered as an AC component superimposed onto a DC portion.

$$V_{pv} = \overline{V} + \tilde{v}$$

$$I_{pv} = \overline{I} + \tilde{i}$$

The minus sign in the equation for $I_{pv}$ represents the inverse relation between PV voltage and PV current. This yields for the power:

$$P_{pv} = (\overline{V}+\tilde{v})\cdot(\overline{I}-\tilde{i}) = \overline{V}\overline{I} + \overline{I}\tilde{v} - \overline{V}\tilde{i} - \tilde{v}\tilde{i}$$

The first term in the right hand expression is the DC component, which can be discarded. The power ripple signal will then become:

$$\tilde{p} = \overline{I}\tilde{v} - \overline{V}\tilde{i} - \tilde{v}\tilde{i}$$

The PV voltage ripple will generally be small compared to its average value. If this were not true then the voltage swing would be too large to stay within an acceptable distance from the MPP. The same applies to the current ripple. This implies that the last term can be neglected.

This results in:

$$\tilde{p} \approx \overline{I}\tilde{v} - \overline{V}\tilde{i}$$

In other words, the power ripple signal can be constructed by multiplying the voltage ripple signal with the average value of the current and subtracting the product of the average voltage and ripple current signal. Essentially two 2-quadrant multipliers are needed here. At first glance this seems to have complicated the implementation, but this function can be implemented with very inexpensive operational transconductance amplifiers. The gain of these amplifiers should be well matched. With commercially available OTA's like the National Semiconductor LM13600/LM13700 and the NXP NE5517 this can be guaranteed since both amplifiers are integrated onto the same chip and will be subjected to the same production conditions and temperature.

Figure 5A:
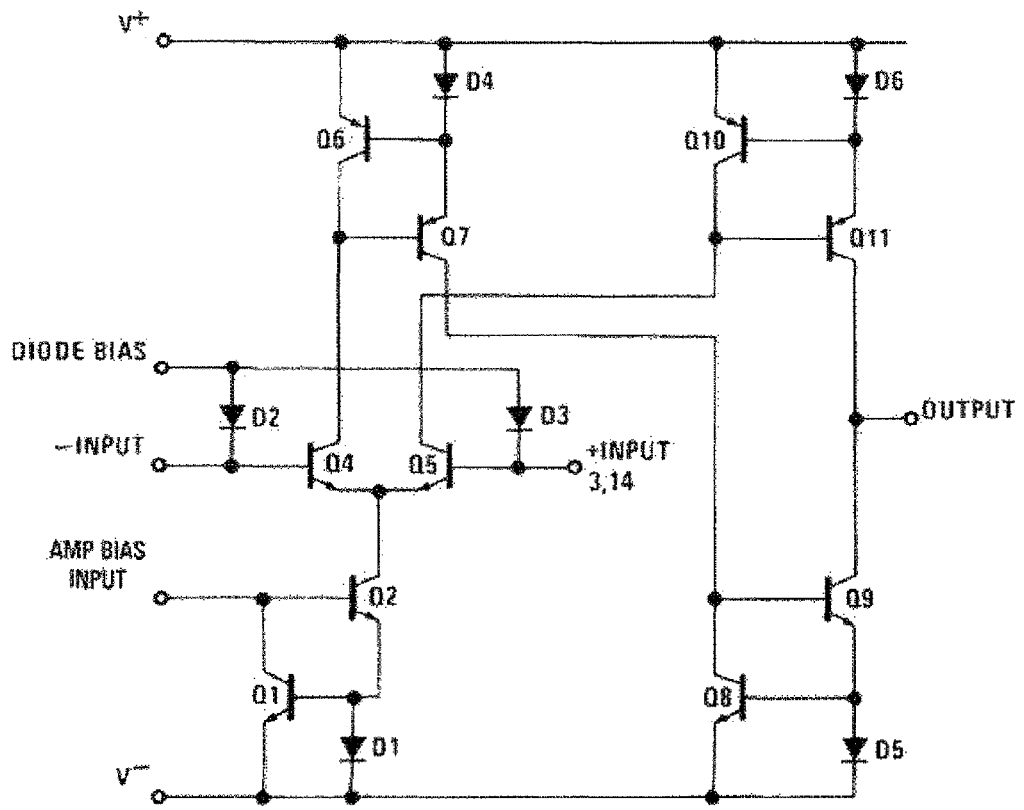
FIGS. 5a-5b show the internal circuit diagram of a typical commercially available Operational Transconductance Amplifier (OTA) with input linearizing diodes, according to the current invention.
Figure 5B:
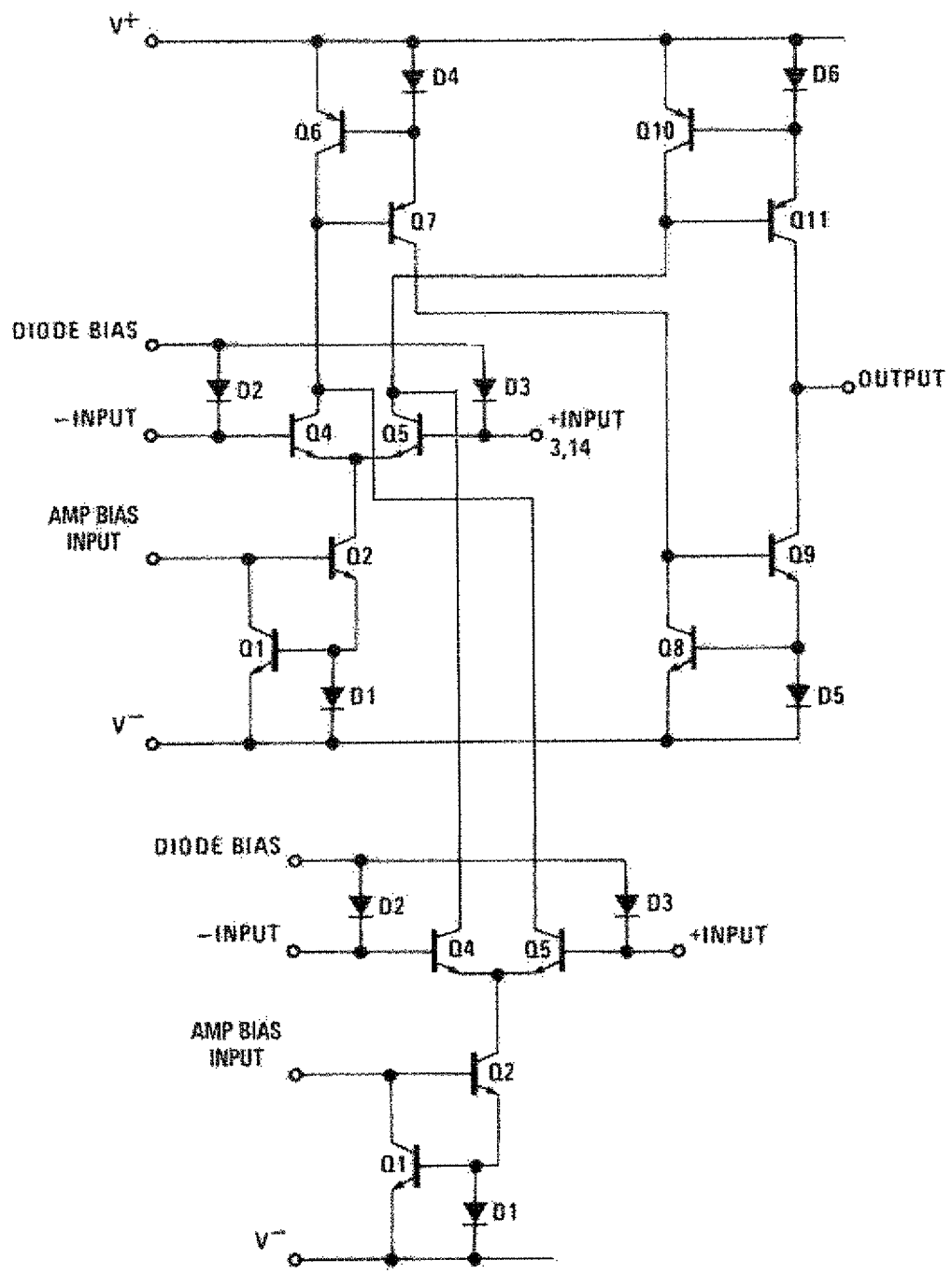

Transconductance amplifiers have current source outputs. The subtraction of the two signals can be done by simply tying the outputs of the 2 OTAs together. When integrating this multiplication topology onto silicon it can even be simplified further by performing the subtraction in the first differential stage of the transconductance amplifier. FIG. 5a shows the internal circuit diagram of a typical commercially available OTA with input linearizing diodes. In the next diagram (FIG. 5b) a second differential input stage has been added. The current mirrors for converting the differential current of the input stages to a single ended signal can now be combined. This results in a structure with very low complexity.

Figure 6:
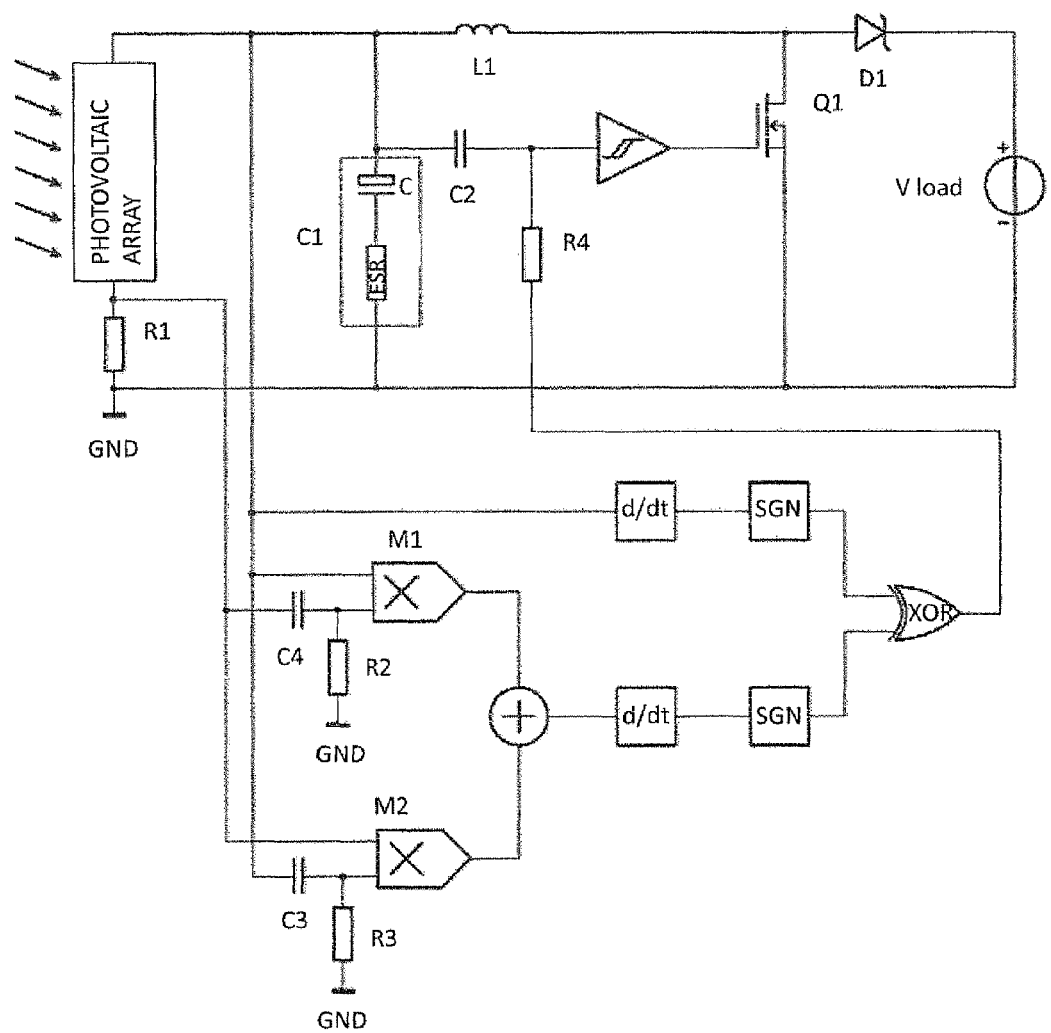
FIG. 6 shows the schematic diagram of one embodiment of a RCC maximum power point tracker, according to the current invention.

FIG. 6 shows the diagram of a RCC maximum power point tracker that uses both the earlier presented power section and the method for generating the power ripple signal, according to one embodiment of the current invention. Two multipliers are used for generating the power ripple signal. Herein, these can be implemented with OTAs. The multiplier of the derivative signals from the original block diagram of FIG. 4 has been replaced with an exclusive OR gate. The multiplication of the signs of the derivatives can be used instead of a linear multiplication of the derivatives themselves. The control law will still drive the operating point towards the MPP. The exclusive OR function is a convenient method of performing a multiplication of 2 sign bits. The integrator and PWM blocks of the original block diagram are an integral part of the converter here.

Figure 7:
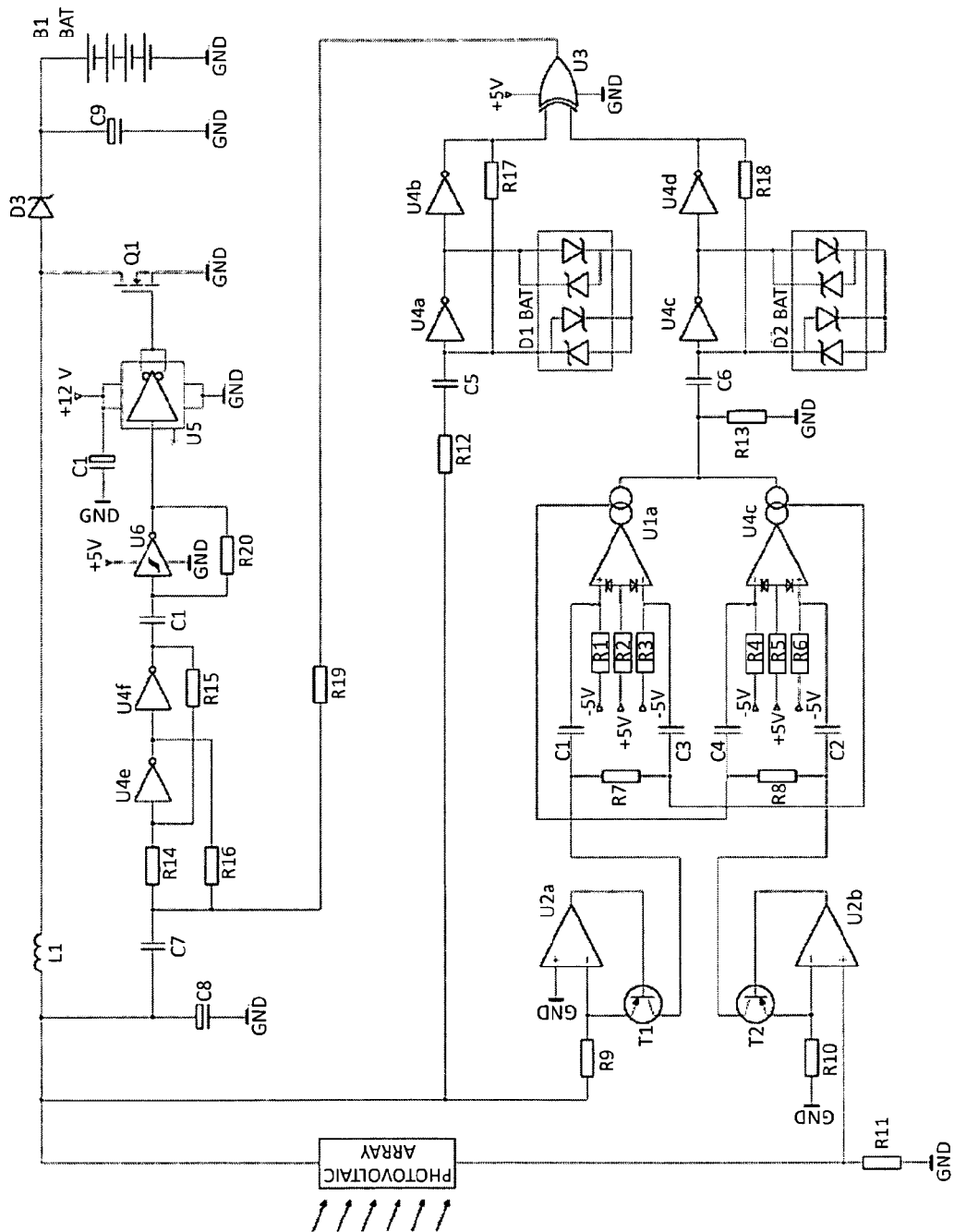
FIG. 7 shows the physical implementation of the maximum power point tracker utilizing ripple correlation control, according to one embodiment of the current invention.

FIG. 7 shows the physical implementation of the maximum power point tracker utilizing ripple correlation control, according to one embodiment of the invention. This circuit has been tested in a first prototype. The Schmitt-trigger for the hysteretic oscillator is built around U4e and U4f. R16 is added in order to make the average input current of the Schmitt-trigger zero and independent of the momentary duty-cycle. This will avoid any unwanted charging or discharging of the integrator capacitor C7.

Operational amplifier U2a converts the PV voltage signal into a collector current in transistor T1. The AC part of this current is injected into the input of OTA U1a. R1 to R3 set the bias current for the linearizing diodes of the OTA's input. Via R7 the collector current is then fed into the amplifier bias pin of the second OTA U1c. The gain of this OTA will be proportional to this current.

Equivalent processing is further performed on the current measuring signal across resistor R11. The result is that the output current of OTA U1a represents the product of PV ripple voltage and PV current. The output current of U1c represents the product of PV ripple current and PV voltage. The combined output current of both OTAs represents the power ripple signal as described earlier.

Inverters U4a and U4b generate a logic signal that represents the sign of the time derivative of the PV voltage. U4c and U4d do the same for the power ripple signal.

These two sign signals are then combined in an exclusive OR function. At the MPP the phase difference between PV voltage and power ripple will be 90 degrees. At this point the output of the XOR gate will have a duty cycle of 50% and consequently its average output voltage is half its supply voltage. Assuming the average threshold of the Schmitt-trigger is also at half the supply voltage, this means the average current through R19 is zero and hence the voltage across the integrator capacitor C7 is kept steady.

If the converter is operating on either side of the MPP, the XOR gate will generate an off-centre average output voltage that will drive the integrator and thus the PV voltage towards the MPP.

The presence of an integrator in the loop creates a potential latch-up problem. If for instance the PV voltage reaches its ceiling and the voltage at the input of the Schmitt-trigger is below the lower threshold, the oscillator will stop. In this condition the output of the XOR gate is unpredictable as no gradient information is present, and depends on noise only. The voltage at the input of the Schmitt-trigger might drift further downwards preventing the oscillator from restarting.

The relaxation oscillator built around U6 is added to recover from such a latch-up condition. This oscillator starts toggling at a much lower frequency if the primary oscillator stops. Once the primary oscillator runs it will be overruled and act merely as an inverter for the gate drive signal.

Figure 8:
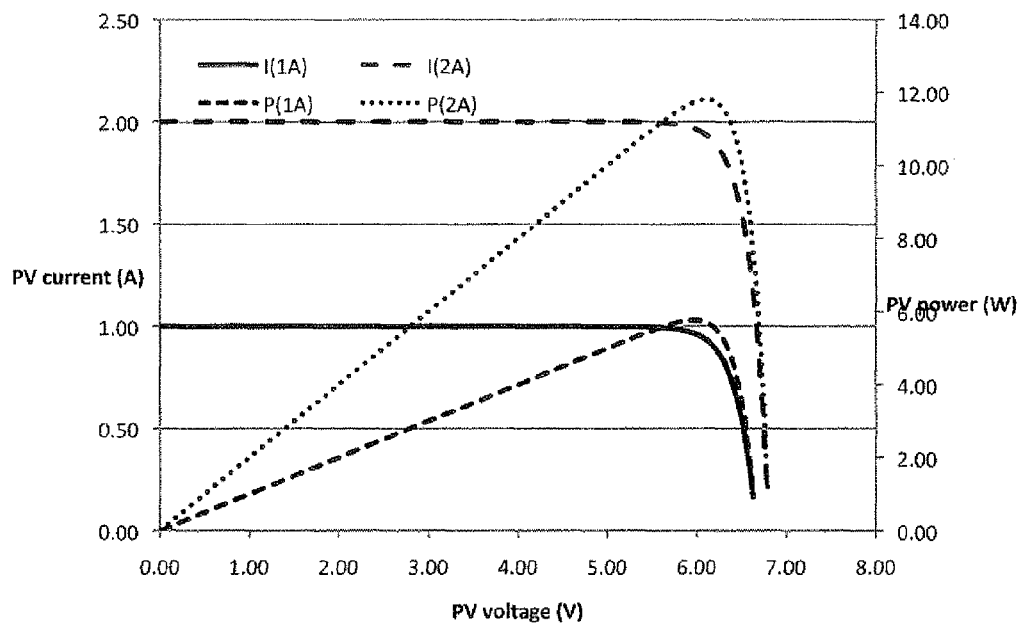
FIG. 8 shows the current vs. voltage and the power vs. voltage characteristics of an arbitrary PV array model, the circuit diagram of which is shown in FIG. 20 that was used in the simulations of the maximum power point trackers, according to the embodiments of the invention.

Simulations have been performed on this circuit. The PV array was modeled as a current source shunted by a string of 8 silicon diodes. FIG. 8 shows the current vs. voltage characteristic of this arbitrary PV model (see also FIG. 20). The power curve has also been plotted into the same graph. Both curves were plotted for values of 1 A and 2 A for the current source. This can be interpreted as two different insolation conditions for the PV array.

Figure 9:
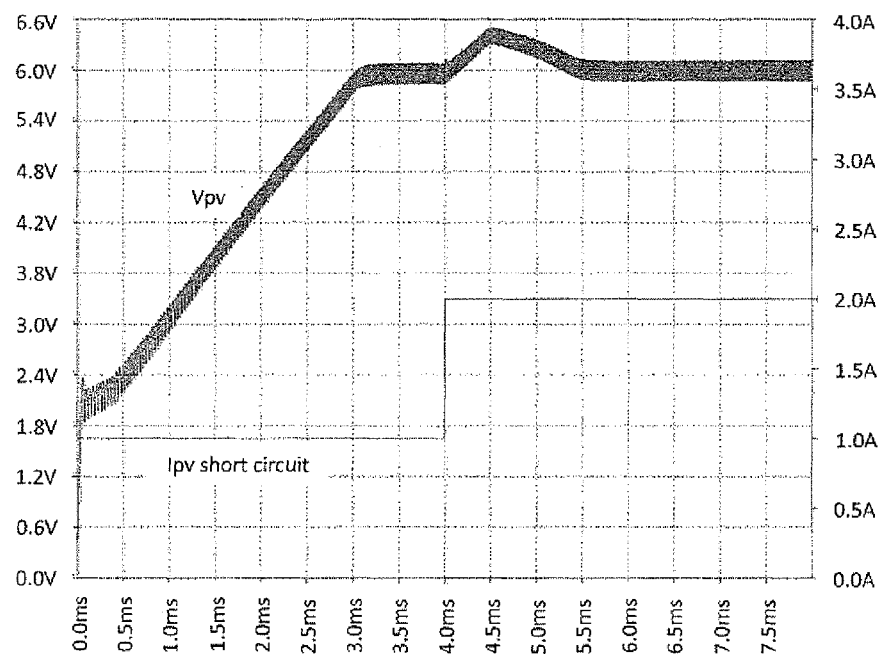
FIG. 9 shows the simulation results of the RCC maximum power point tracker circuit, according to one embodiment of the current invention.

FIG. 9 shows the simulation results of the prototype circuit. The ESR of capacitor C8 has been chosen at 150 mΩ, which is typical for a tantalum capacitor of this value. The battery is assumed to have a nominal voltage of 12V. Depending on the exact point of operation and the output voltage, this results in a switching frequency of approximately 44 kHz. The upper graph shows the voltage of the PV array after the circuit is powered on. In the lower graph the value of the current source in the PV model is plotted. This current is initially set at 1 A and steps up to 2 A after 4 ms have elapsed. The circuit reaches the initial MPP in approximately 3 ms after startup. After the artificial sudden increase of insolation at 4 ms, it takes the circuit 1.5 ms to converge to the new MPP. The prototype circuit in this example has not yet been optimized but this indicates its potential for very rapid convergence.

Figure 10A:
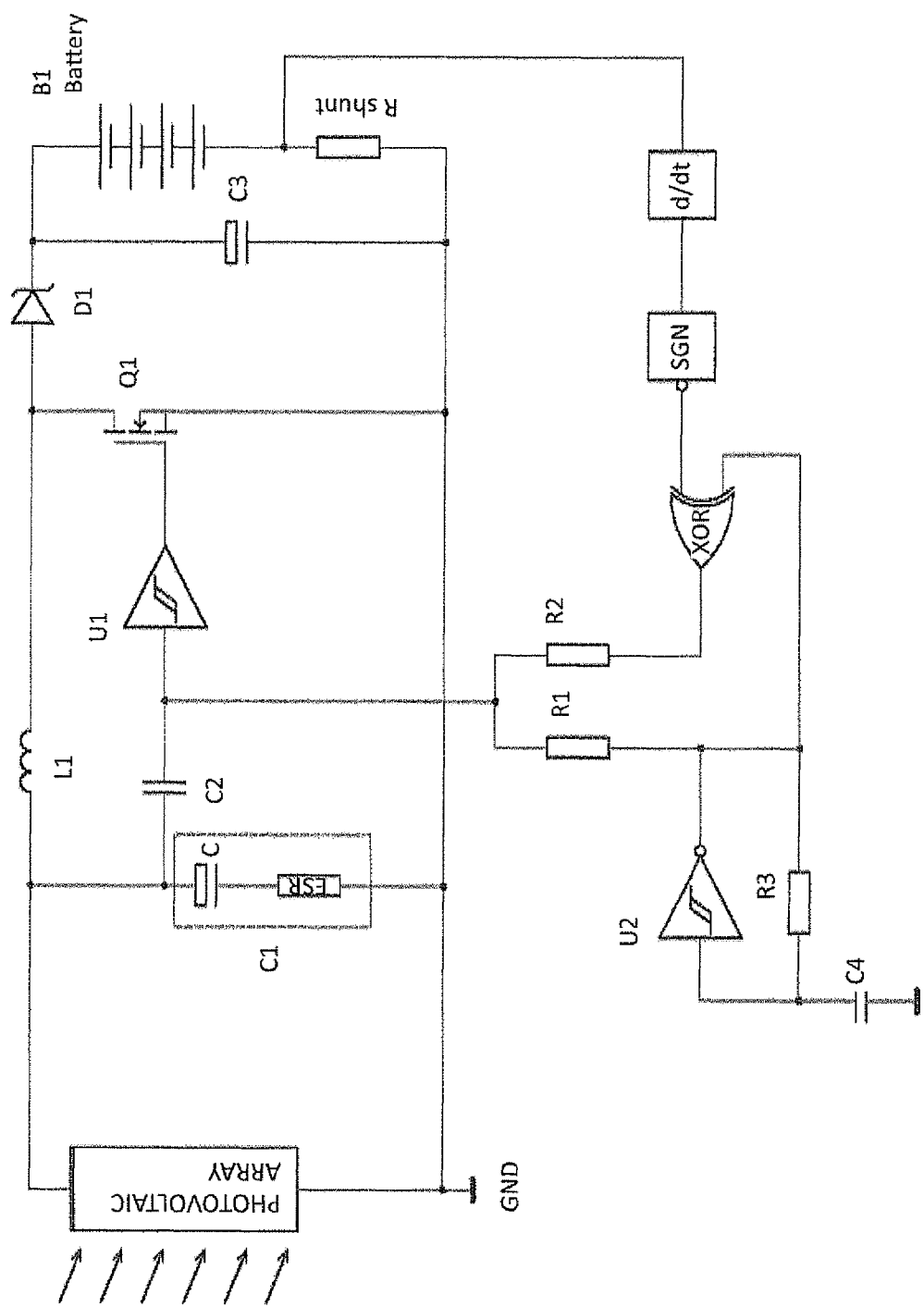
FIG. 10a-10b show a schematic diagram for a MPPT that utilizes the output current maximization method for finding the MPP, according to one embodiment of the current invention, and its simulation results.

FIG. 10a shows a block diagram for a MPPT that utilizes a different method of finding the MPP. It does so by maximizing the output current. This type of MPPT can be used for the majority of load types. As long as the load has positive impedance, the maximum of the output current will coincide with the maximum power point. Other maximizing topologies have been described in literature. These generally steer the operating point of the converter by controlling the duty-cycle. A flip-flop and an integrator determine the direction (increasing or decreasing) in which the duty-cycle is moving and its slope. The flip-flop is then toggled depending on the gradient of the output current or voltage. If the power is increasing, the gradient will be positive and hence the flip-flop will be left unchanged. If the gradient is negative, the flip-flop will be toggled and hence the direction in which the duty-cycle is moving is reversed. A self-oscillating system is created in this way that will stay in the vicinity of the MPP.

The topology according to one embodiment of the invention uses the hysteretic boost converter presented earlier, where a new method of MPP control is provided that doesn't require a flip-flop. The key difference is that instead of controlling the duty-cycle, here the PV voltage is controlled directly and the relation between control voltage and PV voltage is unity at any given time. The direction in which the PV voltage is moving is directly related to the sign of the current that flows into the integrator capacitor and the magnitude of the gradient is proportional to the value of the current. With duty-cycle control this is not trivial as the duty-cycle is related to the ratio of PV voltage and output voltage. This is not always linear and also depends on the type of load. The relation can also change dramatically if the converter operates in discontinuous mode. Having a consistent relation between the perturbing signal and the gradient of the PV voltage makes it very easy to detect on which side of the power curve the converter is operating. If the gradients have equal signs then the point of operation is on the left side of the peak in the power curve. If the signs are opposite the point of operation is on the right side. Consistency between perturbing signal and PV voltage slope also makes it easy to establish a predictable perturbation amplitude of the PV voltage.

The relaxation oscillator built around U2 generates the perturbing signal. It oscillates at a frequency well below the switching frequency of the converter. If the average threshold of U2 is equal to that of U1 then the average voltages at their inputs will also be equal. This implies that the average current through R3 and R1 is zero. Here, the oscillator makes the PV voltage ramp up and down linearly by charging and discharging the integrating capacitor C2. The average value of the PV voltage will not change. Assuming that the absolute value of the current through R2 is small compared to the current through R1 at any given time, the output of U2 represents the opposite sign of the time derivative of the PV voltage.

The output current of the converter is measured and differentiated. The output voltage can also be used depending on the type of load. A battery typically has very small impedance, which makes the voltage variation small. For this type of load, current maximizing is generally more appropriate. Current maximizing also can be used if more MPPT units have to be paralleled. This signal is positive if the output power increases and negative if it decreases. The opposite of its sign is fed to an exclusive OR gate together with the output of U2. The exclusive or gate effectively produces the product of signs of the time derivatives of PV voltage and output power.

Figure 10B:
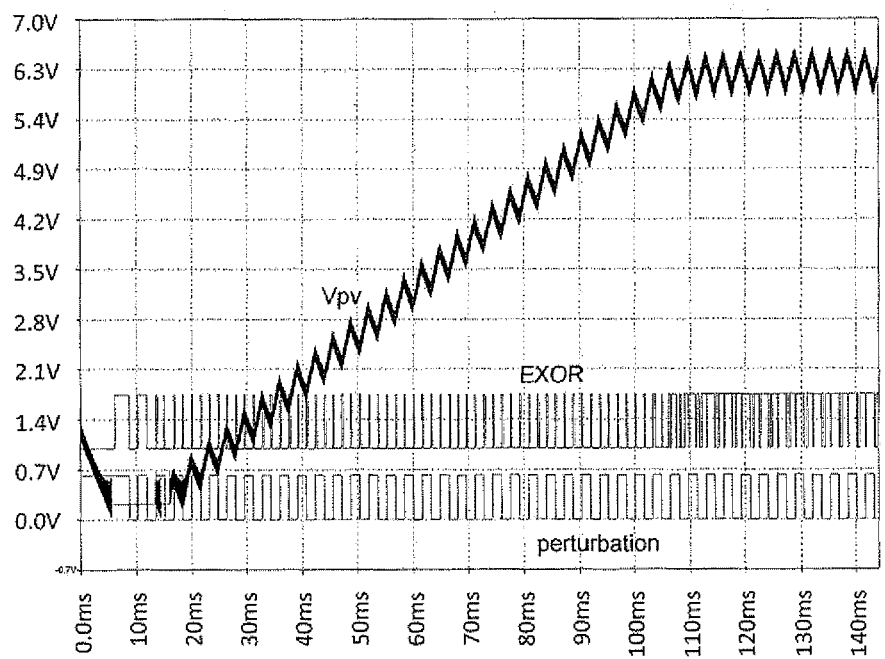

This product has a DC component, which depends on the slope of the power curve at the point where the converter is operating. This DC voltage is then used to drive the integrator towards the MPP via R2. One condition has to be met for this to work; the influence of the oscillator on the slope of the PV voltage has to dominate the influence of the XOR gate. This is needed to maintain the validity of the relation between the output of U2 representing the opposite sign of the derivative of the PV voltage. If U2 and the XOR gate have the same logic output levels, this condition can be met by choosing R2 larger than R1. This will ensure that the current through R2 can never exceed the current through R1 and consequently the XOR gate output can never reverse the slope of the PV voltage as initiated by U2. Simulation shows (FIG. 10b) that the PV voltage will staircase slowly to the point of maximum output power. In this simulation the frequency of the primary oscillator has been chosen at approximately 1 MHz. The triangular envelope of the PV signal is the perturbation caused by U2.

This implementation inherently recovers from the earlier mentioned latch-up condition. If the primary oscillator of the converter stalls, the input of Schmitt-trigger U1 will no longer behave as a virtual ground point. Consequently, the output of U2 will make the input of U1 ramp up and down. If the average threshold of both gates is matched and U2 causes the input of U1 to travel beyond its hysteresis window, the primary oscillator will automatically restart.

According to one embodiment, an ideal MPPT imposes a load to the PV panel in order to have it working at its optimum point of operation where power output is maximized. The current vs. voltage output characteristic of an ideal MPPT is a curve of constant power. This curve is defined by all points where the product of current and voltage is constant and hence, has a hyperbolic shape. The value of that constant power is equal to the power at the MPP of the PV panel.

According to different embodiments of the invention, the outputs of the MPPTs can be connected in parallel or in series. When connected to a load their individual output voltages and currents will automatically adjust themselves. The output voltage and current of the arrangement of MPPTs depends on the total amount of power and the characteristic of the load. When connected in parallel, each MPPT will operate at a point on its curve of constant power, where the output voltage equals the voltage at the load. The output current will be shared proportional to their contribution in power. When connected in series the output current of all MPPTs will be equal to the load current. In that case the voltage will be shared proportionally.

In an ideal MPPT the output voltage and current, or the load characteristic, have no influence on the performance of tracking the PV panel's MPP. The MPPT control loop is not affected by changes in the load. Most practical MPPTs however, utilize some form of duty-cycle control for the converter section. A consequence of this is that the input voltage will depend on the output voltage for any given value of the duty-cycle. This means that if the output voltage is changed by an event in the load, the input voltage (PV voltage) will also change immediately. The MPPT control loop will try to fix this by adjusting the duty-cycle, but it needs time to do this.

This property makes it troublesome to combine multiple MPPTs in a series or parallel arrangement. If one PV panel experiences a change in insolation, its MPPT will adjust itself to the new optimum point of operation. This change will affect the voltage and current in the load and consequently also the output voltage of the other MPPTs in the arrangement. This in turn will change their corresponding PV voltages due to the relation with output voltage and duty-cycle. Changing PV voltages result in changes in output power, which affect load voltage and current. The overall effect is that each PV panel with its local MPPT, will have influence on the behavior of all others in the arrangement. This mutual influence on each other's control loop can lead to chaotic behavior if no proper precautions are taken.

As discussed above, the PV voltage is controlled directly by the MPPT control loop instead of indirectly by manipulating the duty-cycle. The duty-cycle is inherently generated by the hysteretic principle of the oscillator without intervention of the MPPT loop. This means that the input voltage of the converter will not be affected by changes in the output voltage or load. Hence, events in the load conditions will not affect the PV voltage and will not excite the MPPT control loop.

According to one embodiment of the invention, for converter topologies, MPPTs can be made that exhibit near ideal behavior. These MPPTs can then be used in series or parallel arrangements without the risk of chaotic behavior. In general this applies to any converter topology that utilizes hysteretic control of the PV voltage.

Two additional embodiments of hysteretically controlled converters are presented based on the Buck-boost and the Buck topology.

Figure 11:
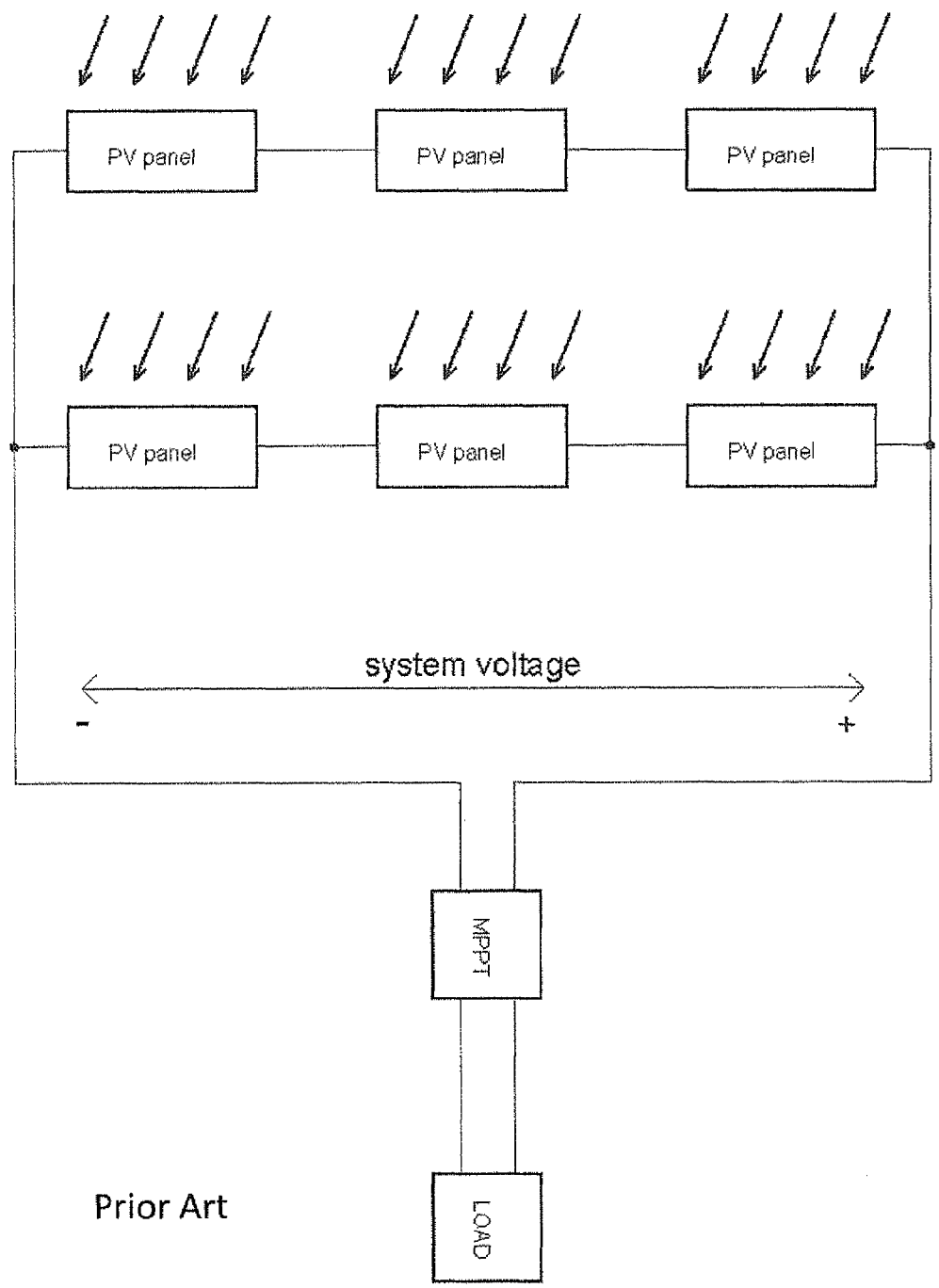
FIG. 11 shows a block diagram of a generic PV system.

For multiple MPPT arrangements, PV arrays for high power applications include multiple PV panels in a series and parallel arrangement. Strings of series connected panels are used to generate a higher system voltage. Multiple of these strings may be connected in parallel. Typically several hundreds to a thousand Volts for the system voltage are used. The reason for increasing the voltage by using series strings is that this simplifies the wiring and also reduces the current rating so thinner copper wire can be used. In conventional PV systems a centralized maximum power point tracker is connected to the PV array. FIG. 11 shows a block diagram of a generic PV system. In practical implementations the parallel branches will be isolated from each other by blocking diodes. No assumptions have been made as to what kind of load is connected to the MPPT in this generic block diagram. This can be a purely resistive load but in practical applications it will typically be a battery system or a grid-connected inverter that acts as a power sink to the utility grid. This type of load will behave more or less like a constant voltage at the output terminals of the MPPT.

Using a centralized MPPT has a major disadvantage. It will find the maximum power point of the whole PV array, but this doesn't necessarily mean that each individual PV panel is working at its MPP. Especially if the panels are not identical or if they are subjected to different insolation conditions or temperature, they will have different optimum operating points. Panels that are connected in series are forced to settle at a point on their I-V characteristic where they conduct equal current. Panels connected in parallel are forced to a point where they have equal voltages. This common current or voltage will not be compatible with different optimum operating points for each panel. Some of the panels or even all of them may not work at their MPP.

A way to improve this is to apply maximum power point tracking to each individual PV panel and then sum the output power of these MPPTs. This brings up the question of how to sum the output power from individual MPPTs.

Figure 12:
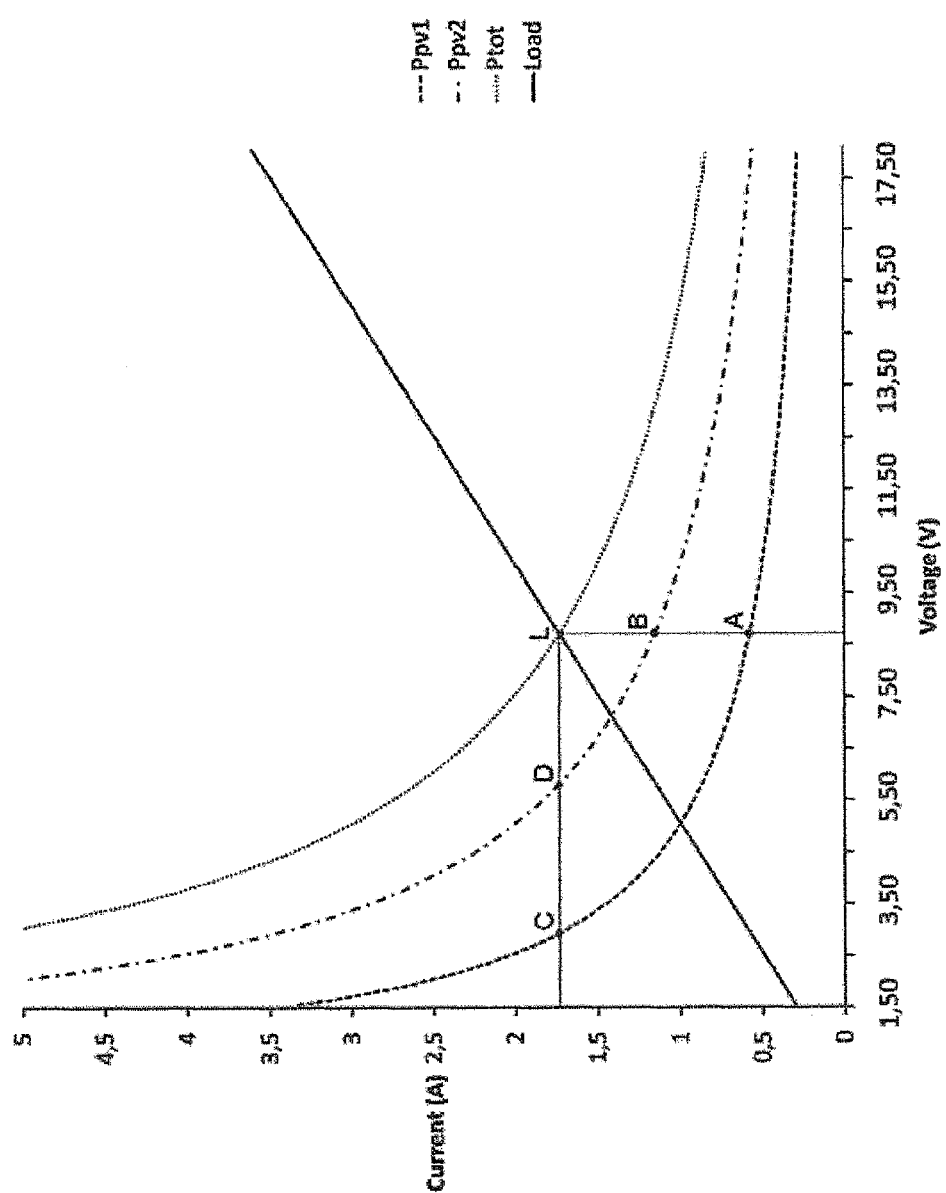
FIG. 12 shows an example of the I-V characteristics of 2 arbitrary constant power sources, according to one embodiment of the invention.

An ideal MPPT will extract the maximum amount of power from a PV panel by steering it to its optimum electrical operating point. It also forces the same amount of power into the load connected to its output. The behavior of the load has no influence on the operating point of the PV panel. This implies that the output of an ideal MPPT behaves as a constant power source for a given rate of insolation. The current vs. voltage output characteristic of a constant power source has a hyperbolic shape. The product of current and voltage has a constant value for all points on this curve. FIG. 12 shows an example of the IN characteristics of 2 arbitrary constant power sources. The lower hyperbolic curve labeled Ppv1 represents the output characteristic of an ideal MPPT that puts out 5 Watts. The curve labeled Ppv2 represents another ideal MPPT putting out 10 Watts. The upper dotted curve (Ptot) is the sum of Ppv1 and Ppv2 and thus represents the total amount of power which is 15 Watts in this example. The solid straight line is the characteristic of an arbitrary load, in this case a resistor of 5 ohms. If the combined output power of both MPPTs is forced into this load then its point of operation will settle at point L.

If the outputs of the two MPPTs are connected in parallel they will both have the same output voltage, which equals the voltage across the load. This implies that the first MPPT will settle at point A, which is the only point on its curve of constant power that is compatible with the load voltage. The second MPPT will settle at point B for the same reason. If the outputs are connected in series, both MPPTs will conduct the same output current, which is equal to the load current. In that case they will settle at point C and D respectively.

Figure 13:
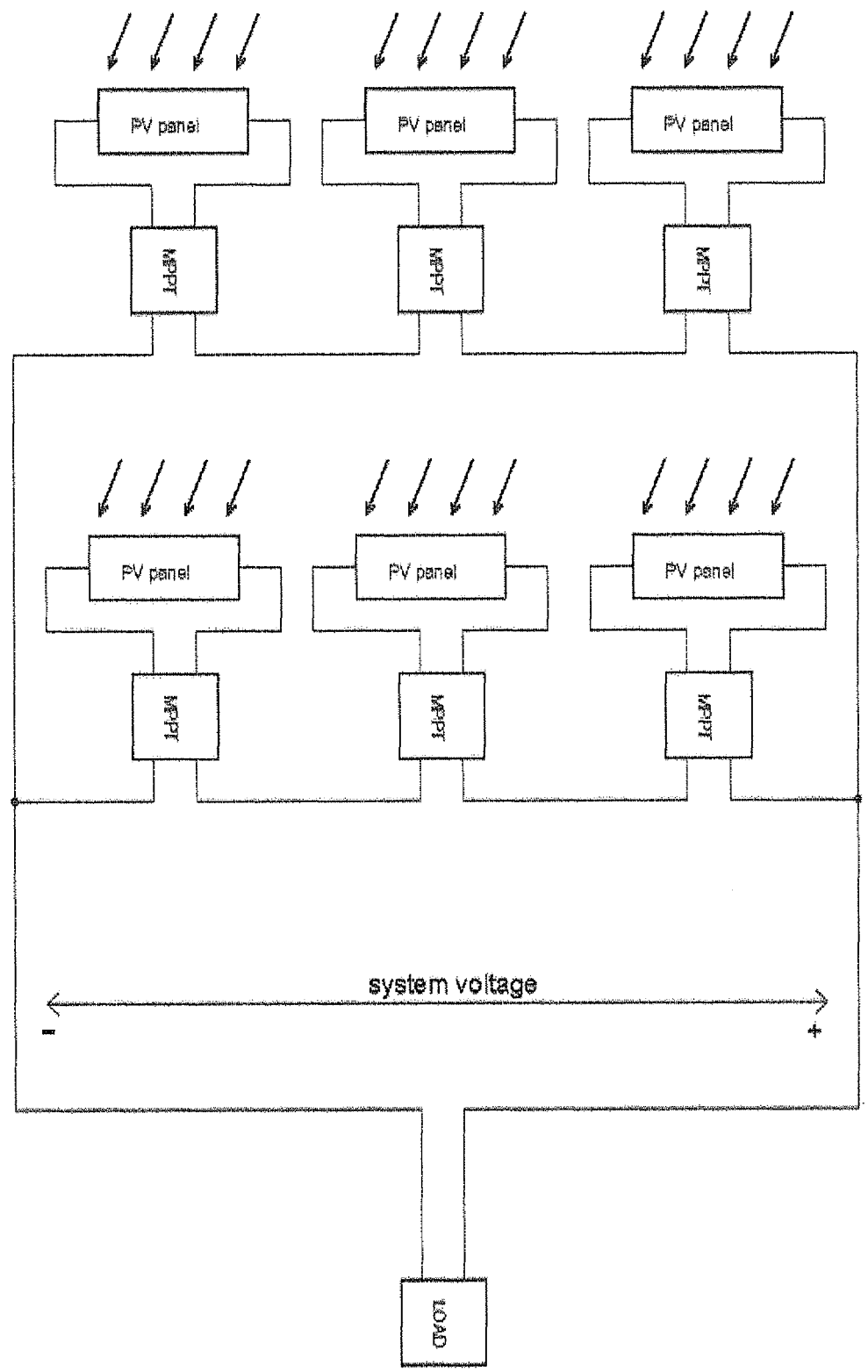
FIG. 13 shows a block diagram of a PV system with local maximum power point tracking, according to one embodiment of the invention.

This shows that ideal MPPTs can be either connected in series or in parallel while still delivering their maximum power. This remains true even if they have different levels of power output. FIG. 13 shows a block diagram of a PV system with local maximum power point tracking, according to one embodiment of the invention. Here each PV panel has its own MPPT. The outputs of those MPPTs are connected in a series and parallel arrangement. In this topology the system voltage is not determined by the PV panels but is dictated by the total amount of power and the load characteristic. Again, no assumptions about the type of load have been made here. This may be a resistive load or a constant voltage type of load like a battery system or a grid-coupled inverter. Theoretically, although of little practical use, it may even be a constant current type of load.

In reality MPPTs can have many aspects that make their behavior non-ideal. Some of these can introduce problems or restrictions when MPPTs are used in arrangements. A limitation in physical implementations is that the maximum output voltage and current must be finite. This means that the hyperbolic curve of constant power has limits on both sides, and hence operation is limited to this range. Depending on the type of load this may restrict the allowed difference in output power between the individual MPPTs in the arrangement. In a parallel arrangement connected to a constant voltage type of load this will generally not be a problem. In a series arrangement however, the MPPT that puts out the most power will have to adjust to a higher voltage in order to compensate for the other MPPTs in the string that produce less power. If the difference in power is too large, the MPPT may reach the limit of its output voltage range. Similar limitations occur when connecting a parallel arrangement to a constant current type of load.

Another cause for non-ideal behavior lies in the implementation of the power section in MPPTs. Generally the power section, or converter of an MPPT, is some form of switched mode topology that enables a variable transfer ratio between the input voltage and the output voltage. This ratio is determined by the duty-cycle of the pulse width modulation (PWM) that controls the power switch in the converter. The relationship between the ratio and the duty-cycle depends on the type of topology (e.g. Buck or boost) and on the mode of operation (continuous or discontinuous). Typically the duty-cycle is controlled by the control loop of the MPPT. The control loop uses this as a handle to steer the operating point of the PV panel towards its optimum.

With a given duty-cycle there is a fixed relation between input and output voltage. This implies that if the output voltage changes for some reason, the input voltage will also be affected. In an MPPT this means that changes in output voltage affect the point of operation of the PV panel. The control loop of the MPPT will have to adjust the duty-cycle of the converter in order to maintain operation at the MPP. Depending on the implementation of the control loop it takes a certain amount of time to recover from this perturbation. During this recovery the output power of the MPPT will be less and hence its output voltage and current will not satisfy a point on its curve of constant power. Statically the MPPT may still behave like a constant power source, but during load transients it will not.

With a single MPPT connected to a load this will not give rise to any problems. Arrangements of MPPTs, such as those shown in FIG. 13 however, can suffer severely from this non-ideal property. If one PV panel experiences a change in insolation, its output power will also change. This change in output power will affect the output voltage of all other MPPTs in the arrangement. Consequently their corresponding PV voltages will change and hence so will their output power. This means that a perturbation in the insolation of one panel will excite the control loop of all other MPPTs. This mutual influence between the individual control loops can result in unpredictable dynamic behavior. The effect can be hunting without ever finding equilibrium or completely chaotic behavior.

Turning now to the hysteretic control of PV voltage in the current invention. The block diagram of this topology is shown in FIG. 1. Amongst others, a major advantage of this topology is that the MPPT control loop has direct control over the PV voltage. No intermediate indirectly related parameter like duty-cycle is needed. The relation between $V_{control}$ and the PV voltage is unity at any time, and independent of the mode of operation of the converter. This makes the design of the control loop uncomplicated.

As previously discussed, FIG. 1 shows the schematic diagram of the power section for a maximum power point tracker according to one embodiment of the current invention. The circuit is based on the typical boost topology. A differential Schmitt-trigger drives the power switch based upon the difference between the PV voltage and the reference voltage $V_{control}$. The PV voltage will oscillate around this reference voltage. It is understood that the value of $V_{control}$ can be generated by the control section of the MPPT. The topology resembles the boost variant of the hysteretic controlled Buck converter, whereas here the input voltage is the controlled parameter instead of the output voltage.

Another property of this topology is its speed of operation. Stabilization of the PV voltage will occur within one switching cycle of the converter. The remaining PV ripple voltage will be well defined by the hysteresis of the Schmitt-trigger. Due to its principle of operation and speed the PV voltage is virtually immune for changes in the output voltage. The duty-cycle of the power switch will be affected instantaneously by events in the load, but this remains obscured to the MPPT control loop. This means that if this type of converter is used in an MPPT, the point of operation of the PV panel is not affected by externally imposed changes in the load voltage. Consequently the control loop is not perturbed by events in the load.

The converter exhibits near ideal behavior in this respect. This property eliminates the mutual influence of control loops when multiple MPPTs are used in a series or parallel arrangement. In general this advantage not only applies to the presented boost implementation, but to any topology where the input voltage is controlled in a hysteretic manner. MPPTs using these topologies can be used safely in series and parallel arrangements without the risk of chaotic interaction between their control loops. The output voltage and current of each MPPT will inherently settle at a point on its curve of constant power that satisfies all other units in the arrangement. No additional control mechanism or algorithm is needed for this. An appealing application would be to physically integrate the MPPT circuit into the PV panel. The arrangements can then be made in the same way as with conventional arrays.

Some additional topologies with hysteretic control of the input voltage are presented here.

The converter implementations by the inventor are based on the boost topology. This implies that the output voltage must always be higher than the input voltage. For some applications this can be restrictive. Particularly when multiple MPPTs are to be connected in series, a wide output voltage range is desired in order to allow all MPPTs in the chain to work at their MPP even if they have considerable difference in output power. Also when using a resistive load, the output voltage will drop below the PV voltage at a certain power level. If the converter is not able to operate below this output voltage then tracking of the MPP will be lost and the PV panel will effectively be connected directly to the load.

Figure 14:
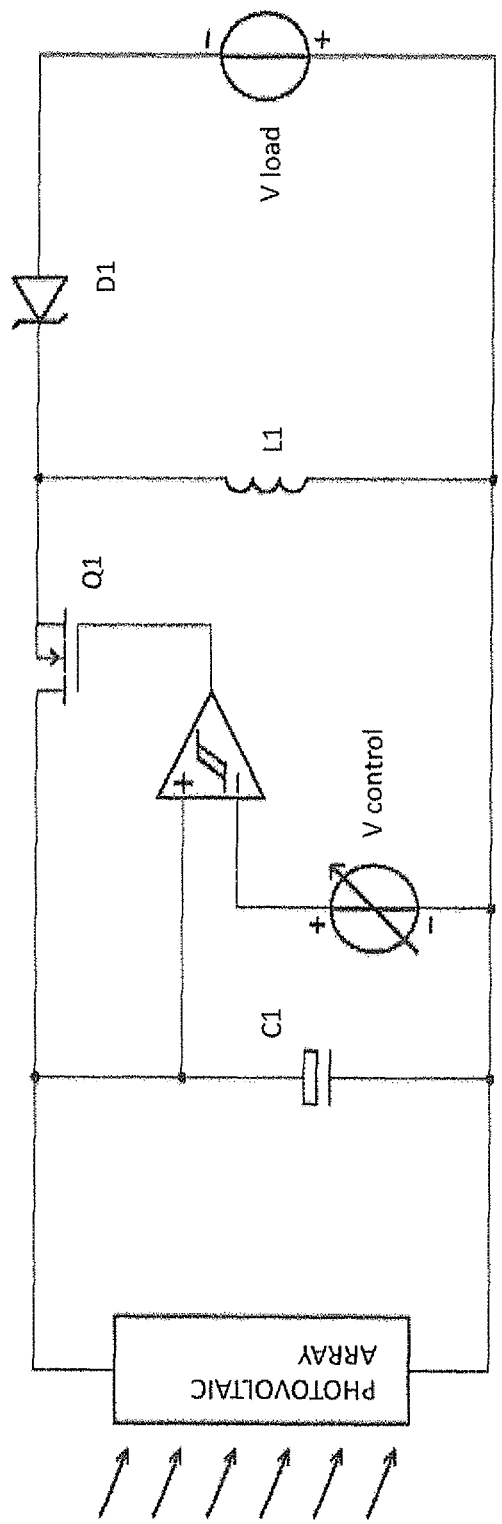
FIG. 14 shows a schematic diagram of topology of hysteretic control of the PV voltage, incorporating the Buck-boost converter, according to one embodiment of the invention.

According to one embodiment of the invention, an alternative topology for the converter section can be used, that features the same benefits of direct PV voltage control and simplicity, but has the additional advantage that the output voltage can be either lower or higher than the input voltage. This embodiment of the invention is based on the Buck-boost topology and also uses hysteretic control of the input voltage. (see FIG. 14)

Contrary to the boost variant, for this embodiment it's important that capacitor C1 has a very low equivalent series resistance ESR. The frequency at which the converter operates in continuous mode depends on input current, output voltage and the capacitance of C1. At high output voltage or low input current the converter can enter discontinuous mode, but this has no detrimental effect on its functioning.

In this topology the PV voltage is also controlled directly by $V_{control}$ and the PV ripple voltage is fixed by the hysteresis of the Schmitt-trigger. This stabilization works in both continuous and discontinuous mode. The polarity of the output voltage is reversed with respect to the previously presented topologies, but this is of little importance because the PV panel is electrically floating and has no defined ground reference.

Figure 15:
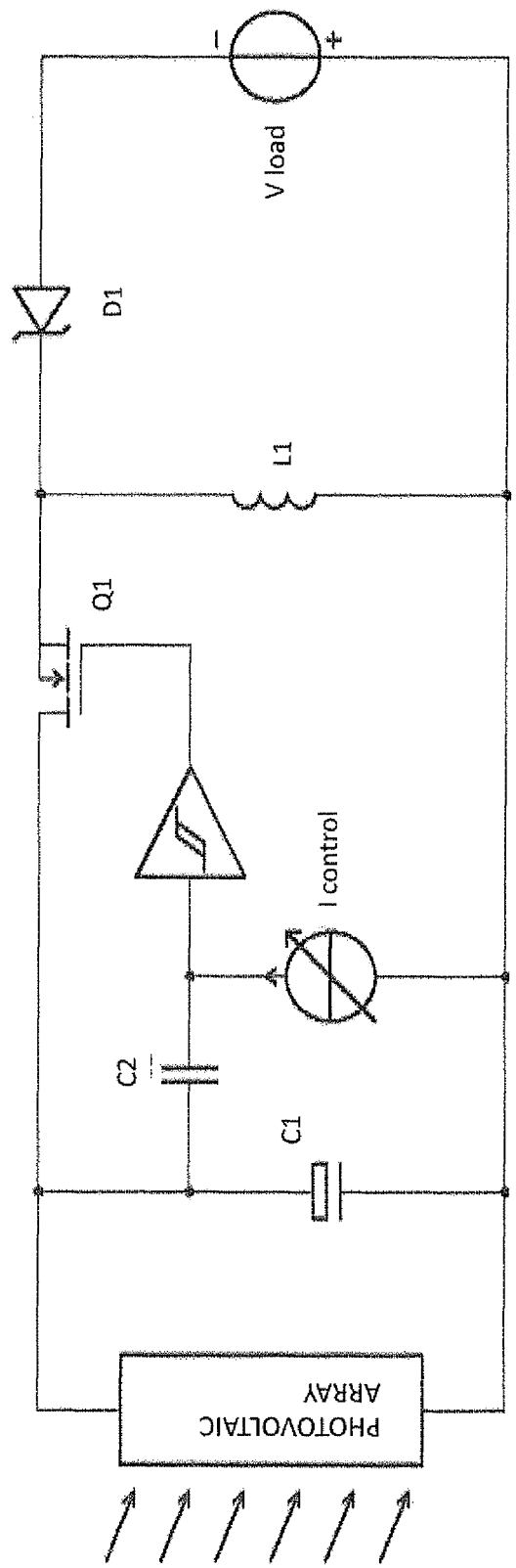
FIG. 15 shows the schematic diagram modified to incorporate an integrating function for use in the MPPT control loop, according to one embodiment of the invention.

According to another embodiment, this topology can also be modified to incorporate an integrating function for use in the MPPT control loop. (see FIG. 15)

Figure 16:
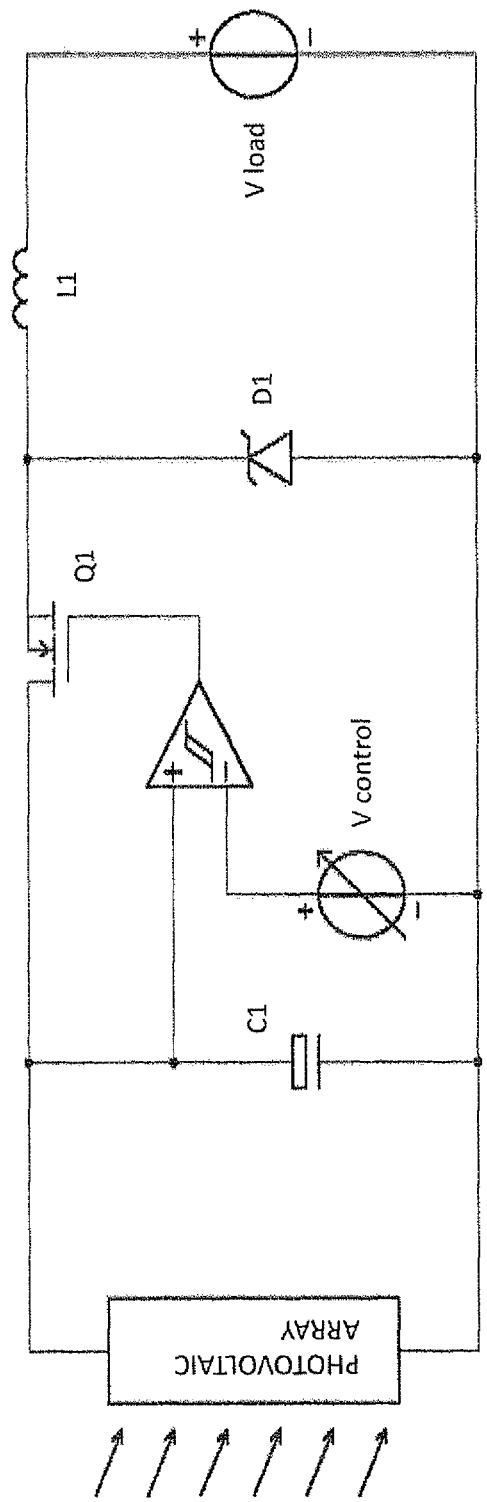
FIG. 16 shows the schematic diagram for hysteretic control of the input voltage incorporating the Buck converter, according to one embodiment of the invention.

In a further embodiment, the topology that can be used for hysteretic control of the input voltage is the Buck converter (see FIG. 16). In this implementation the output voltage is always smaller than the PV voltage. Also here the ESR of capacitor C1 must be very low. Special precautions have to be taken in this specific case to avoid reverse current from the load into the PV panel when insolation conditions are too low for the PV panel to maintain sufficient voltage.

Regarding the diagrams, in a physical implementation the gate drive signal for the MOSFET cannot be taken directly from the output of the Schmitt-trigger. Since the source of the MOSFET is not at a fixed voltage level in these variants, some means of level shifting needs to be applied to the gate drive signal. For sake of clarity and because it has no fundamental influence on the properties this has been omitted in the schematic diagrams.

Figure 17:
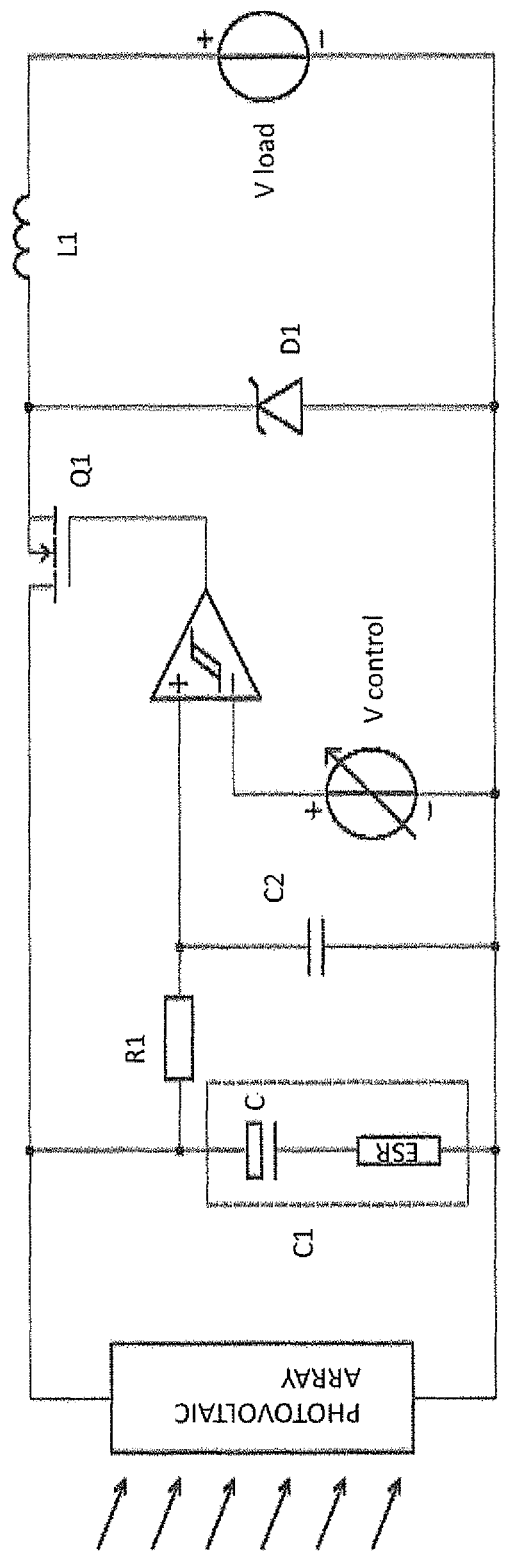
FIG. 17 shows schematic diagram of a low pass filter to the input of the Schmitt-trigger for a variant of the Buck, according to one embodiment of the invention.

In contrast to the boost topology with hysteretically controlled input voltage, where the ESR of the input capacitor C1 is an essential parameter that helps determining the oscillation frequency, in these two alternatives the ESR needs to be very small in order to operate properly. This is due to the fact that the inductor current is flowing alternately through C1 and D1 and hence a pulse shaped voltage is developed across the ESR of capacitor C1. If the amplitude of this voltage is larger than the hysteresis window of the Schmitt-trigger, this will result in oscillation at an undefined high frequency. This depends on the value of the ESR and the maximum inductor current. A way to relax the requirements for the ESR of capacitor C1 is to apply a low pass filter to the input of the Schmitt-trigger. FIG. 17 shows this for the Buck variant. The filter time constant will become part of the equation that determines the switching frequency of the converter. The average input voltage will still be determined by $V_{control}$.

Figure 18:
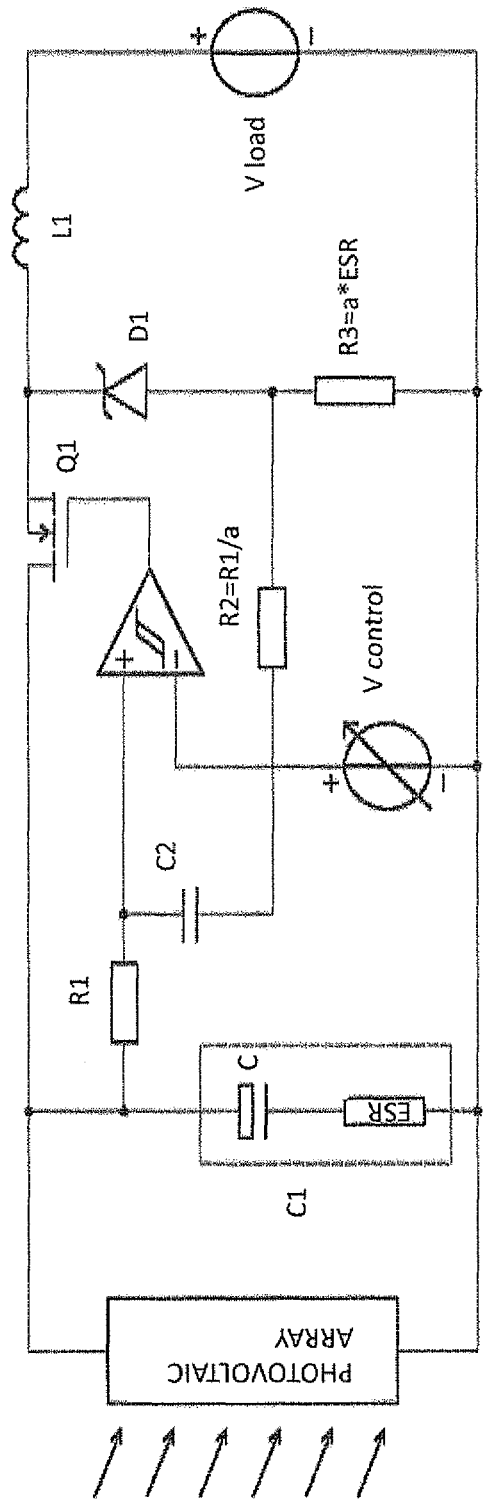
FIG. 18 shows schematic diagram for compensation of the pulse shaped voltage at the input of the Schmitt-trigger using the Buck variant, according to one embodiment of the invention.

In another embodiment, the method is to compensate the pulse shaped voltage at the input of the Schmitt-trigger. An example of how this can be done in the Buck variant is shown in FIG. 18. A resistor with a value of a *ESR is placed in series with diode D1. 'a' is a fraction representing the ratio of ESR and R3. If the ratio of R1 and R2 is chosen correctly the pulse shaped voltage across the ESR of capacitor C1 will be cancelled by the voltage across R3. Similar compensation techniques can be applied to the Buck-boost variant.

Simulations have been performed in order to demonstrate the effect of using multiple MPPTs in an arrangement. For these simulations the previous ripple correlation control (RCC) maximum power point tracker circuit by the inventor has been used with slight modifications.

Figure 22:
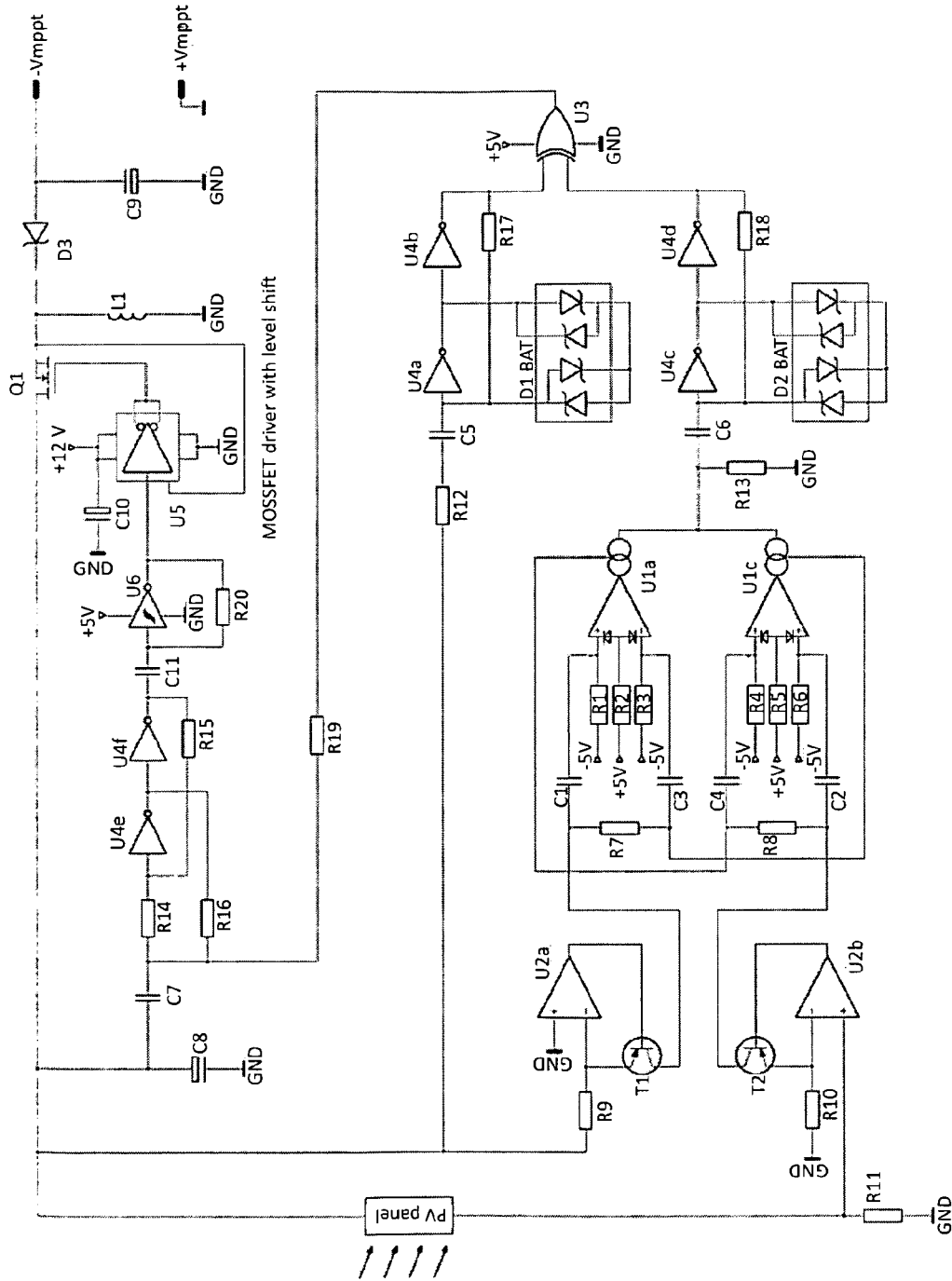
FIG. 22 shows circuit diagram of one MPPT and its PV panel, according to one embodiment of the invention.

According to one embodiment of the current invention, instead of a power section based on the boost topology, here the Buck-boost variant has been used. The MPPT control circuitry has not been changed. The circuit diagram of one MPPT and its accompanying PV panel is shown in FIG. 22.

Figure 19:
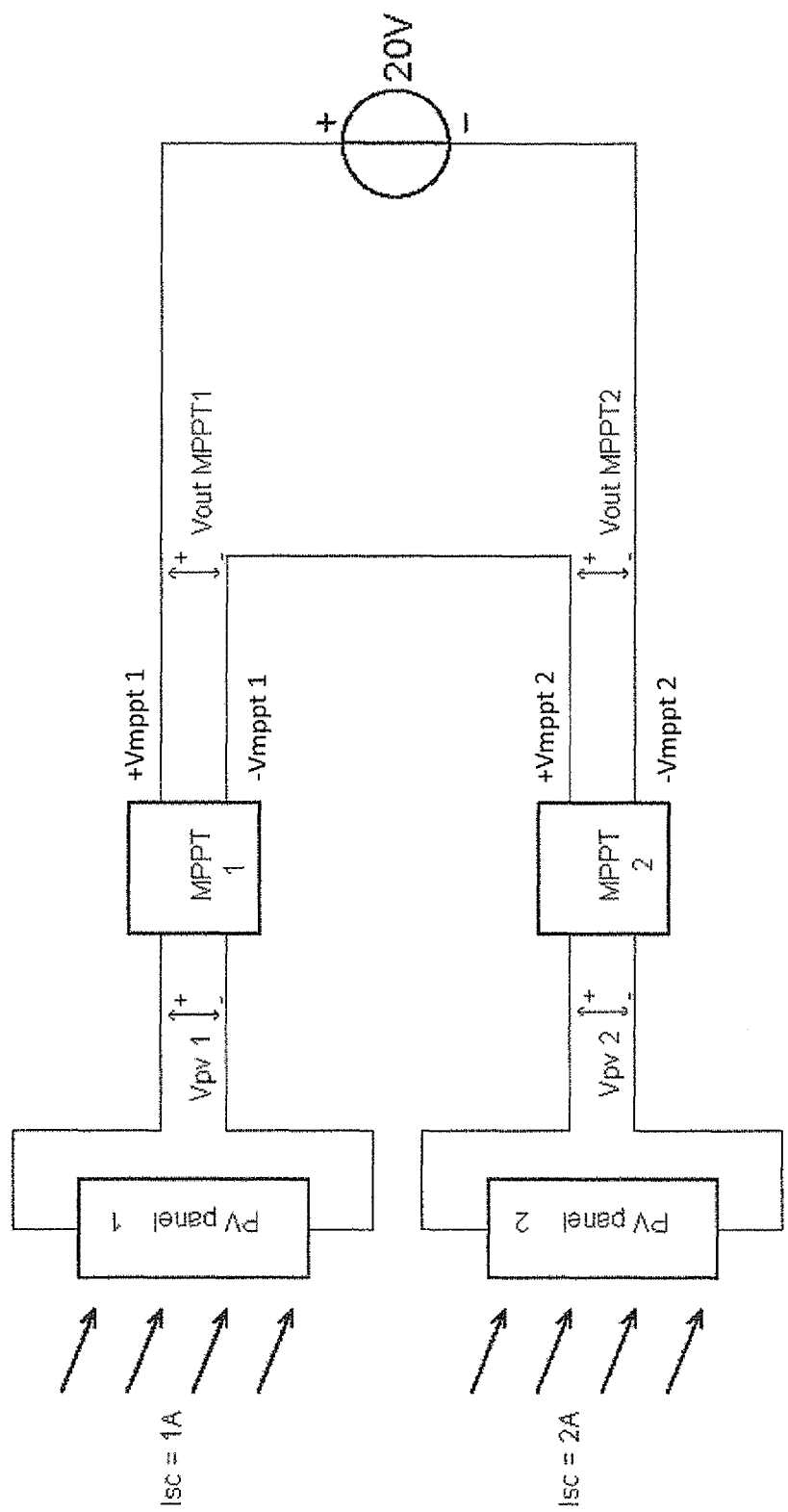
FIG. 19 shows a schematic diagram of the outputs of two of the circuits shown in FIG. 22 connected in series, according to one embodiment of the invention.
Figure 20:
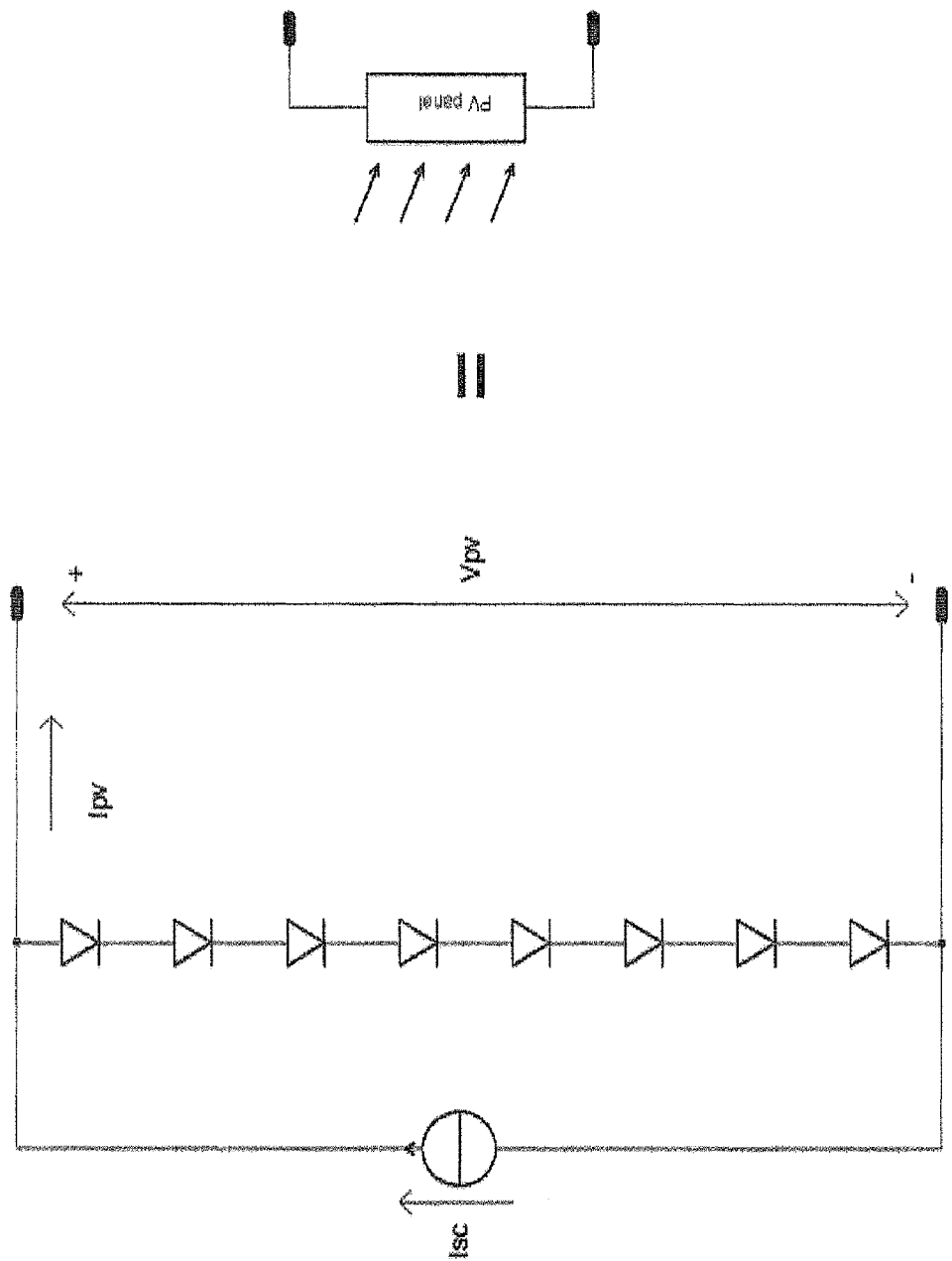
FIG. 20 shows the schematic diagram of the simulation model for the PV panel, according to one embodiment of the invention.
Figure 21:
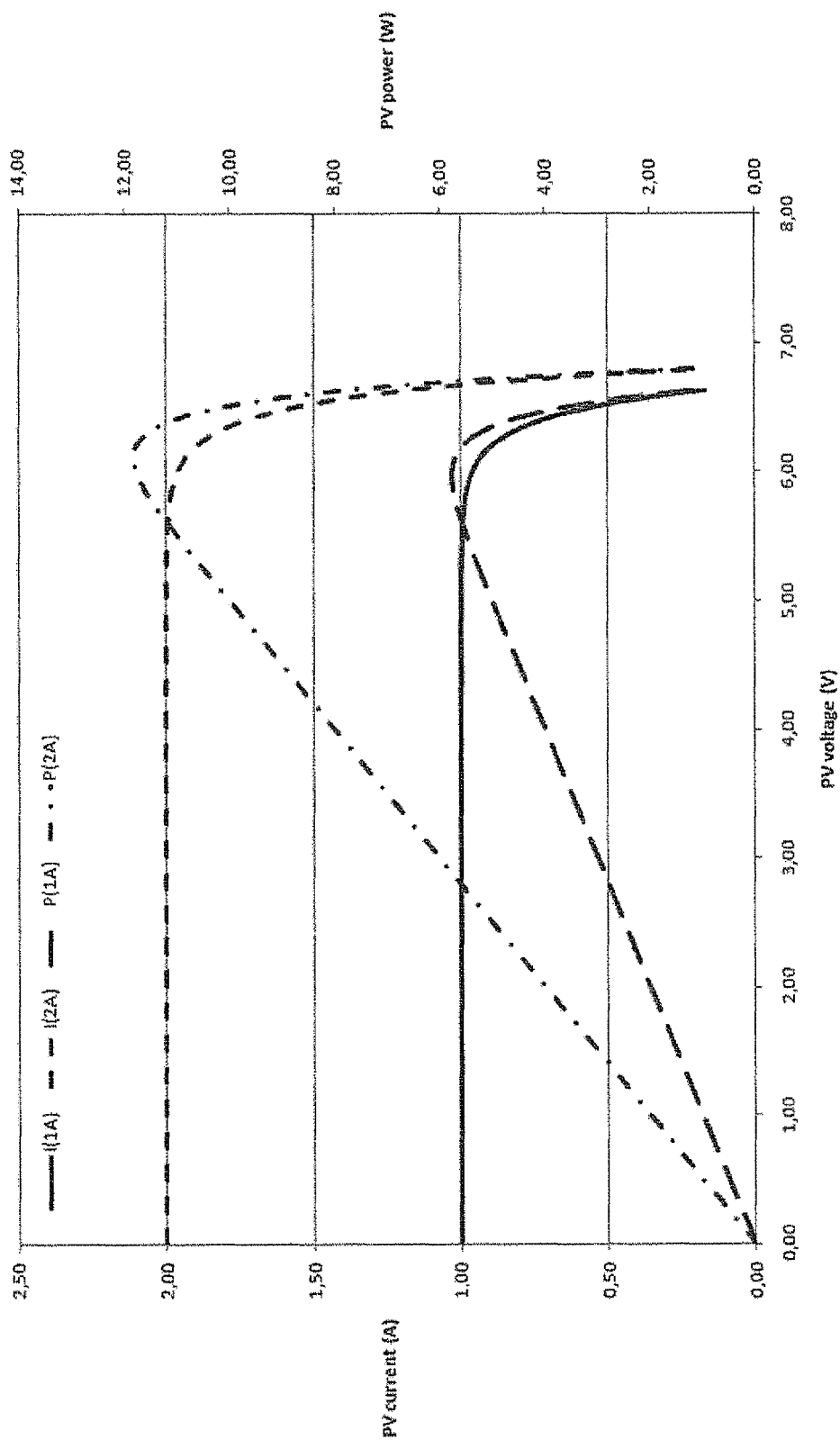
FIG. 21 shows a graph of current vs. voltage and the power vs. voltage characteristics, of the PV panel simulation model, the circuit diagram of which is shown in FIG. 20.

In the example simulation model, the outputs of two of these circuits have been connected in series. This combination is connected to a 20V constant voltage type load. This is shown in the block diagram of FIG. 19. For the PV panel connected to each MPPT, the model includes a current source $I_{SC}$, shunted by a string of 8 silicon diodes. FIG. 20 shows a schematic of the circuit diagram of the model. The current vs. voltage and the power vs. voltage characteristics are shown in the graph of FIG. 21. Both are given for two values of $I_{SC}$. In the simulation, PV panel 1 is given an initial value of 1 A for $I_{SC}$ and PV panel 2 an initial value of 2 A. This mimics different insolation conditions for each PV panel and therefore different output power is to be expected from each MPPT. After 4.5 ms have elapsed, the values of $I_{SC}$ are gradually reversed over a time span of 3 ms.

Figure 23A:
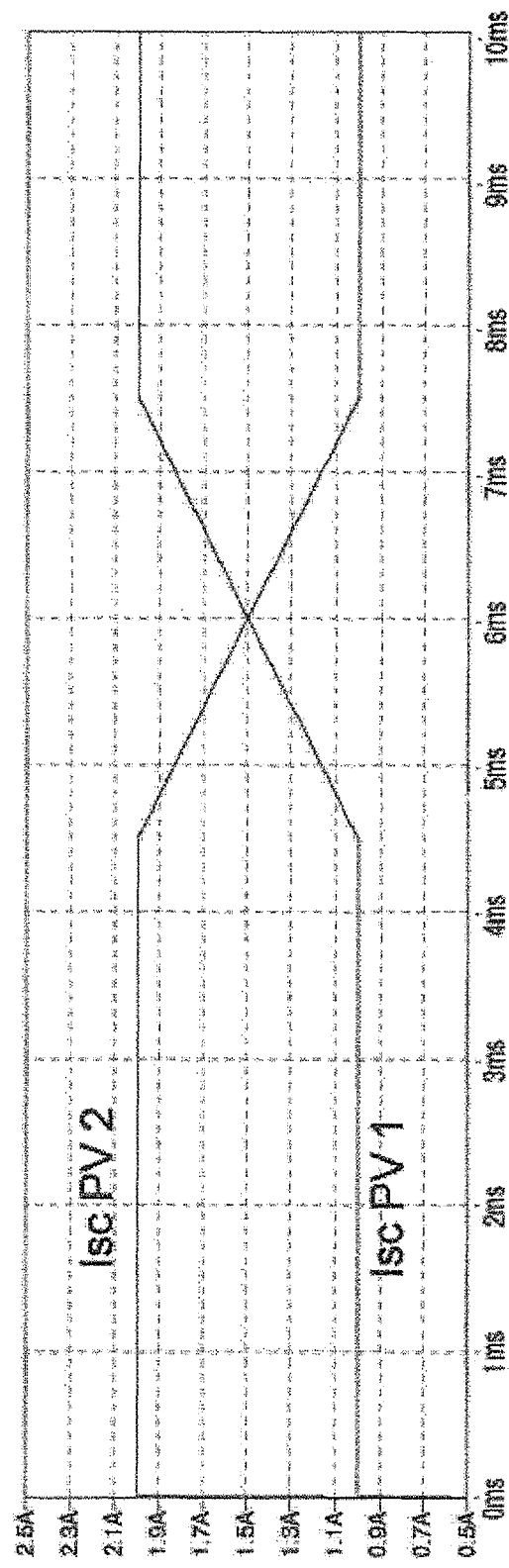
FIGS. 23a-23d show the simulation results, according to one embodiment of the invention.
Figure 23B:
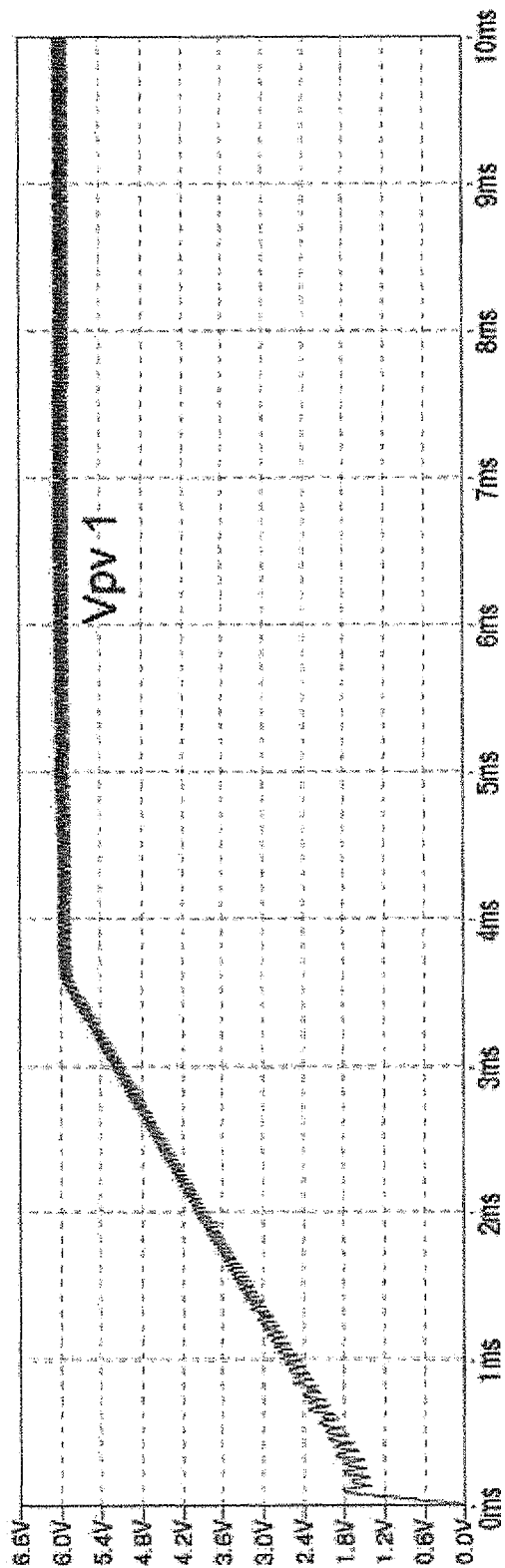
Figure 23C:
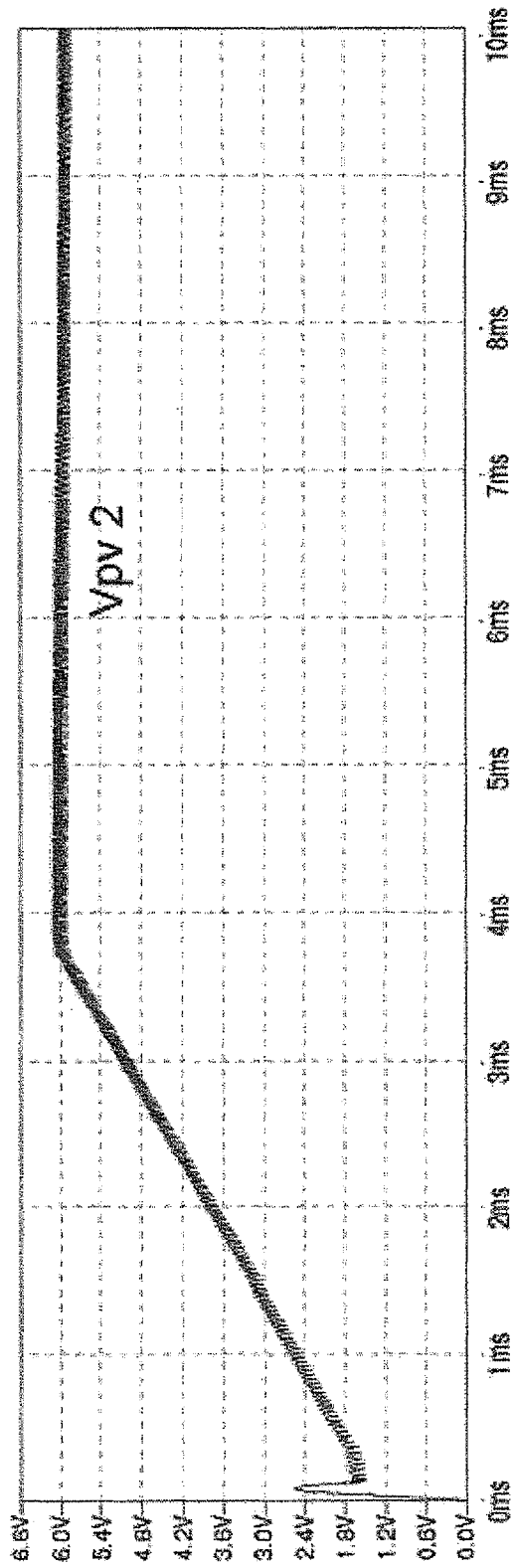
Figure 23D:
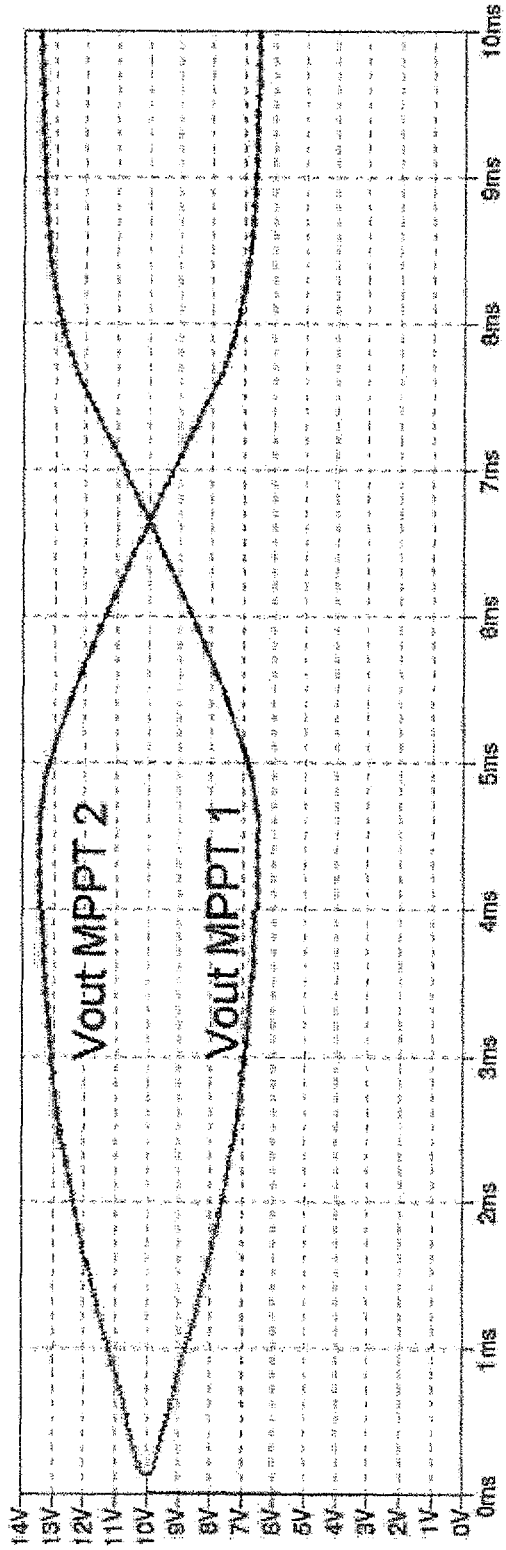

FIGS. 23a-23d show the simulation results. The graph in FIG. 23a shows the value of $I_{SC}$ for both PV panel models. This can be interpreted as changing insolation conditions over time for both panels. In the next two graphs (FIGS. 23b-23c) the development of the PV voltages after startup is plotted. It can be seen that both PV voltages converge smoothly to their individual maximum power points without affecting one another. They also remain at the MPP during and after the gradual reversal of the individual insolation conditions. The graph in FIG. 23d shows the output voltages of each MPPT. The sum of these two voltages remains equal to the 20V constant voltage load at any point.

The overall power yield from solar arrays can be improved by applying maximum power point tracking to each individual PV panel in the array. Summing the output power from these separate MPPTs can be done by connecting them in a series and parallel arrangement in a similar way as with conventional PV arrays. This, however, introduces the risk of unwanted interaction between the control loops of the individual MPPTs if no special measures are taken. Typically complex control algorithms must be used to avoid such problems.

If a power section with hysteretically controlled input voltage is employed in an MPPT, the control loop will become immune for changes in the output voltage. This implies that these MPPTs will not mutually influence each other when used in series and parallel arrangements. Their output voltage and current will inherently settle at the correct point on its curve of constant power without perturbing its MPPT control loop.

According to one embodiment of the invention, adaptive current sensing for the maximum power point tracker is provided. In a typical maximum power point tracker a sense resistor is used for measuring the PV current. The value of this resistor is a compromise between acceptable power loss in the resistor and sufficient measuring sensitivity. Excessive power loss will result in poor efficiency of the MPPT. Low measuring sensitivity will deteriorate MPP tracking performance. The optimal compromise is typically chosen for the nominal output power of the PV array. At lower power levels however, the measuring sensitivity decreases.

By using an adaptive current sense resistor, the compromise between power loss and sensitivity can be adjusted to the actual output power of the PV array. This can be done by controlling the value of the sense resistor in discrete steps or in a continuous way. By doing so, the measuring sensitivity for changes in the point of operation, can be made independent of the insolation conditions. Hence the tracking performance will become uniform for all conditions.

In a further embodiment the use of adaptive current sensing opens the possibility for an improved RCC circuit implementation that can do without multipliers.

In pursuit of finding the maximum power point, a generic MPPT imposes perturbations on the point of operation of the PV array. The effect of these perturbations is used to extract information about the position of the maximum power point. Depending on the point of operation, the perturbations will affect both PV voltage and PV current to some extent.

Figure 24:
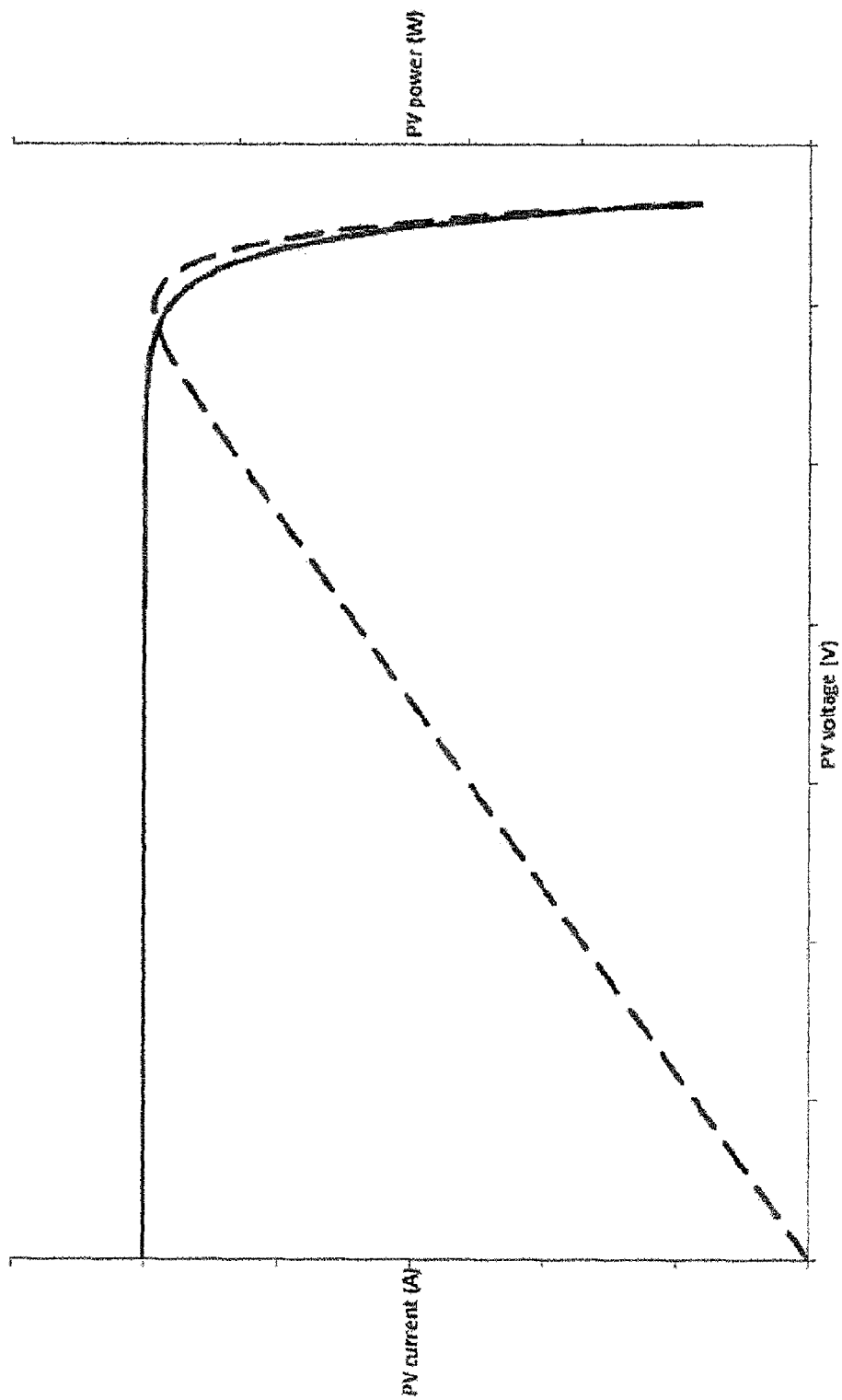
FIG. 24 shows the characteristics of an arbitrary PV array, according to one embodiment of the invention.

According to one embodiment, the maximum power point of a PV array can be defined as the electrical point of operation where output power is maximized. FIG. 24 shows the characteristics of an arbitrary PV array. The solid line represents the output current vs. voltage while the dashed line reflects the output power as a function of voltage.

The PV current can be defined by:

$$I_{pv}=f(V_{pv})$$

The output power $P_{pv}$ is given by the product of $I_{pv}$ and $V_{pv}$, hence $$P_{pv}=V_{pv}\cdot f(V_{pv})$$

At the point of maximum power the derivative $dP_{pv}/dV_{pv}$ is equal to zero. Applying the chain rule to this derivative yields:

$$\frac{dP_{pv}}{dV_{pv}} = V_{pv} \cdot \frac{df(V_{pv})}{dV_{pv}} + f(V_{pv}) = 0$$

Substituting $I_{pv}$ shows that at the MPP the following relationship must be valid:

$$V_{pv} \cdot dI_{pv} = -I_{pv} \cdot dV_{pv}$$

This implies for small perturbations near the MPP:

$$V_{pv} \cdot \Delta I_{pv} \approx -I_{pv} \cdot \Delta V_{pv}$$

or $$\frac{V_{pv}}{\Delta V_{pv}} \approx -\frac{I_{pv}}{\Delta I_{pv}}$$

In this relationship $V_{pv}$ and $I_{pv}$ can be considered the point of operation of the PV array. $\Delta V_{pv}$ and $\Delta I_{pv}$ reflect the perturbation of the operating point. It shows that at the MPP the ratio between the PV voltage and its perturbation is approximately equal to the ratio between PV current and its perturbation.

Figure 25:
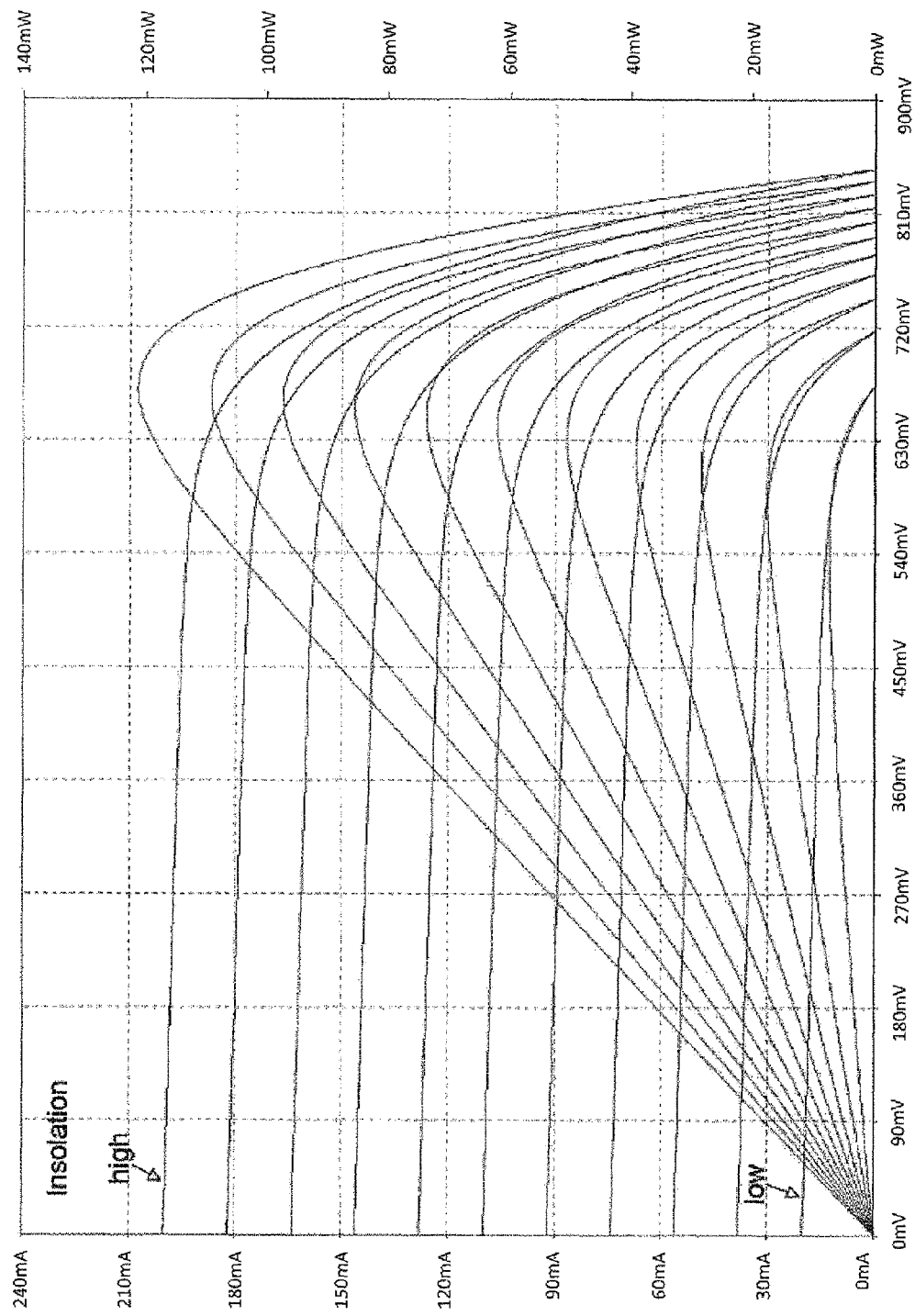
FIG. 25 shows the characteristics of a typical PV cell for varying insolation conditions, according to one embodiment of the invention.

FIG. 25 shows the characteristics of a typical PV cell for varying insolation conditions. From this it can be noticed that the voltage of the PV cell at its MPP is affected only slightly by the rate of insolation. The position of the peak in the power curves varies from approximately 540 mV to 670 mV along the voltage axis in this example. The current on the other hand, shows a major difference between minimum and maximum insolation conditions. In the same example it ranges from approximately 15 mA to 180 mA. The peak of the power curves themselves ranges from 8 mW to 120 mW. From this example it becomes clear that changes in maximum output power from the PV array are mainly reflected in the output current and to a much lesser extent in the voltage.

In order to keep the point of operation acceptably close to the MPP, the perturbations in both voltage and current must be kept small compared to $V_{pv}$ and $I_{pv}$ respectively. Ideally, the relative perturbations should be independent of the rate of insolation. Since $V_{pv}$ at the MPP is fairly constant and doesn't change much with insolation conditions, it makes sense to keep $\Delta V_{pv}$ also constant. This implies that $\Delta I_{pv}$ will change approximately proportional with $I_{pv}$ as insolation conditions vary.

In a practical MPPT the PV current is typically measured using a sense resistor. This resistor inevitably reduces efficiency of the MPPT as it consumes some of the power. From this point of view the sense resistor needs to be kept as small as possible. If the resistance is chosen too low however, measuring sensitivity also becomes low. This will adversely affect the signal to noise ratio of the measurement and as a consequence deteriorate the MPP tracking accuracy. Usually this trade-off is optimized for the nominal output power of the PV array. If output power is lower due to lower insolation, this may not be the best compromise. As previously shown, the PV current drops approximately linearly with decreasing output power. If changes in $\Delta I_{pv}$ are proportional with the change of $I_{pv}$ itself, then $\Delta I_{pv}$ will also drop linearly with decreasing output power. For a given perturbation of the PV voltage, the perturbation of the PV current becomes less and hence the overall measuring sensitivity for changes in the point of operation has decreased. The power loss in the sense resistor drops quadratically with decreasing current. This implies that for lower insolation conditions the trade-off between dissipation in the sense resistor and measuring sensitivity shifts in favor of the first.

Turning now to adaptive current sensing, in order to maintain the measuring sensitivity under varying conditions, the sense resistor can be made dependent of those conditions. Depending on the measured current from the PV array, the MPPT control algorithm or circuitry can adjust the value of the sense resistor. In this way the current measuring sensitivity can be made higher if insolation gets lower, thereby compensating for the decreased amplitude of $\Delta I_{pv}$.

Figure 26:
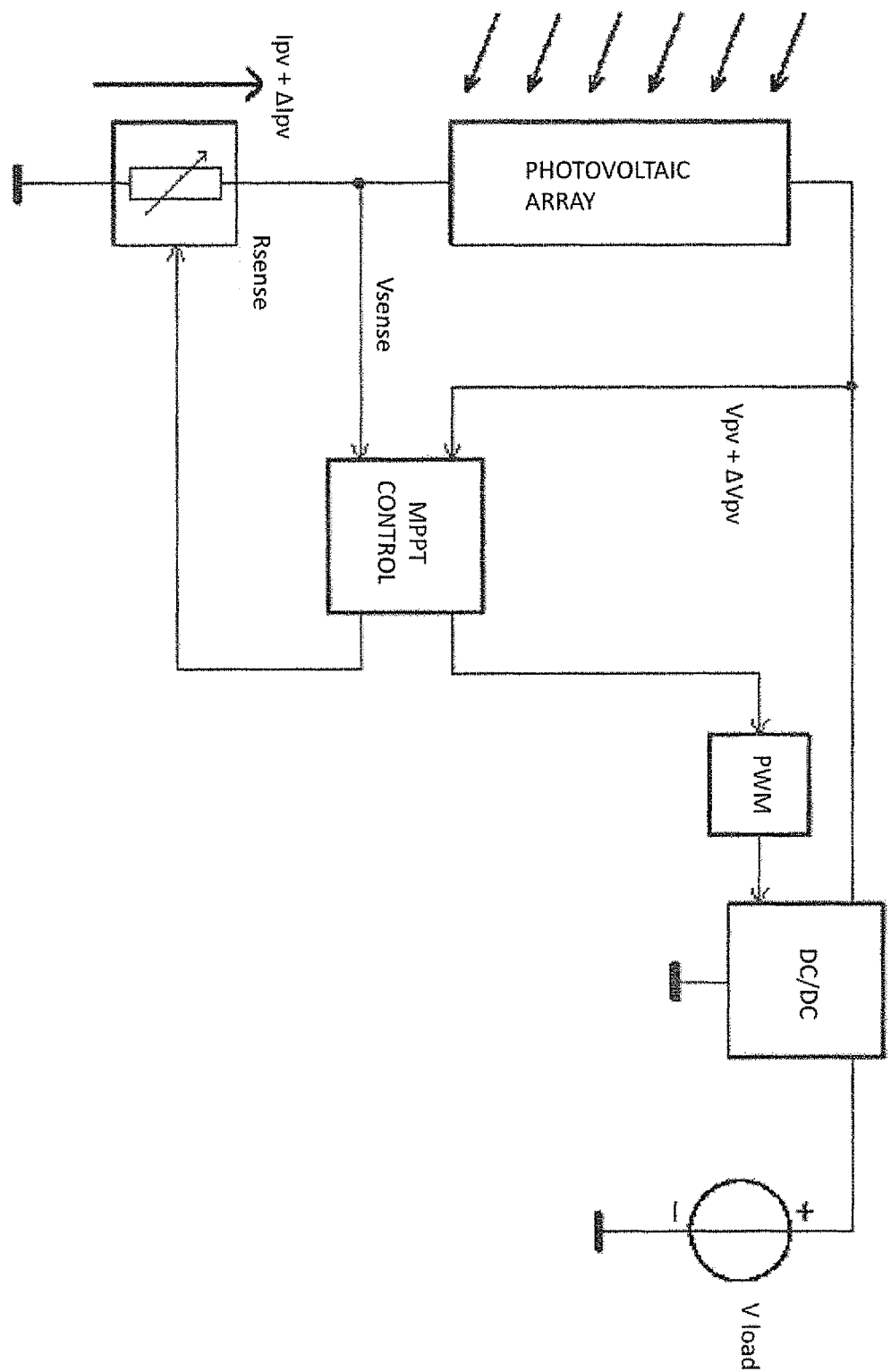
FIG. 26 shows a generic schematic diagram of a MPPT with an adaptively controlled sense resistor, according to one embodiment of the invention.

A generic block diagram of a MPPT with an adaptively controlled sense resistor is shown in FIG. 26. The MPPT control block sets the value of the sense resistor based on its measurement of PV current. At high levels of PV current, $R_{sense}$ is set at a low ohmic value in order to avoid excessive dissipation in the resistor. If $\Delta V_{pv}$ is kept constant then $\Delta I_{pv}$ will be maximal under these conditions and hence measuring sensitivity will be sufficient despite of the low value of $R_{sense}$. For low levels of PV current $R_{sense}$ is set at a higher value to increase measuring sensitivity. Since dissipation in the resistor drops quadratically with decreasing current, the higher value can be tolerated. This can be illustrated with the following example.

Suppose the PV current drops by a factor of 2. In order to compensate for the loss in sensitivity the value of $R_{sense}$ is made twice as large by the MPPT control system. As a result of this, the power dissipation in $R_{sense}$ drops by a factor of 2. Since the output voltage of the PV panel at its MPP is roughly constant, the output power is also approximately half of what it was before the decrease in current. This means that the power loss in the resistor relative to the output power has not changed substantially.

The value of $R_{sense}$ should not respond to intentional changes in the PV current caused by $\Delta I_{pv}$. Consequently the velocity at which $R_{sense}$ is changed should be slow compared to the perturbations imposed by the MPPT control system. Therefore the control of $R_{sense}$ should respond to the average value of the PV current.

Figure 27:
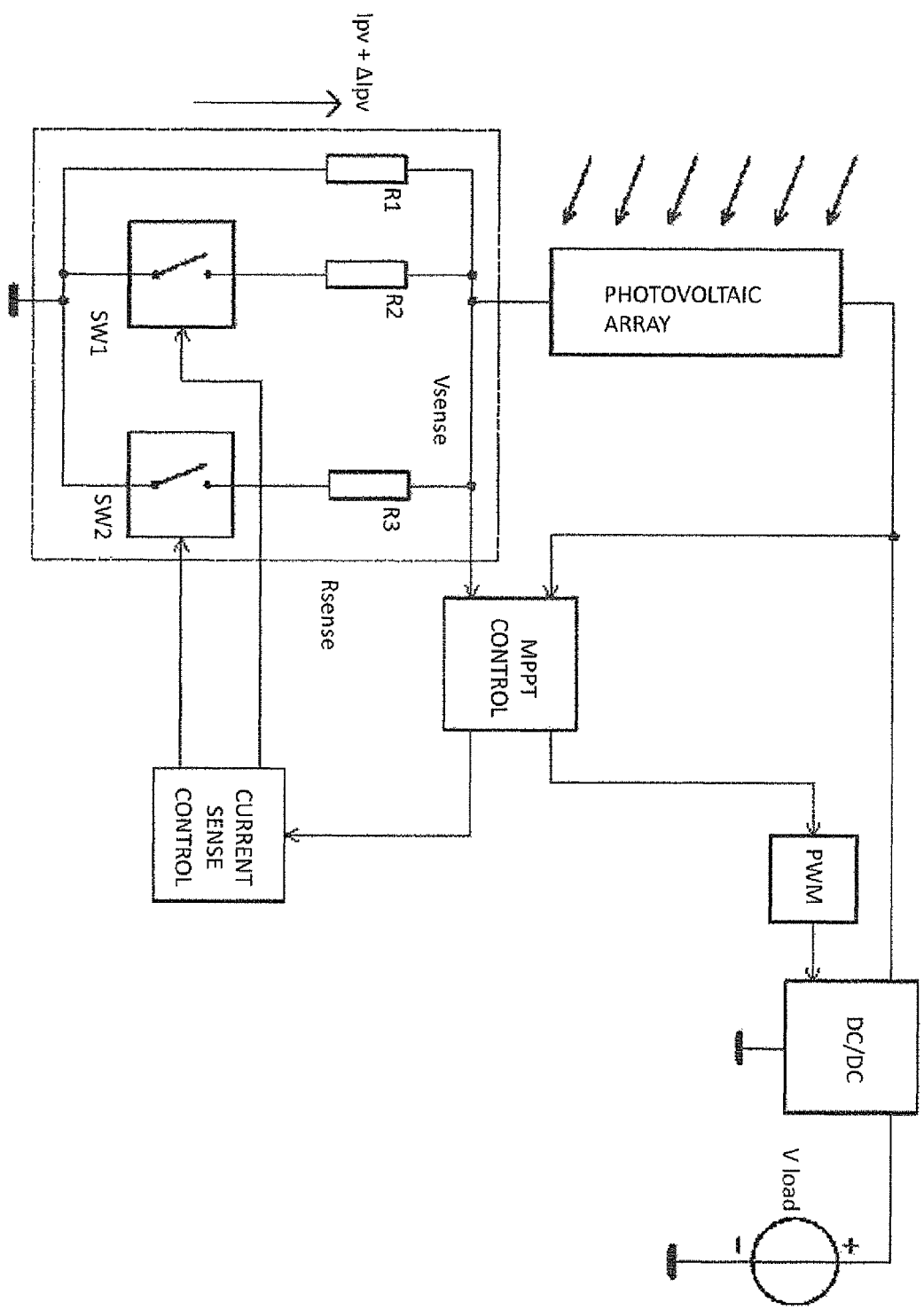
FIG. 27 shows a schematic diagram of implementing a variable current sense resistor by using an arrangement of switchable resistors, according to one embodiment of the invention.

According to the invention, one embodiment of implementing a variable current sense resistor is by using an arrangement of switchable resistors. The diagram in FIG. 27 shows an example of this. In this example four discrete values for $R_{sense}$ are possible by controlling switches SW1 and SW2. In a physical implementation the switches can be realized with MOSFETs. It may even be possible to utilize the channel resistance of the MOSFET itself ($R_{DSON}$) as the actual sensing resistor. In that case R2 and R3 are not needed and smaller inexpensive MOSFETs can be used.

This type of variable sense resistor is well suited for MPPT algorithms that are implemented in software. Based on the measurement of PV current, the algorithm can choose the most suitable resistance and apply proper hysteresis to the decision boundaries. By doing so, the compromise between power loss in the sense resistor and MPP tracking accuracy can be optimized for varying insolation conditions.

Figure 28:
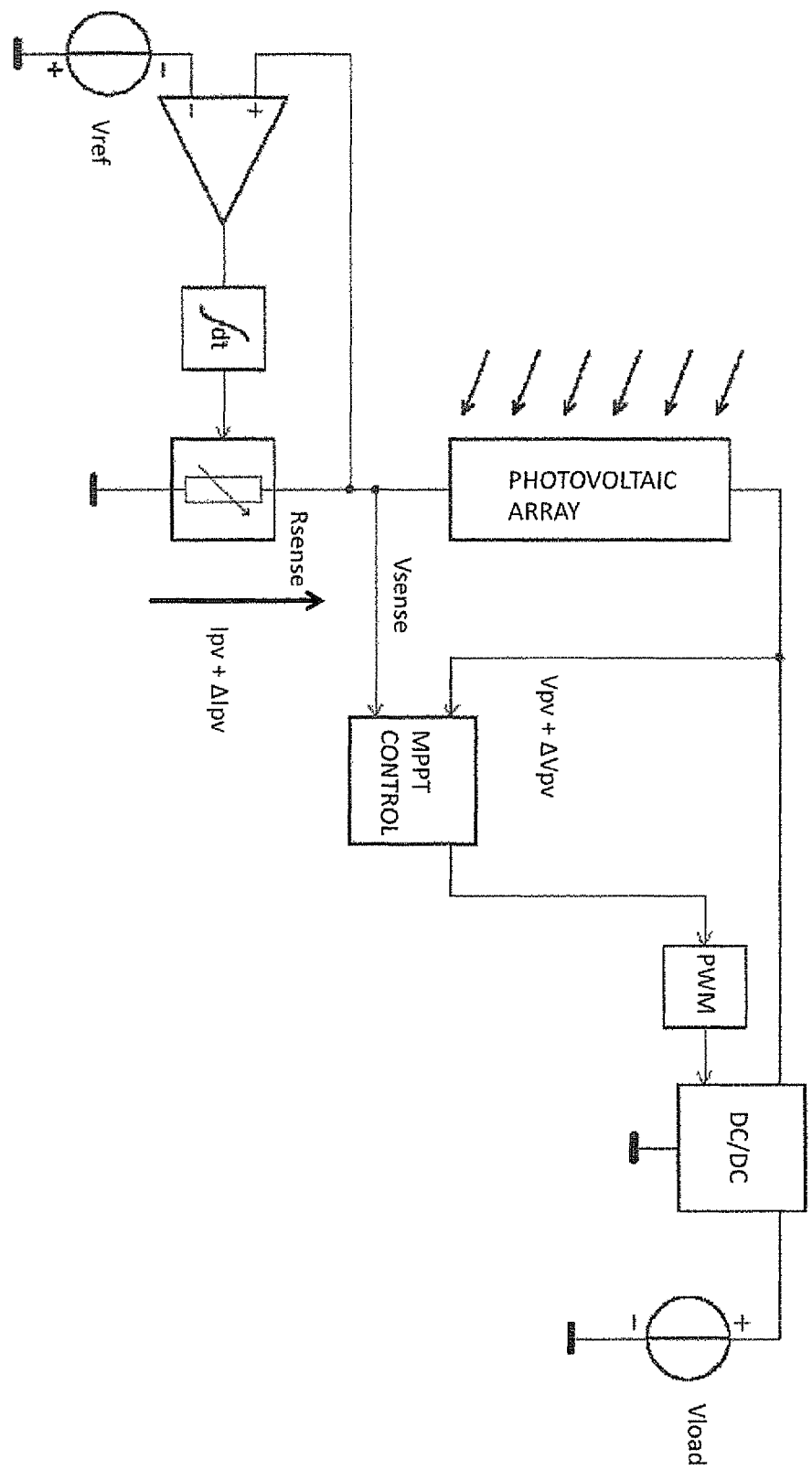
FIG. 28 shows a schematic diagram of an implementation of $R_{sense}$ as a variable resistor that can be controlled in a continuous manner, according to one embodiment of the invention.

An alternative method is shown in FIG. 28. In this implementation $R_{sense}$ is a variable resistor that can be controlled in a continuous manner. As will be shown later, such a continuously variable resistor can be realized by using a MOSFET in its pre-pinch-off region. An error amplifier and an integrator control the value of $R_{sense}$ in order to keep the average voltage across it, at a constant level, where this level is determined by a reference voltage $V_{ref}$. This will make the average voltage across the sense resistor independent of the PV current. The effect is that the value of $R_{sense}$ will become inversely proportional with the average PV current. Perturbations in the PV current ($\Delta I_{pv}$) will encounter the same resistance and develop a voltage across it. Hence the measuring sensitivity for $\Delta I_{pv}$ will also become inversely proportional to the average PV current.

$$R_{sense} = \frac{V_{ref}}{I_{pv}}$$

And hence:

$$V_{sense} = -V_{ref} - \frac{V_{ref}}{I_{pv}} \cdot \Delta I_{pv}$$

The MPPT will now converge to the point where:

$$-V_{pv} \cdot \frac{V_{ref}}{I_{pv}} \cdot \Delta I_{pv} = V_{ref} \cdot \Delta V_{pv}$$

This is equivalent to the previously derived relation at the MPP:

$$V_{pv} \cdot \Delta I_{pv} = -I_{pv} \cdot \Delta V_{pv}$$

Figure 31:
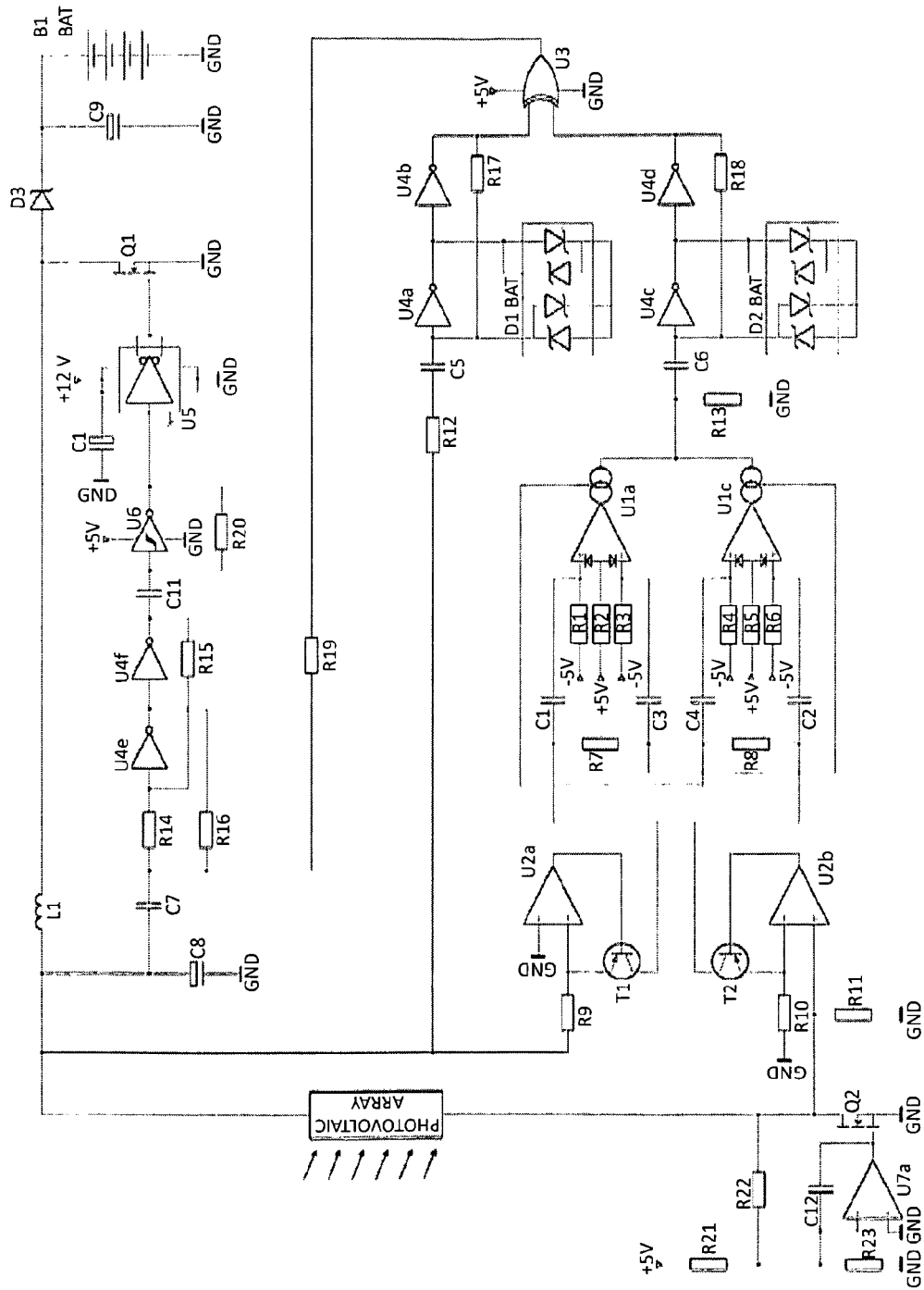
FIGS. 31-32 show circuit diagrams of prototypes that were implemented and tested, according to one embodiment of the invention.

An implementation of this method has been tested in a prototype. The circuit diagram is shown in FIG. 31. The circuit is based on a previous RCC MPPT prototype by the inventor. The only difference is that current measuring resistor R11 has been increased in value and is paralleled by a MOSFET in order to allow for a variable resistance. The MOSFET (Q2) is used in the third quadrant of its output characteristic and operates in its pre-pinch-off region. An integrator built around U7a controls the gate voltage of Q2 in order to keep its drain voltage at approximately −100 mV. This is the same voltage that would have been across R11 in the original circuit at the nominal PV current of 2 A. Since the drain voltage is well below the forward conduction voltage of the intrinsic body diode of the MOSFET it will act as a linear resistor. Op-amp U7a can be an inexpensive low power device as it's only used for low speed integration. The channel resistance ($R_{DSON}$) of the MOSFET at full turn on must be smaller or equal to the minimum required sense resistance, in this case 50 mΩ.

Remarkable in this implementation is that the MPPT control system has no information as to what the actual value of $R_{sense}$ is. The channel resistance of the MOSFET has a non-linear relation with its gate voltage and is also temperature dependent. Consequently there's no signal available in the circuit that represents the actual value of PV current. The voltage developed across the variable sense resistance is equal to $R_{sense} \cdot (I_{pv} + \Delta I_{pv})$ where $R_{sense}$ is unknown. Since the MPPT relies on the ratio between $I_{pv}$ and $\Delta I_{pv}$ only, this is of no concern to its proper functioning. The improvement with respect to the version with a fixed current sense resistor is due to the level of the current sense signal being fixed and independent of the PV current. This causes the gain of OTA U1a to be independent of the PV current also. As discussed above, the perturbation of the PV voltage ($\Delta V_{pv}$) is fixed due to the hysteretic mode of operation of the converter section. Due to the adaptive sense resistor and because the PV voltage is only modestly dependent on insolation conditions, the measuring signal representing $\Delta I_{pv}$ will have nearly constant amplitude. The overall result is that the output current amplitude of both OTAs is nearly independent of the PV current. Hence the measuring sensitivity for perturbations in the PV array's point of operation is made independent of the insolation conditions.

The effect of adaptive current sensing in the prototype of FIG. 31 is that the DC voltage across the sensing resistor is normalized at a constant level set by a reference voltage. As a result of this, the current flowing into the amplifier bias pin of OTA U1a will also become fixed and hence so will its gain. The gain of the other OTA (U1c) still depends on the PV voltage. Although the changes in $V_{pv}$ are relatively small compared to the changes in $I_{pv}$, this OTA still has a variable gain that depends on the insolation conditions. As discussed above, FIG. 6 shows the block diagram of the RCC MPPT. The multipliers in this block diagram represent the OTAs in the real circuit. With adaptive current sensing, multiplier M2 is rendered a fixed gain factor and hence doesn't need to be a multiplier.

Figure 29:
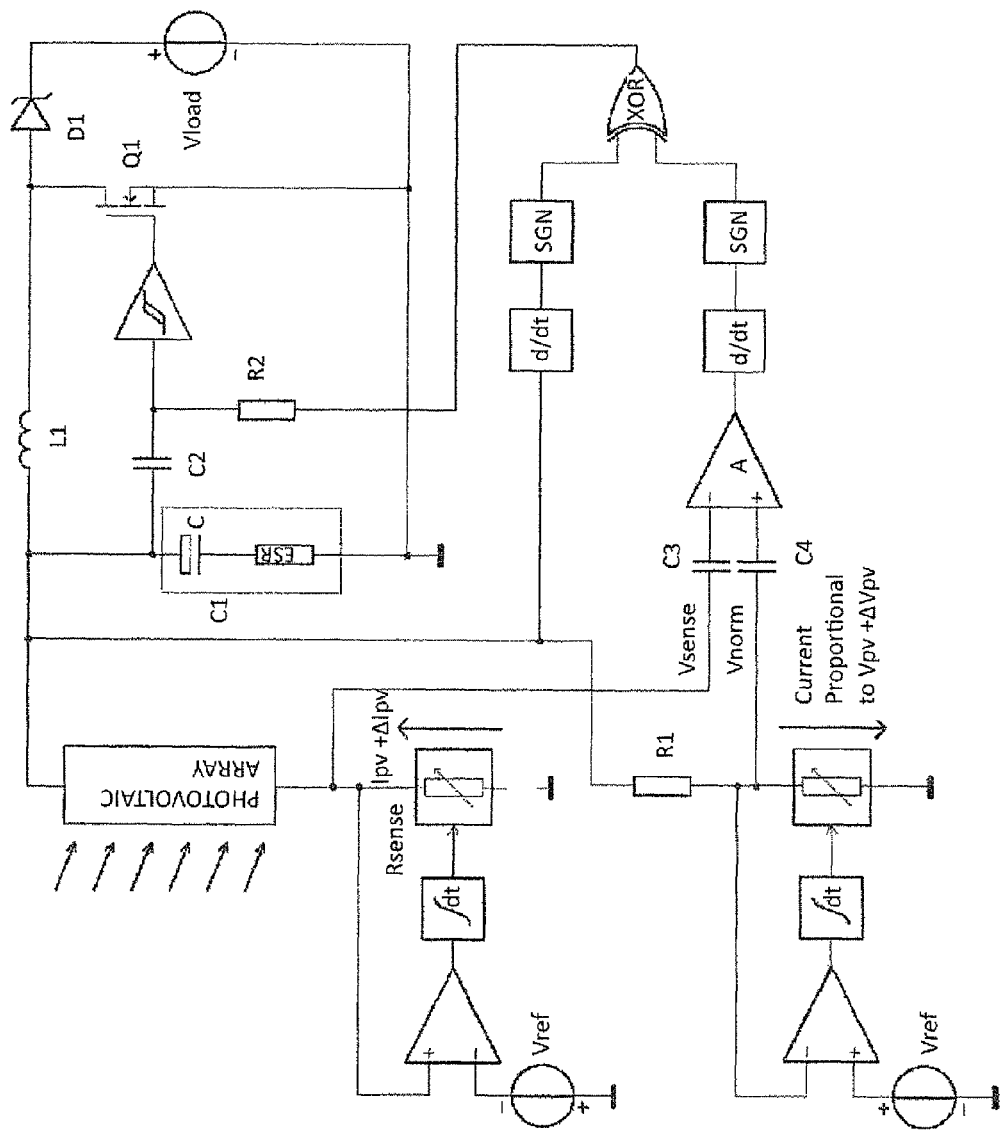
FIG. 29 shows a schematic diagram of an RCC MPPT without any multiplier, according to one embodiment of the invention.

The same principle of normalizing the DC level of the measuring signal by using a continuously variable resistor can be applied to the PV voltage. Since the deviation in $V_{pv}$ is not large, compensating for reduced measuring sensitivity is not an argument here. If the measuring signal for $V_{pv}$ would also be normalized to have a fixed DC level however, multiplier M1 in FIG. 6 also becomes redundant. This enables the design of a RCC MPPT without any multiplier (FIG. 29).

As derived previously for the PV current sense signal:

$$V_{sense} = -V_{ref} - \frac{V_{ref}}{I_{pv}} \cdot \Delta I_{pv}$$

Analogous the normalized PV voltage signal can be written as:

$$V_{norm} = V_{ref} + \frac{V_{ref}}{V_{pv}} \cdot \Delta V_{pv}$$

If an MPPT control system is fed with these signals it will converge to the point where:

$$-V_{ref} \cdot \frac{V_{ref}}{I_{pv}} \cdot \Delta I_{pv} = V_{ref} \cdot \frac{V_{ref}}{V_{pv}} \cdot \Delta V_{pv}$$

or $$\frac{V_{ref}}{I_{pv}} \cdot \Delta I_{pv} = -\frac{V_{ref}}{V_{pv}} \cdot \Delta V_{pv}$$

If $\Delta V_{sense}$ and $\Delta V_{norm}$ are defined as the perturbations of the normalized current and voltage measuring signals respectively, then:

$$\Delta V_{sense} = -\Delta V_{norm}$$

From this it becomes clear that no multiplications are needed and that the perturbations of the normalized measuring signals carry all relevant information for finding the MPP. In an RCC MPPT the subtraction of these signals can be directly correlated to the PV voltage ripple in order to generate a control signal for driving the operating point of the PV array towards the MPP. This is shown in the block diagram of FIG. 29.

Figure 30:
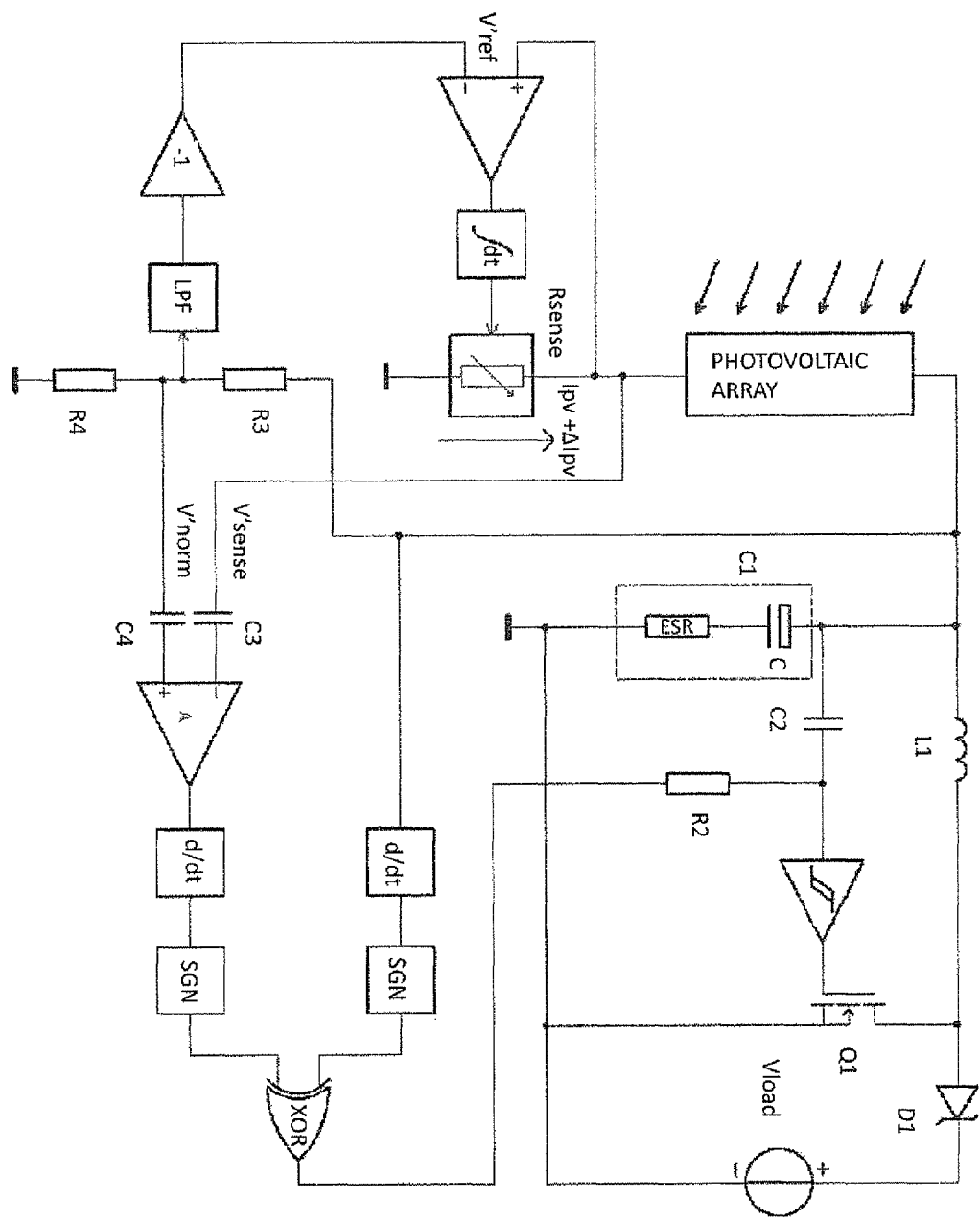
FIG. 30 shows a schematic diagram of the reference voltage derived by low pass filtering the attenuated PV voltage signal, according to one embodiment of the invention.

The value of the reference voltage $V_{ref}$ is arbitrary and its maximum is only determined by the allowed power loss in the variable current sense resistor. If $V_{ref}$ is made proportional to the average value of the PV voltage, the block diagram can even be simplified further. In the diagram of FIG. 30 the reference voltage is derived by low pass filtering the attenuated PV voltage signal. The attenuation $\alpha$ is determined by R3 and R4.

Define:

$$V'_{norm} = \alpha \cdot V_{pv} + \alpha \cdot \Delta V_{pv}$$

Then:

$$V'_{ref} = -\alpha \cdot V_{pv}$$

And $V'_{sense}$ becomes:

$$V'_{sense} = -\alpha \cdot V_{pv} - \frac{\alpha \cdot V_{pv}}{I_{pv}} \cdot \Delta I_{pv}$$

Again if $V'_{sense}$ and $V'_{norm}$ would be fed to a MPPT control system, convergence would occur at the point where $\Delta V'_{sense} = -\Delta V'_{norm}$ and hence no further multiplications are needed in the signal processing.

In the examples of the block diagrams the perturbing signal is the intrinsic ripple generated by the converter itself, but the principle is not limited to this. Any artificially imposed perturbance of the PV voltage can also be used to feed the correlation circuit.

Figure 32:
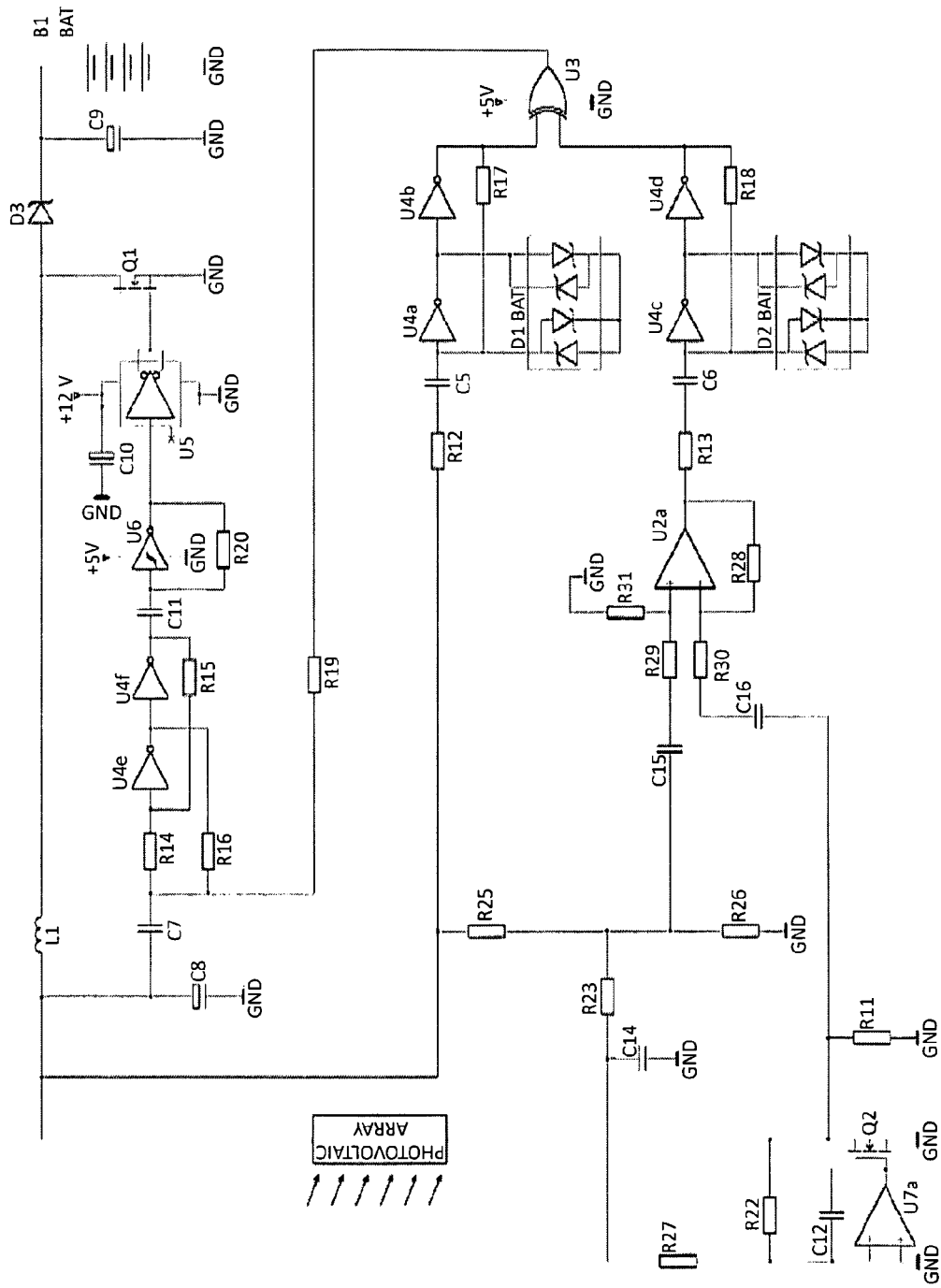

The diagram of FIG. 30 has been implemented in the electronic circuit shown in FIG. 32. The variable resistor is realized with MOSFET Q2. Its gate voltage is controlled by the integrator built around U7a. R25 and R26 determine the attenuation factor $\alpha$. C14 and R23 form the low pas filter. The AC parts of the normalized measuring signals are subtracted by differential amplifier U2a.

Simulations have been performed on the circuit. These show that it converges to the same point of operation as the earlier described embodiment of the RCC MPPT circuit. The principle has also been verified in a prototype.

One category of maximum power point trackers employs the relation between current (or voltage) and absorbed power of the load, to find the maximum power point of the PV array. The boost converter with hysteretically controlled input voltage as discussed above allows for an implementation of such a MPPT with very low complexity. Besides this implementation, a supplemental variant is proposed here.

The principal of this maximizing scheme is not limited to be used with the hysteretically controlled input voltage boost converter only. It can be used with any converter type that utilizes control of its input voltage. In special cases it can also be used with direct control of the converter's PWM duty-cycle. Generic block diagrams of such implementations are provided.

With the addition of a multiplier, the maximizing scheme can also be used in systems that cannot rely on assumptions on the load. In that case a signal related to the output power of the PV panel is used to feed the control loop.

In the topologies according to the invention, a binary signal is required that represents the time-derivative (or its sign) of the momentary power produced by the PV panel. A very elegant method of generating such a signal by using a delta modulator is now disclosed. This method has been successfully evaluated in a prototype.

For an electrical load with positive impedance, both current and voltage will increase with increasing absorbed power. This implies that the maximum current and voltage at the load occur when absorbed power peaks. The majority of load types that are typically connected to the output of MPPTs exhibit positive impedance and thus show this property.

One class of maximum power point trackers employs this property to find the peak in the power curve of the photovoltaic array. The control algorithm or circuitry in these MPPTs will seek to maximize the current or voltage delivered to the load. If this maximum is found then the power delivered to the load will also have reached its maximum. Assuming good efficiency and a monotonic relation between input power and output power of switched-mode converters, this will occur if the PV panel operates at its point of maximum power.

Figure 33:
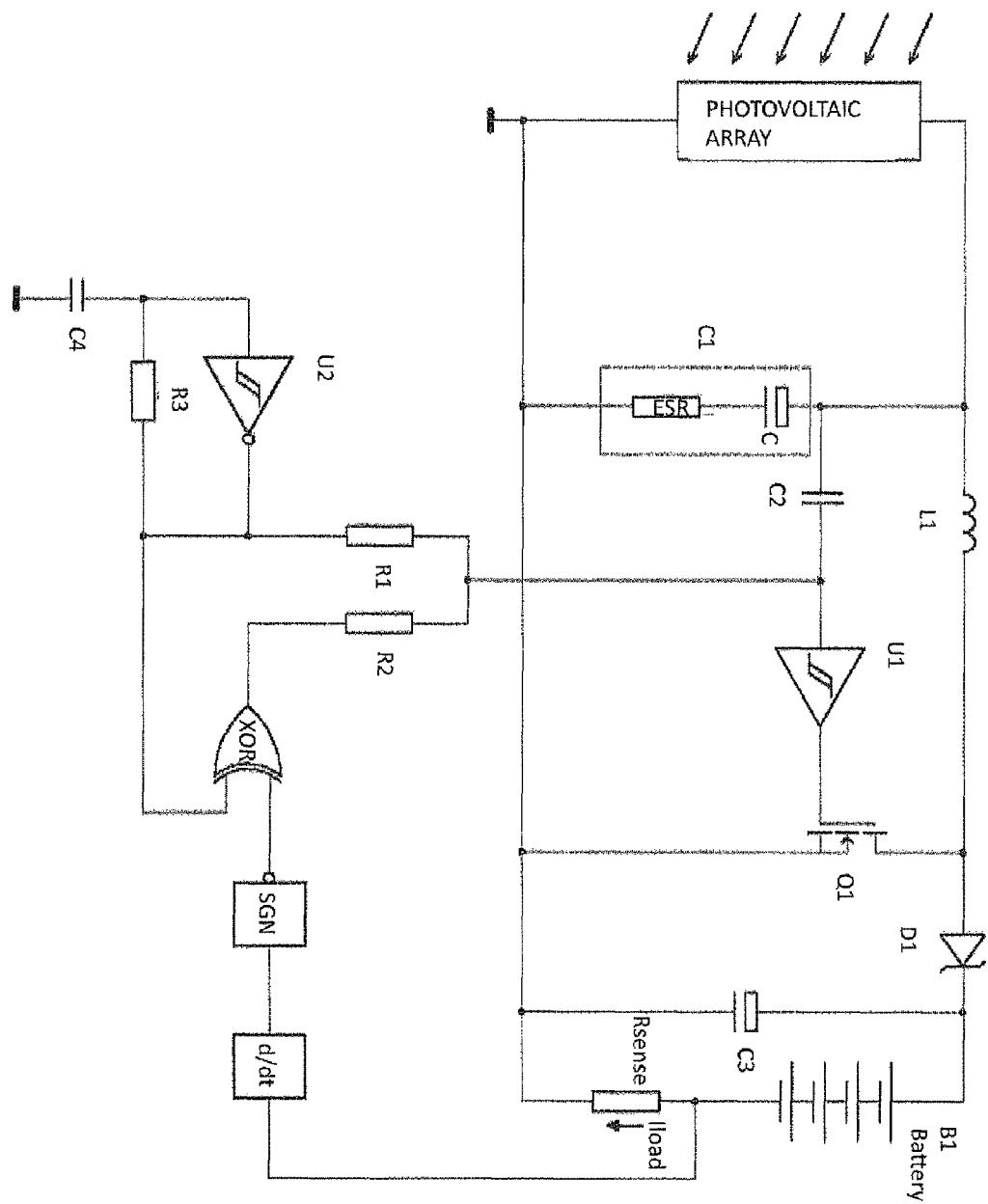
FIG. 33 shows a schematic diagram of a MPPT that utilizes output current maximization and employs the topology of the boost converter with hysteretically controlled input voltage, according to one embodiment of the invention

As discussed above, this novel topology uses the boost converter with hysteretically controlled input voltage, according to one embodiment of the invention. A diagram is shown in FIG. 33.

The relaxation oscillator built around U2 generates a symmetrical square wave signal that is used to perturb the point of operation of the PV array. It oscillates at a frequency well below the switching frequency of the converter. If the average threshold voltages of both U1 and U2 are equal to half the positive logic output level of U2, then the average voltages at their inputs will be equal during oscillatory operation. This implies that the average current through R1 and R3 is zero. Due to the principle of operation of the converter section, the input node of U1 will appear as a virtual ground point for low frequencies and DC. This means that oscillator U2 will make the PV voltage ramp up and down linearly by charging and discharging the integrating capacitor C2. Since the average current through R1 is zero, the average value of the PV voltage will remain steady. Assuming that the absolute value of the current through R2 is small compared to the current through R1 at any given time, the binary output level of U2 represents the opposite sign of the time derivative of the PV voltage.

In this example the load includes a battery and a current sense resistor ($R_{sense}$). A battery typically has very small impedance and hence the voltage variations across its terminals are very small as the charge current varies. This makes current maximizing the preferred method here. Instead of a sense resistor, other means of current measurement can also be applied. For other load types, i.e. resistive loads, output voltage maximizing may be more appropriate.

The result of the current (or voltage) measurement is then differentiated. This signal is positive if the output power increases and negative if it decreases. The opposite of its sign is fed to an exclusive-OR gate together with the output of U2. The exclusive-OR gate effectively generates the product of signs of the time derivatives of PV voltage and output power.

The momentary value of this product depends on the gradient of the slope of the power curve at the point where the converter is operating. If the point of operation is on the left side of the power peak, the output of the XOR gate will be low. On the other side of the peak it will be high. If the operating point is oscillating back and forth near the top of the power peak, the XOR gate outputs ones and zeros alternately. In case the oscillation is centered exactly on the power-peak, the XOR output will be low for half the time and high for the other half. The average voltage at its output will then be equal to half its positive logic output level. From this it becomes clear that the DC level on the output of the XOR gate depends on the converter's point of operation on the PV power curve.

This DC voltage is then used to drive the operating point towards the MPP by charging or discharging integrating capacitor C2 via R2. One condition has to be met for this to work; the influence of the oscillator (U2) on the slope of the PV voltage has to dominate the influence of the XOR gate. This is needed in order to maintain the validity of the relation between the output of U2 representing the opposite sign of the derivative of the PV voltage. If U2 and the XOR gate have the same logic output levels, this condition can be met by choosing R2 larger than R1. This will ensure that the current through R2 can never exceed the current through R1 and consequently the XOR gate output signal can never reverse the slope of the PV voltage as initiated by U2.

Figure 34A:
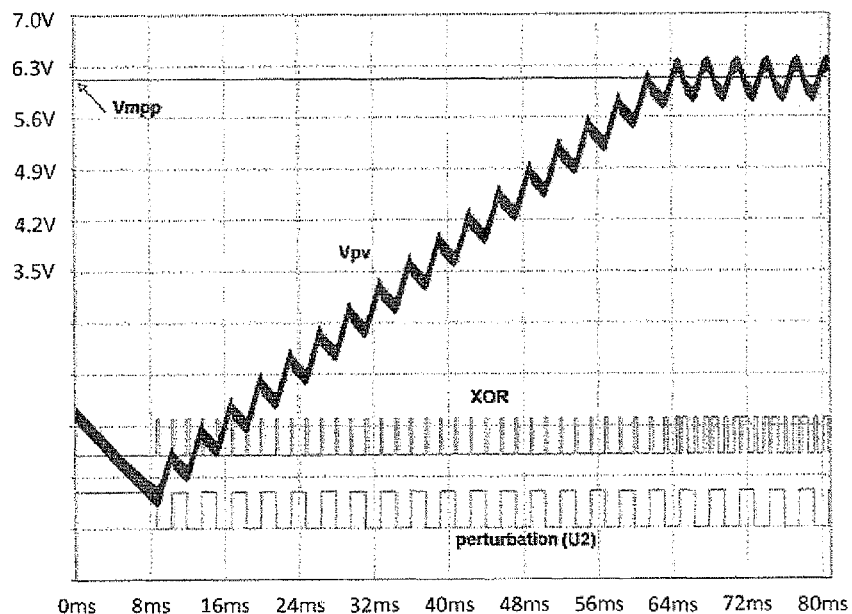
FIG. 34a-34b shows simulation results of the circuit shown in FIG. 33 and the characteristic of the simulation model used for the PV array, according to one embodiment of the invention.
Figure 34B:
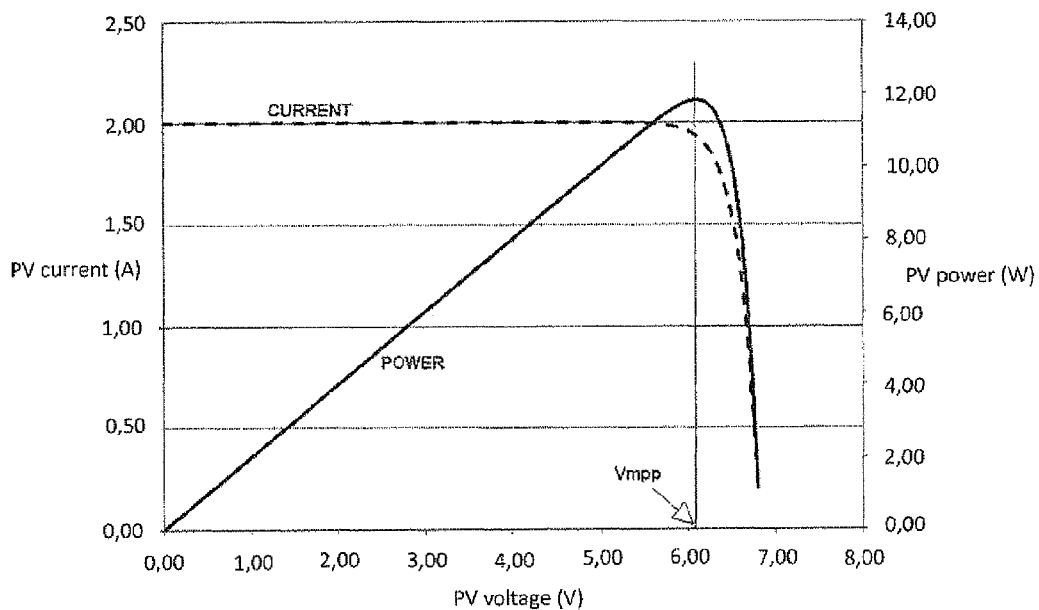

FIGS. 34a-34b show a simulation of the circuit and the characteristic of the model used for the photovoltaic array shown in FIG. 20. It shows that the maximum power point for this arbitrary model occurs if the PV voltage is 6.1V. The simulation results in FIG. 34a show that the PV voltage will staircase to this point of maximum output power and then keep oscillating around it. In this simulation the frequency of the primary oscillator (the hysteretically controlled input voltage boost converter) has been chosen at approximately 1 MHz. Due to the timescale of the whole simulation, the individual oscillations of the converter section can't be distinguished from each other. They appear as a thick line in the graph of the PV voltage. The triangular envelope of the PV signal is the perturbation caused by oscillator U2.

Figure 35:
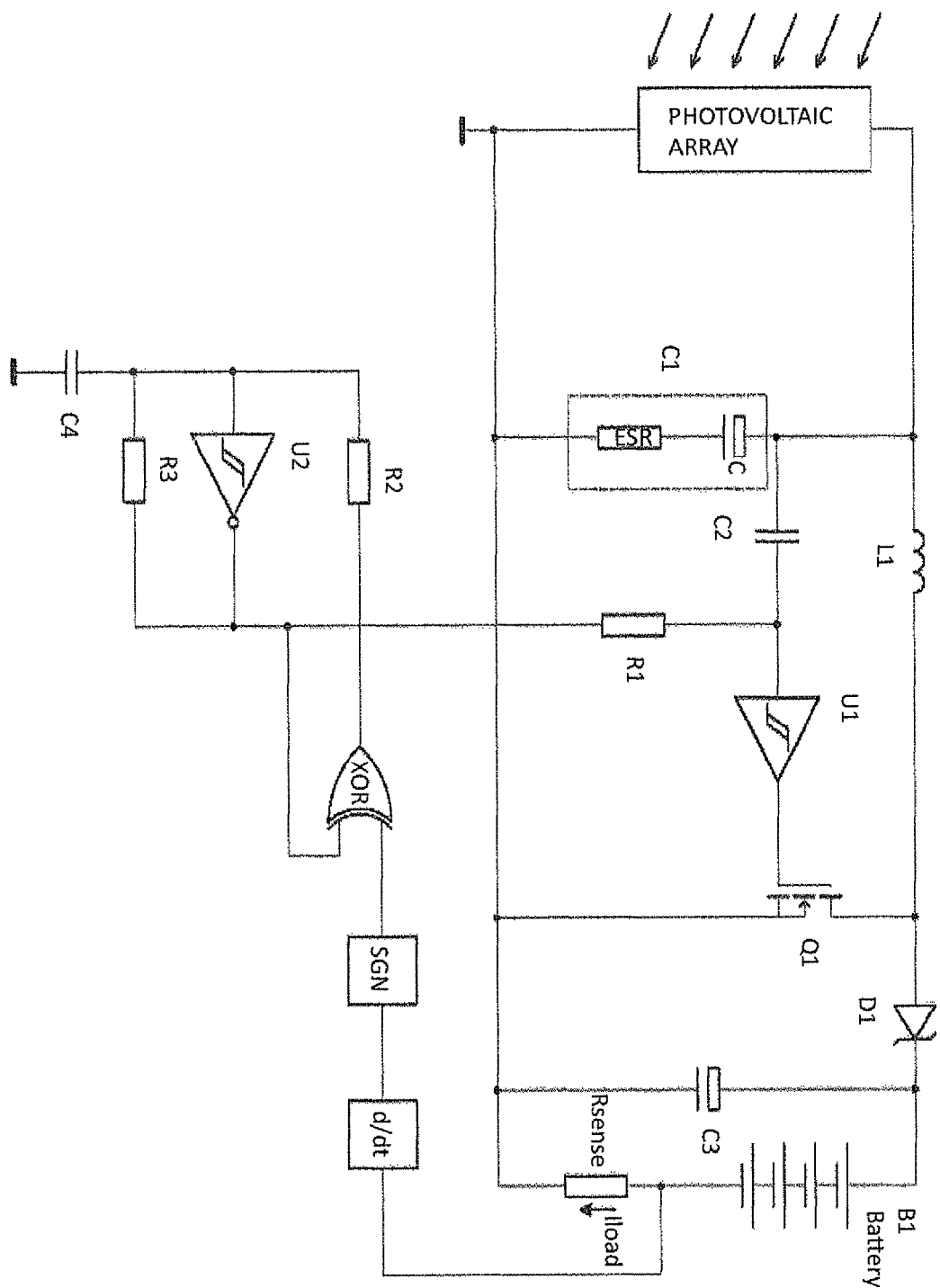
FIG. 35 shows a schematic diagram of a variant that shifts the point of operation by having the output of the XOR gate manipulate the duty-cycle of an oscillator, according to one embodiment of the invention.

In this implementation the DC voltage component at the output of the XOR gate, injects a current directly into the integrator capacitor C2, thereby driving the point of operation towards the MPP. Another way to shift the point of operation is by having the output of the XOR gate manipulate the duty-cycle of oscillator U2. An implementation of this variant is shown in FIG. 35. Here the output of the XOR gate injects a current into timing capacitor C4 of the relaxation oscillator. If this current is zero on average, then U2 produces a square wave signal with 50% duty-cycle and consequently the converter's average point of operation will remain stable. If the average current through R2 is non-zero on the other hand then the duty-cycle of the square wave will shift accordingly. Any asymmetry in this square wave will result in a net DC current through R1 and consequently will lead to charging or discharging of integrator capacitor C2 and hence will shift the point of operation. Note that the output of the sign-operation is not inverted here, as opposed to the original implementation.

Figure 36:
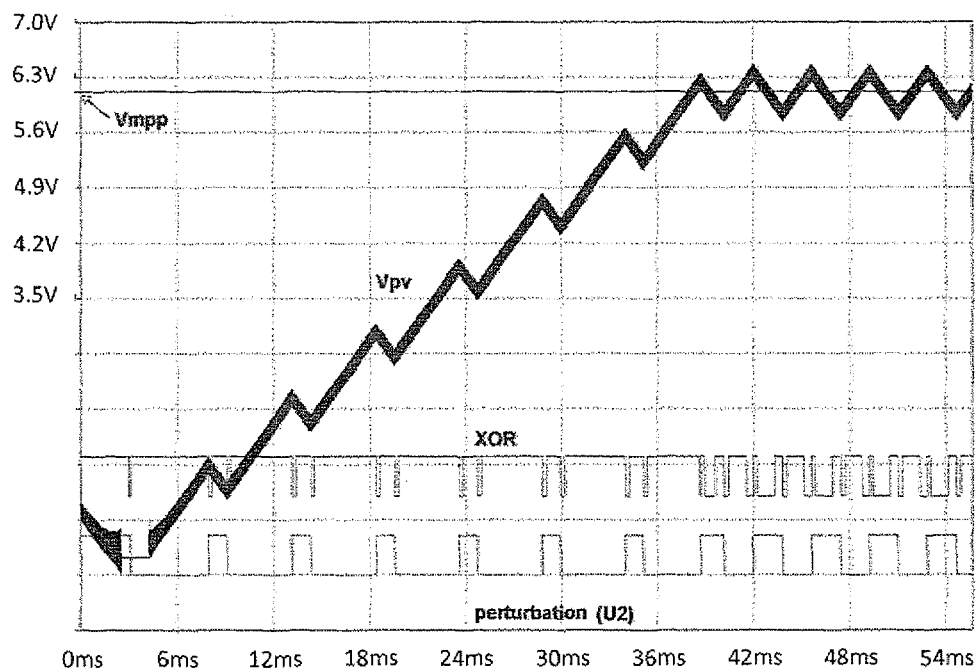
FIG. 36 shows the simulation results of the variant of FIG. 35, according to one embodiment of the invention.

FIG. 36 shows the simulation results of the latter variant. From this it can be noticed that not only the duty-cycle of U2 is affected by the output of the XOR gate but also the frequency. Ultimately the duty-cycle can be 0% or 100%. In that case the PV voltage will ramp up or down without interruption. This property allows for potentially faster convergence of the MPPT in this variant.

Figure 37:
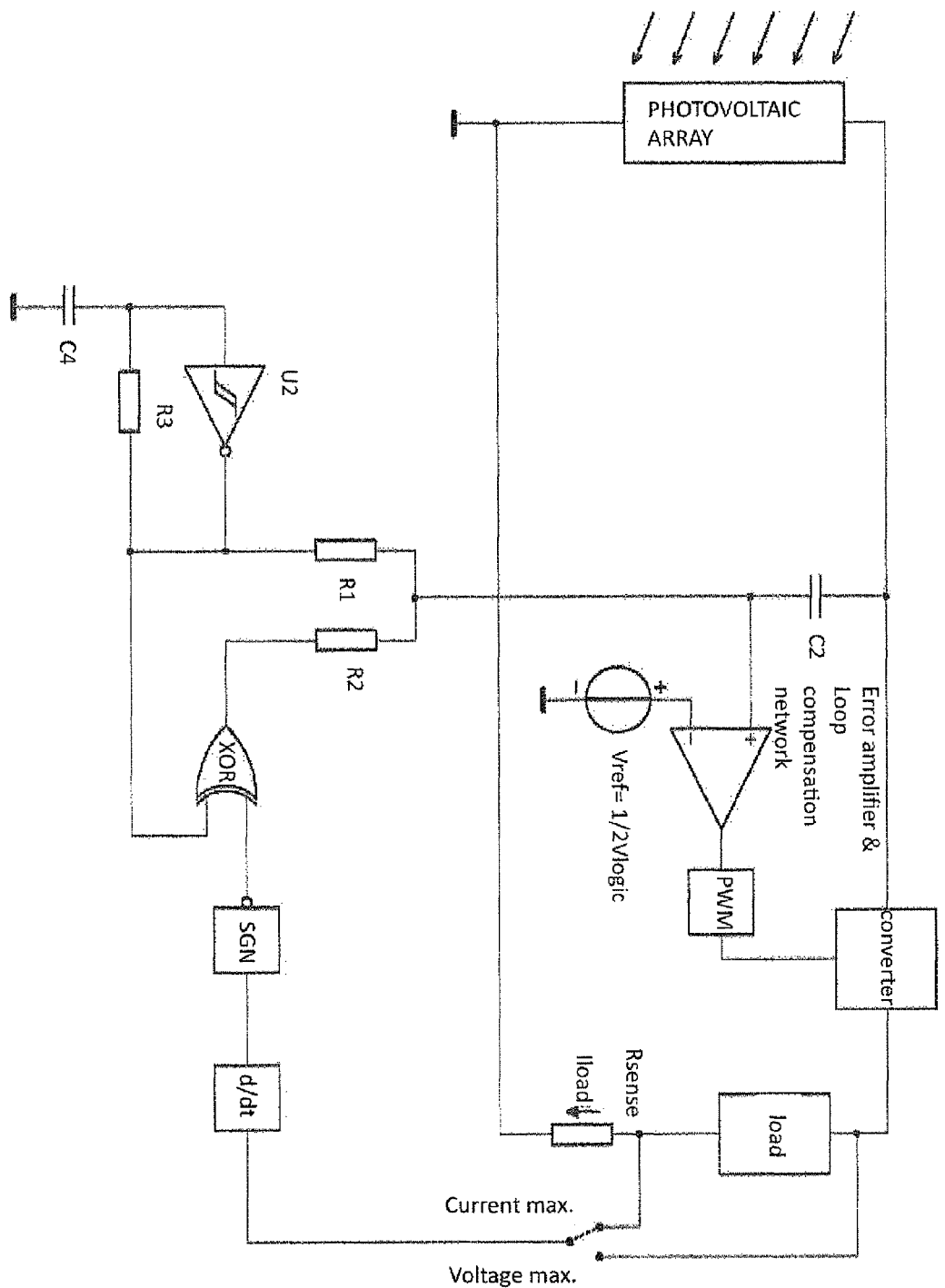
FIGS. 37-38 show schematic diagrams of generic implementations of the presented maximizing topologies, according to embodiments of the invention.
Figure 38:
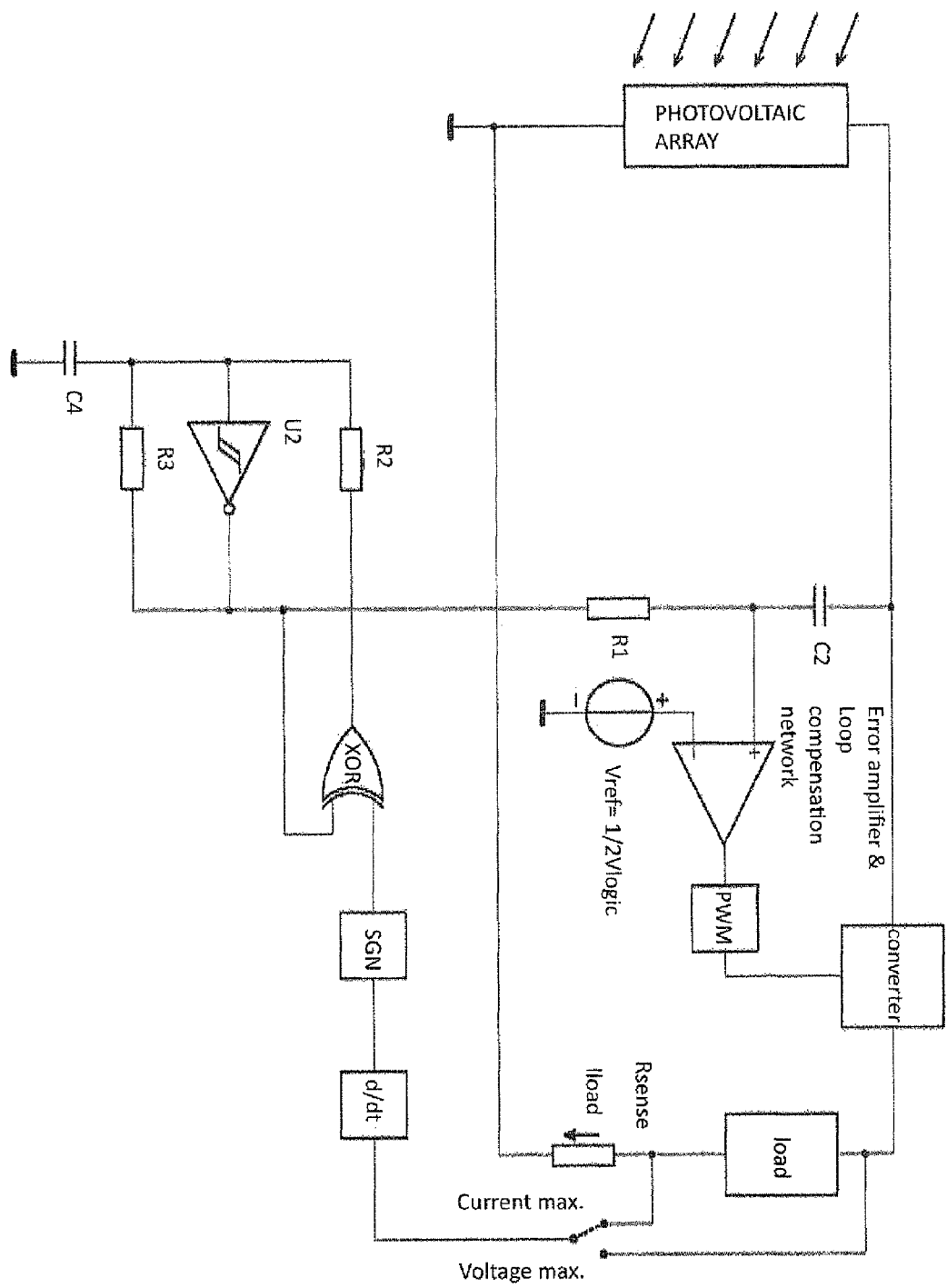
Figure 39A:
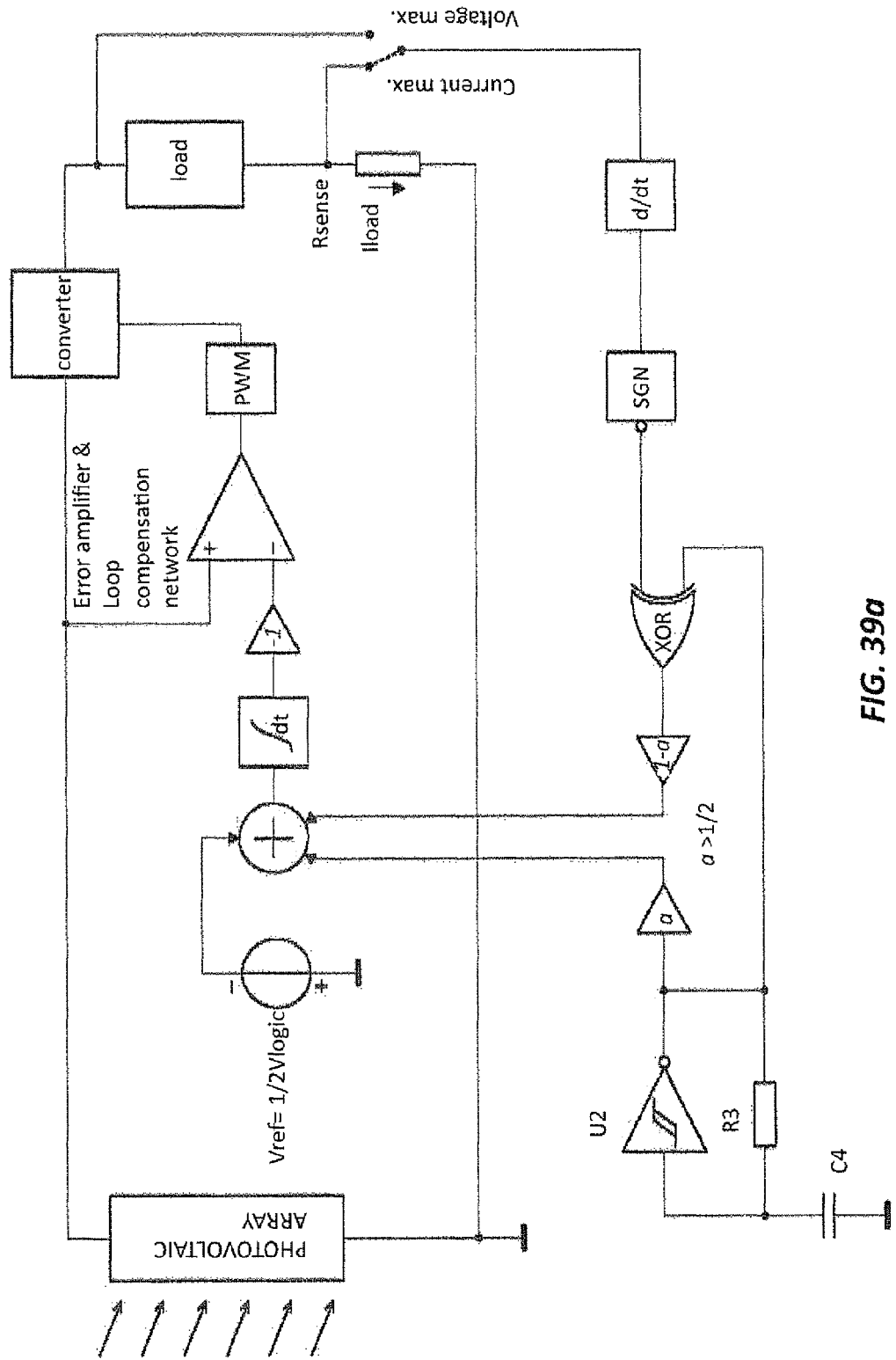
FIGS. 39a-39b show alternative schematic diagrams where the implementation of the integrator function is depicted in a more generic way, according to embodiments of the invention.
Figure 39B:
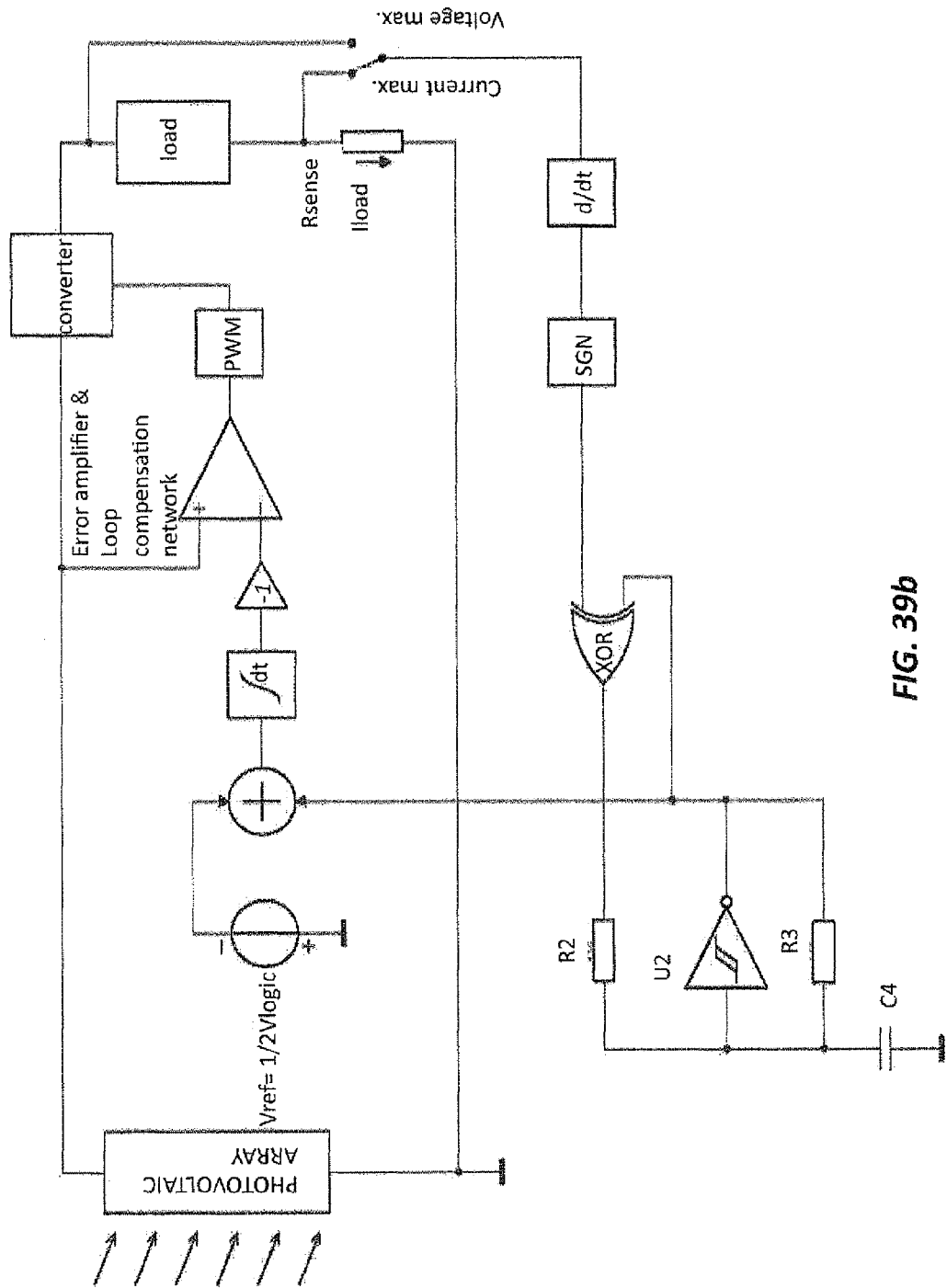

These implementations here are based on the boost converter topology with hysteretically controlled input voltage as described above. The principle of how it finds the maximum power point however is not fundamentally connected to this. It can also be applied to other converter topologies with regulated input voltage. FIG. 37 and FIG. 38 show generic implementations of the presented maximizing topologies. Alternative block diagrams where the implementation of the integrator function is depicted in a more generic way are provided in FIGS. 39a-39b.

In these implementations the converter is shown as a black-box that may represent any type of switched-mode topology. The voltage at the non-inverting input of the error amplifier is regulated to be half the positive logic level of U2 and the XOR gate ($\frac{1}{2} V_{logic}$). This is done by controlling the duty-ratio of the PWM signal to the converter. Provided that this regulation is fast enough, the non-inverting input will appear as a virtual ground node for the perturbing signal generated by U2, and hence C2 will act as an integrating element. The required loop compensation network depends on the dynamic behavior of the converter and thus on the chosen converter type.

In some of the examples presented in the preceding block diagrams, the load connected to the MPPT is a battery. Since a battery generally has very small impedance, the output voltage of the MPPT is virtually independent of its output current. A fixed output voltage is in fact a case with special properties since most converter topologies have an unambiguous relation between input voltage, output voltage and PWM duty-cycle. In a continuous mode boost converter for instance, the input voltage will be inversely proportional to the PWM duty-cycle if the output voltage is fixed. In this special case a predictable perturbation amplitude and slope of the input voltage can be accomplished, by directly controlling the duty-cycle of the converter's power switch, instead of controlling its input voltage. This widens the scope of the concept in applications where the output voltage is fixed, e.g. battery chargers. If the variable frequency nature of the boost converter with hysteretically controlled input voltage would be problematic in certain applications for example, a fixed frequency topology could be applied in these cases, while still employing the new method of maximum power point tracking. A generic diagram for the first variant is given in FIG. 40a. Since the output voltage is independent of the delivered power to the load, only current maximizing is possible here.

In the disclosed topologies that maximize the output current, according to the invention, the load-current measuring signal across $R_{sense}$ is fed to a differentiator. The DC component of the load current has no part in the signal processing since it's ignored by the differentiator in the block diagram. This DC current however, causes the main contribution to the power loss in the sense resistor, thereby compromising overall converter efficiency. By shunting $R_{sense}$ with an appropriate value inductance, the DC current component can be deflected from the sense resistor. Provided the DC resistance of the inductor is much lower than $R_{sense}$, this will significantly reduce dissipation in the current measuring circuit. The time constant $L_s/R_{sense}$ should be larger than the period of the perturbing signal in order to maintain sufficient input signal for the differentiator.

Figures 40A, 40B:
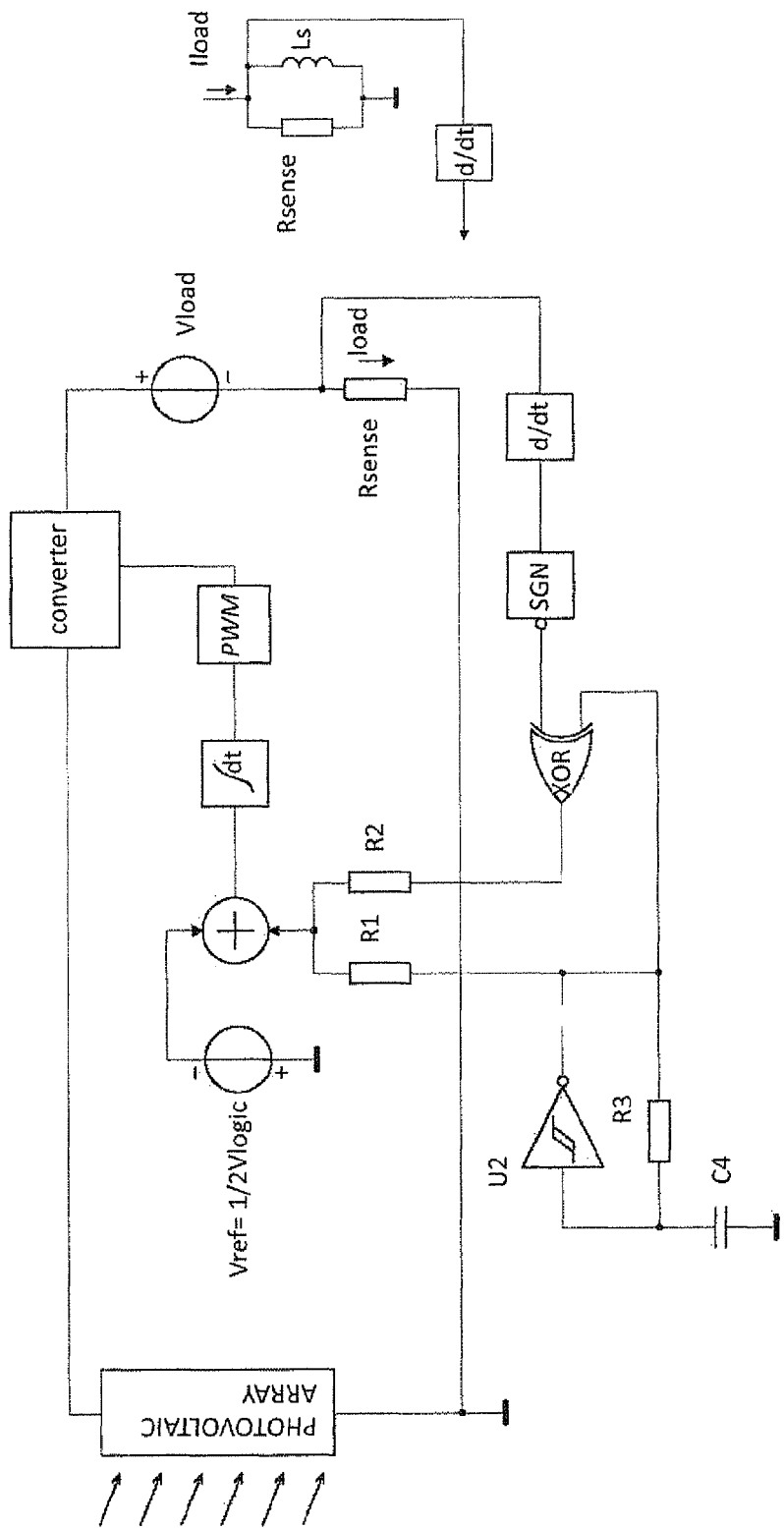
FIG. 40a shows a schematic circuit diagram of an alternative embodiment that can be used in the special case when the load is of a constant voltage type.
FIG. 40b shows a lossless current measuring circuit that can be employed in the presented output current maximizing topologies.

FIG. 40b shows a detail of a block diagram where the current sensing resistor has been shunted by an inductor.

Figure 41:
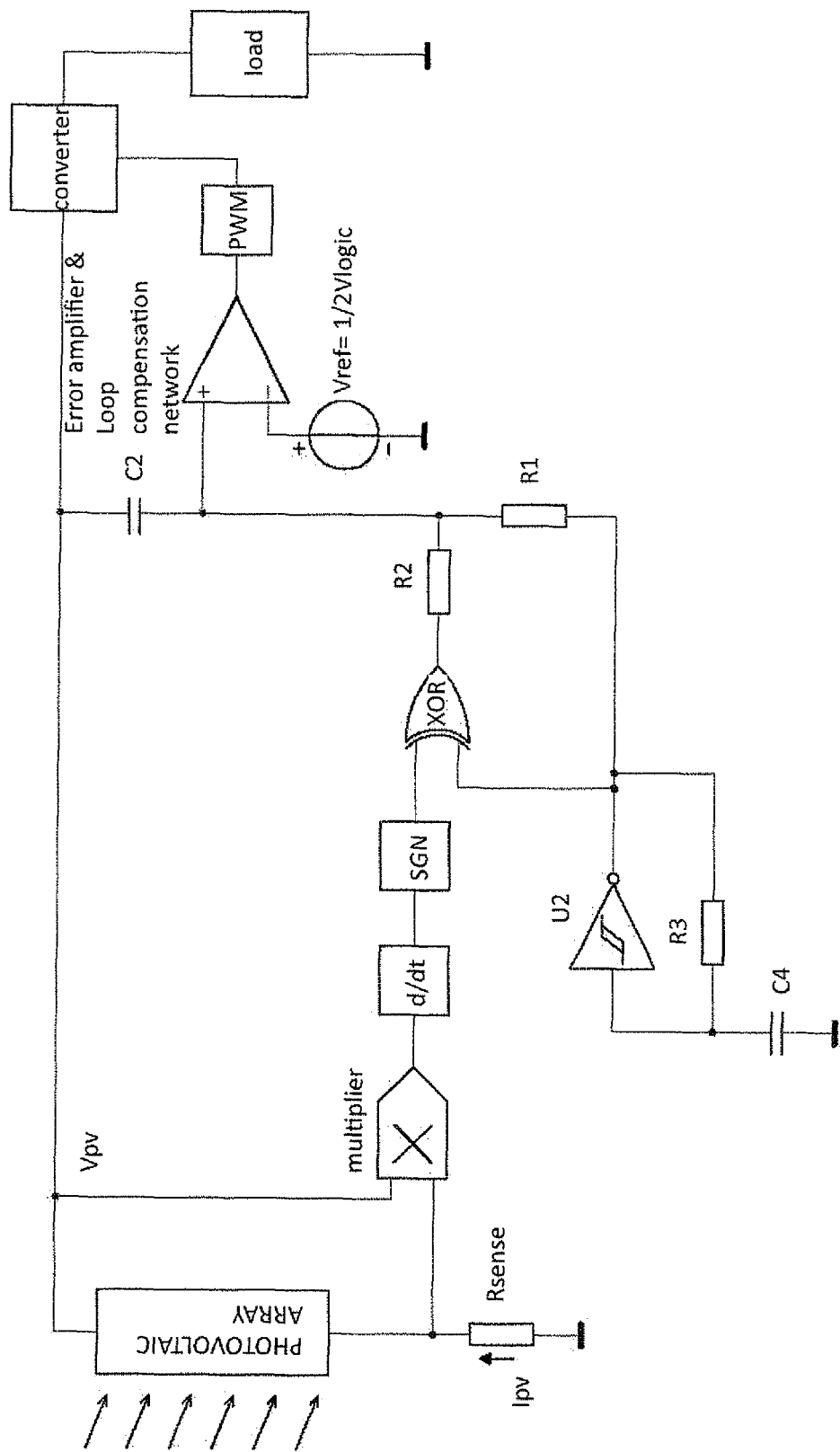
FIGS. 41-42 show schematic diagrams of generic implementations, according to embodiments of the invention.
Figure 42:
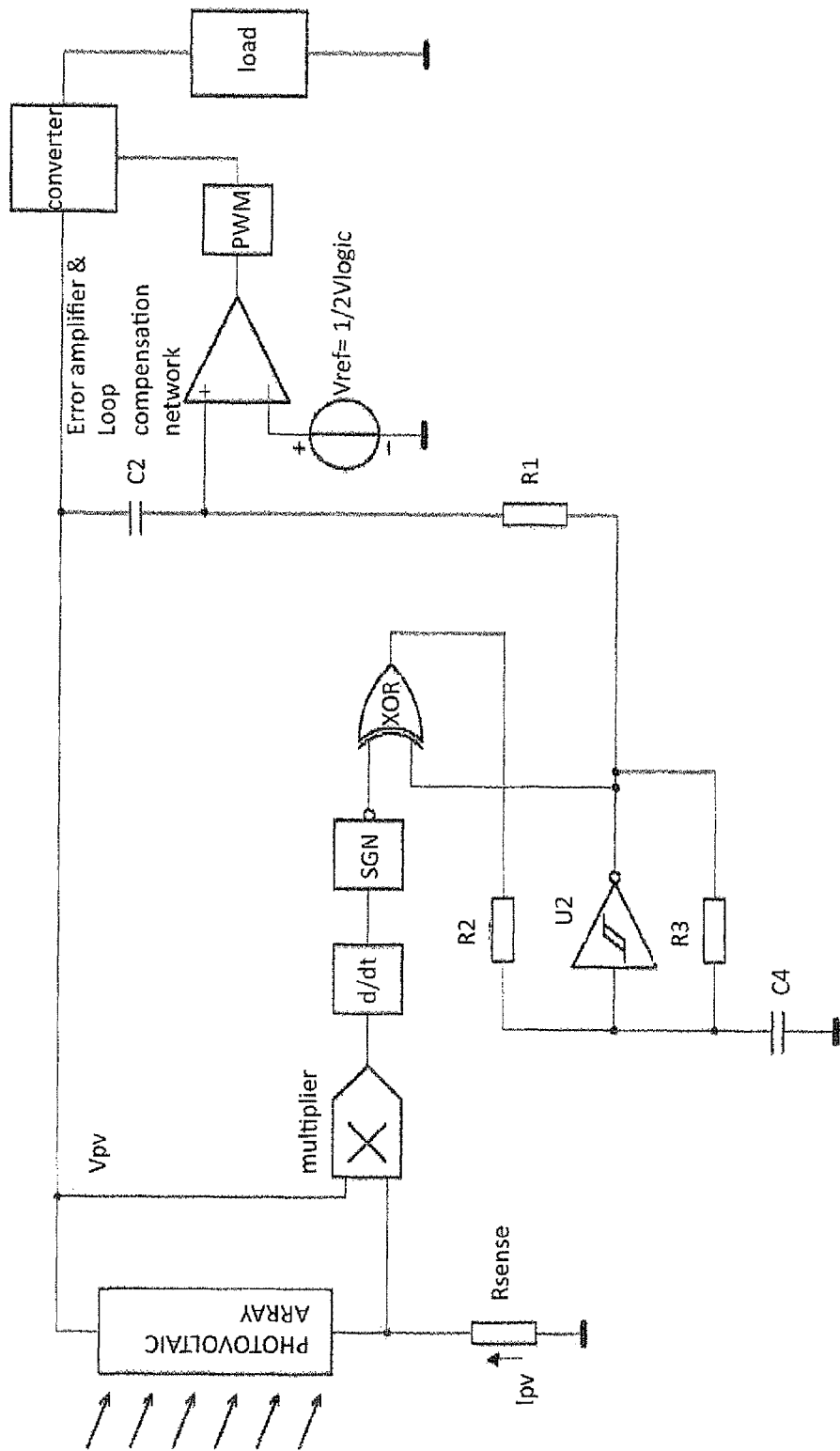

The method of finding the maximum power point according to one embodiment of the current invention can also be used in systems where the peak in the load current or voltage, doesn't coincide with the maximum power point, or if for some other reason the output current or voltage cannot be used as a measure for output power. In that case a signal proportional to the output power of the PV array can be generated by using a multiplier. Diagrams of generic implementations are shown in FIG. 41 and FIG. 42. Since both PV voltage and PV current are positive entities, the used multiplier needs to work in 1 quadrant only. Its linearity is not critical as the maximizing circuitry relies on gradient information only. Any multiplying structure that produces an output voltage with a monotonic relation to the produced PV power will suffice. One possible embodiment of such a multiplying structure could be an implementation with an inexpensive transconductance amplifier.

Other multiplying structures employ the logarithmic relation between collector current and base-emitter voltage in a bipolar transistor. By making use of the mathematical property that multiplying is equivalent to adding the logarithms of the arguments, circuits can be designed that produce a signal proportional to the logarithm of the PV power. Since logarithmic functions are monotonically rising, this signal can be used to feed the MPPT circuit.

The architectures of the current invention share the presence of a differentiator followed by a sign-operation. The purpose of this combination is to generate a bit representing the sign of the time-derivative of the momentary power produced by the PV-panel.

One way to implement this is by constructing a differentiator circuit around an op-amp. The output of this analog differentiator can then be applied to the input of a comparator in order to generate the sign bit to feed the XOR gate. Designing an analog differentiator for low level signals with sufficient noise immunity may be challenging however, particularly if the signal is polluted with switching noise from a power converter.

According to one embodiment of the invention, an alternative and very elegant method to create a binary signal representing the derivative of the momentary power is by using a delta modulator circuit. This building block is typically used as a 1 bit A/D converter in audio applications, but it owns a property that makes it ideal for use in these MPPT architectures. The delta modulator produces a digital bit-stream whose pulse density is proportional to the slope (or time-derivative) of its analog input signal. In audio applications the analog signal can be recovered by integrating this bit-stream. In the MPPT application according to the current invention however, the digital signal representing the time-derivative happens to be exactly what is needed and can be used directly to feed the XOR gate.

Figure 43:
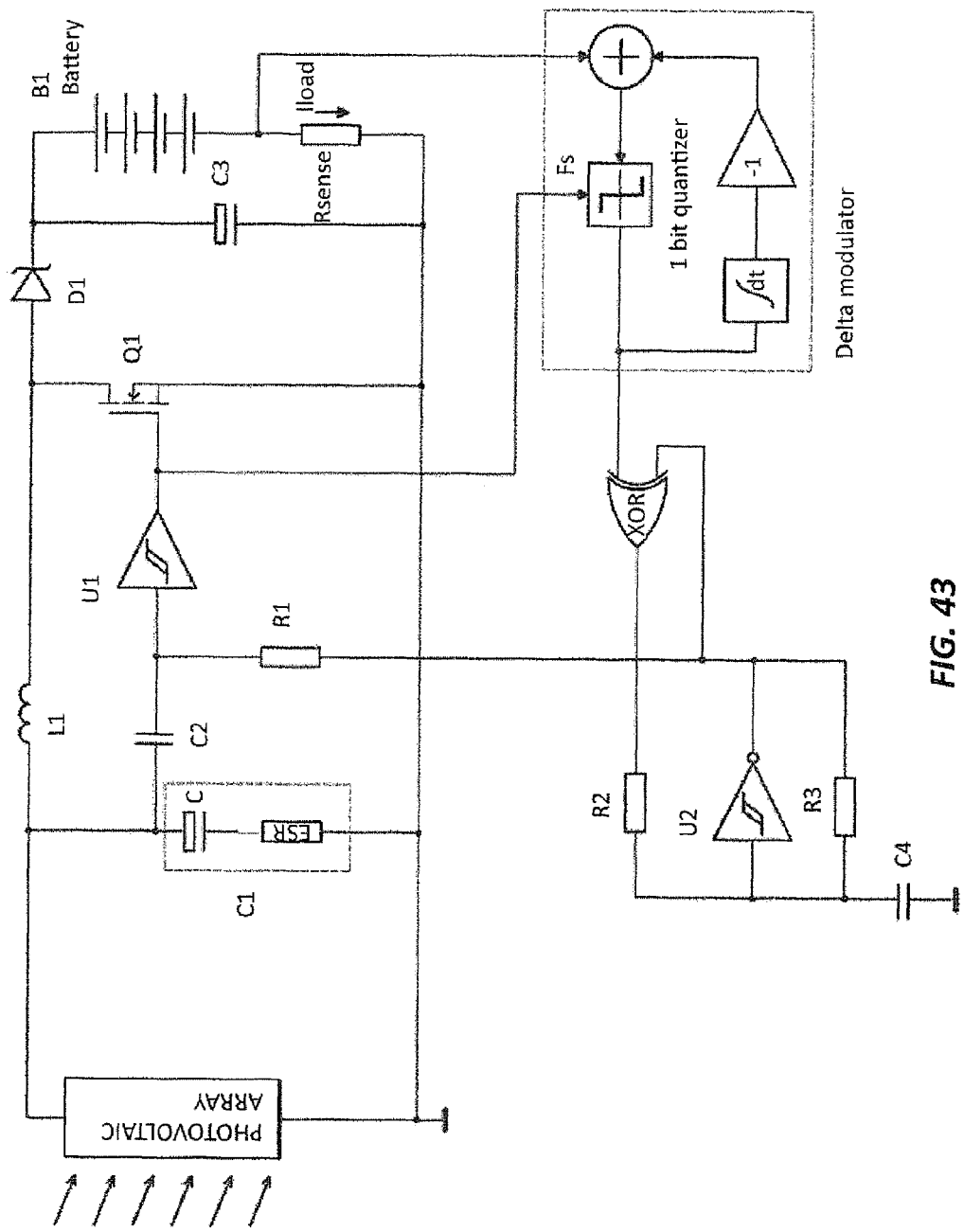
FIG. 43 shows a schematic diagram of an example of an output current maximizing topology similar to the one shown in FIG. 35, where a binary signal corresponding to the derivative of the output power is provided by a delta modulator, according to one embodiment of the invention.

FIG. 43 shows an example of an output current maximizing topology similar to the one shown in FIG. 35. In this block diagram however, the differentiator and sign-operator have been replaced by a delta modulator. Analogous delta modulator versions can be made for the other maximizing topologies presented earlier.

The clock signal for the quantizer can be derived directly from the primary oscillator of the power converter section. Besides the fact that this clock signal is already available in the circuit, this has a significant additional advantage. Remains of the switching frequency in the current measuring signal across $R_{sense}$, will be suppressed very effectively because they occur exactly at the sampling frequency of the delta modulator where its rejection is near infinite. This results in a high level of immunity for switching noise from the converter and very loose analog filtering requirements. The gain of the delta modulator depends on the time constant of the integrator. This time constant should be chosen such that the maximum expected voltage slope of the current measuring signal ($V_{Rsense}$) will result in maximum deviation of the pulse density at the output of the delta modulator without causing slope-overload.

Figure 44:
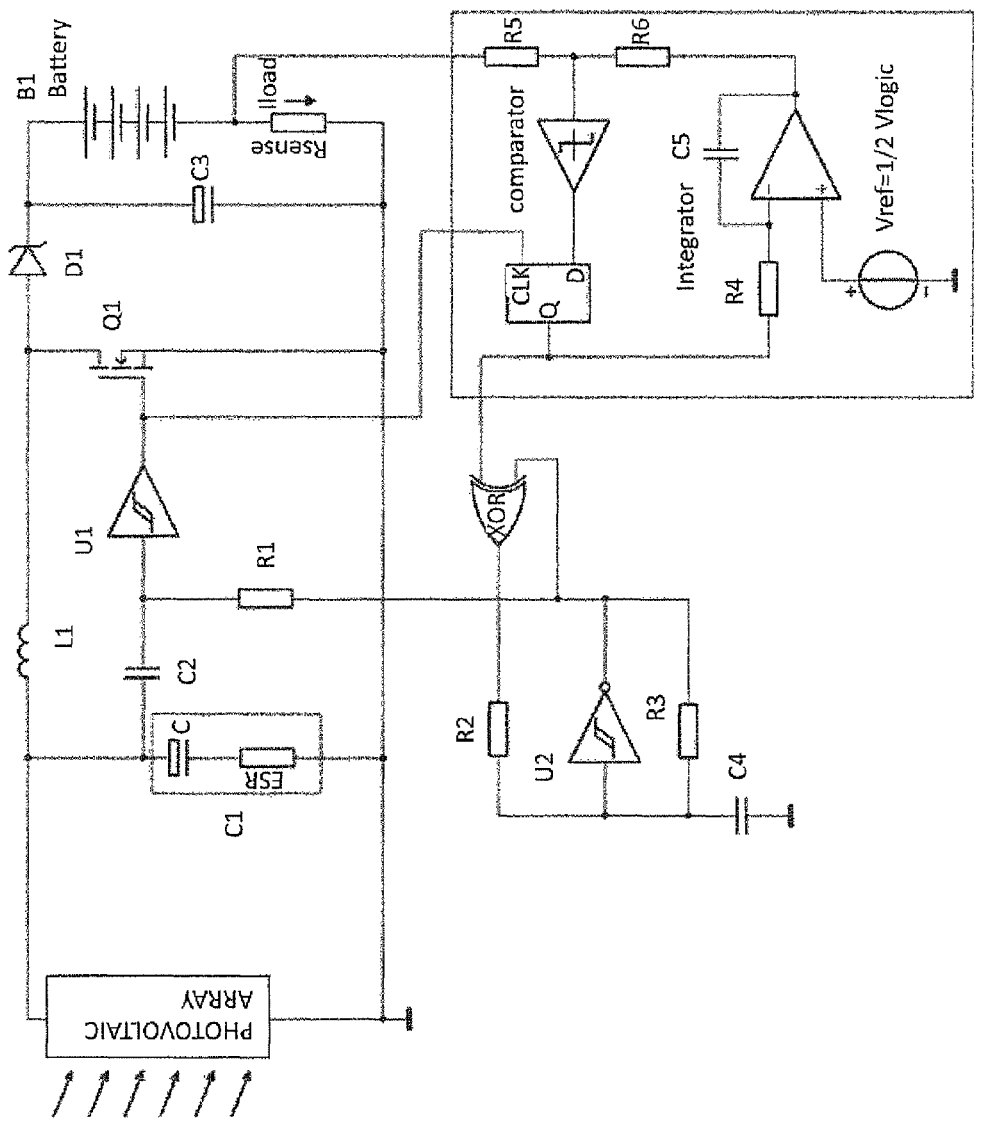
FIG. 44 shows a schematic diagram with a possible physical implementation of the delta modulator, according to one embodiment of the invention.
Figure 45:
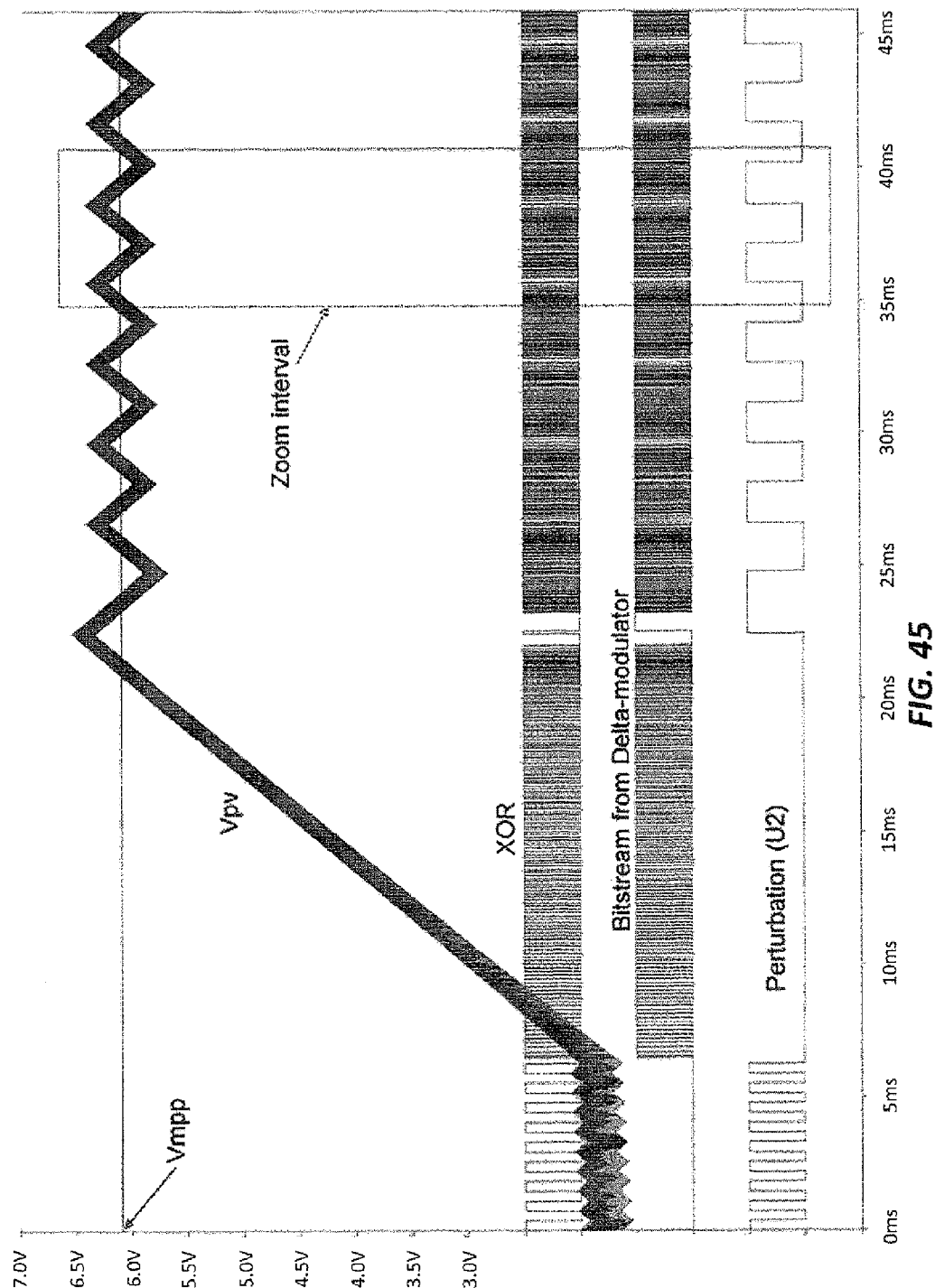
FIG. 45 shows the results of a simulation run of the embodiment shown in FIG. 44.

FIG. 44 shows the same block diagram with a possible physical implementation of the delta modulator. This circuit has been subjected to a simulation run, the results of which are presented in FIG. 45. Again, the model in FIG. 20 has been used for the PV array (see also FIG. 34b for the characteristic), which should lead to a PV voltage of 6.1V at the MPP.

Figure 46:
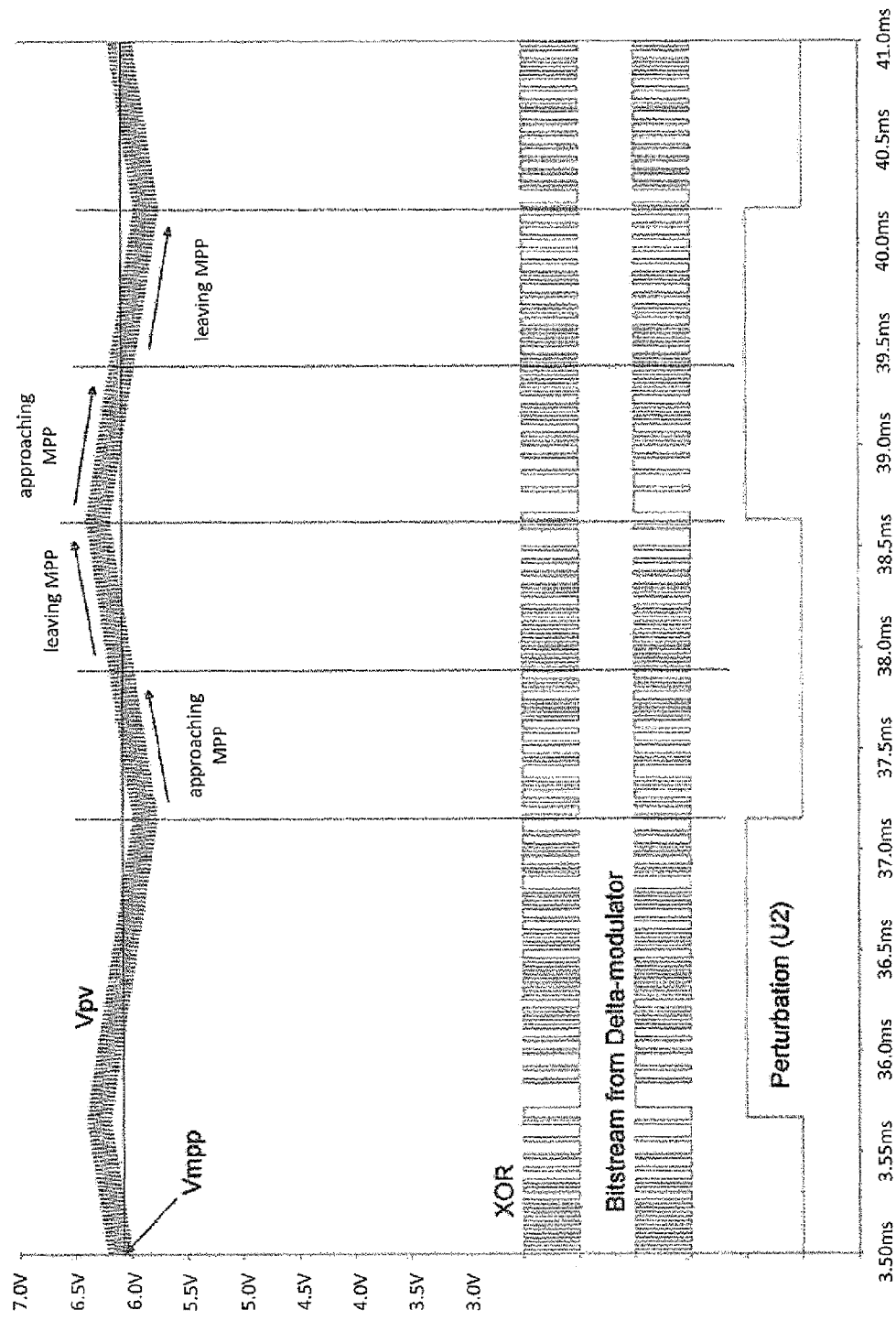
FIG. 46 shows a magnification of the vital signals, after the PV voltage has settled and oscillates around the maximum power point, according to the embodiments of the invention shown in FIG. 44.

FIG. 46 shows a magnification of the vital signals, after the PV voltage has settled and oscillates around the maximum power point. It can be clearly noticed that the average pulse density of the bit-stream signal is greater than 50% if the PV voltage approaches the MPP, and less than 50% if it has passed the MPP. As mentioned before, the pulse density of the bit-stream represents the derivative of the current measuring signal. This bit-stream and the signal representing the opposite sign of the derivative of the PV voltage (output of U2) are fed to the inputs of the XOR gate. The resulting average output voltage of the XOR gate will then become proportional to the product of these two signals. The effect of using a bit-stream signal is that the XOR gate behaves as a linear factor for the current measuring signal's derivative, instead of only processing its sign information. Both ways will lead to a control signal that drives the point of operation of the power converter towards the MPP of the PV array.

Figure 47:
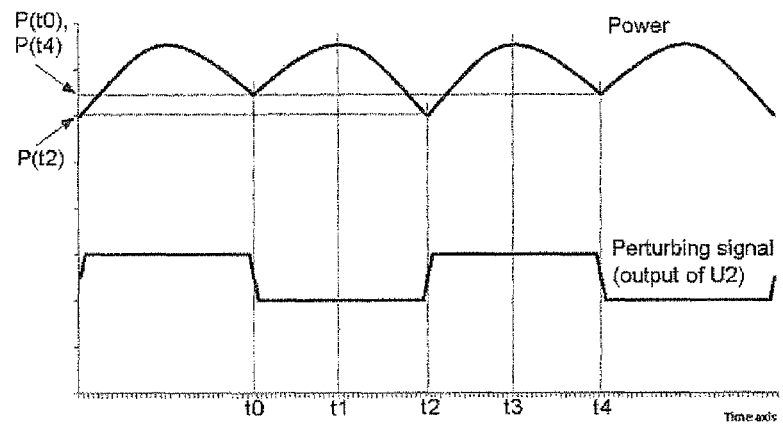
FIG. 47 shows the trajectory of the PV power during two cycles of the perturbing signal, according to one embodiments of the invention.

In the architecture embodiments of the current invention, the average point of operation of the PV panel is moved towards its MPP by the DC voltage component developed at the output of the XOR gate, referred to half its supply voltage. If this DC component becomes zero, the average PV voltage will remain steady. In a maximum power point tracker this is supposed to happen at the peak in the PV power curve. In order to find the actual point of convergence we have to find the point of operation where the DC output voltage of the XOR gate becomes zero. FIG. 47 shows the trajectory of the PV power during two cycles of the perturbing signal. The graph labeled "Power" is the projection of the PV power curve (see FIG. 34b) on the time axis.

In the implementations presented in FIG. 33 and FIG. 35 the XOR gate produces a signal that can be interpreted as the multiplication of signs of the derivatives of PV voltage and output power. The DC component in this signal will become zero if the average output voltage during each perturbation cycle is zero. Hence:

$$\int_{t0}^{t4} \mathrm{sgn}\left(\frac{dP(t)}{dt}\right) \cdot \mathrm{sgn}\left(\frac{dV_{pv}(t)}{dt}\right) \cdot dt = 0$$

The interval t0-t4 represents one complete perturbation cycle. Time instants t1 and t3 mark the points where the sign of the time-derivative of the output power reverses. These will only occur if the peak of the power curve is within the perturbation window. During intervals t0-t1 and t2-t3 the derivative of the output power is positive. During intervals t1-t2 and t3-t4 it is negative. The time-derivative of the PV voltage is positive during interval t0-t2 and negative during t2-t4.

Rewriting the equation yields:

$$\int_{t0}^{t1} dt - \int_{t1}^{t2} dt - \int_{t2}^{t3} dt + \int_{t3}^{t4} dt = 0$$

And hence:

$$[t]_{t0}^{t1} - [t]_{t1}^{t2} - [t]_{t2}^{t3} + [t]_{t3}^{t4} = 0$$

Or:

$$t3 - t1 = \frac{1}{2} \cdot (t4 - t0)$$

This means that in these implementations equilibrium will occur if the point of operation resides on both sides of the power peak for equal amounts of time during each perturbation cycle.

Similarly the condition for the point of convergence for the delta modulator versions can be deduced. In these variants the bit-stream output signal of the XOR gate can be interpreted as the product of the sign of the PV voltage's derivative and the derivative of the output power. Again the average output during a perturbation cycle must be zero in order to have zero DC level.

$$\int_{t0}^{t4} \frac{dP(t)}{dt} \cdot \text{sgn}\left(\frac{dV_{pv}(t)}{dt}\right) \cdot dt = 0$$

Considering the time intervals shown in FIG. 47 this yields:

$$\int_{t0}^{t2} \frac{dP(t)}{dt} \cdot dt - \int_{t2}^{t4} \frac{dP(t)}{dt} \cdot dt = 0$$

Or:

$$[P(t)]_{t0}^{t2} - [P(t)]_{t2}^{t4} = 0$$

From this it can be seen that the delta modulator implementations find equilibrium if $$2 \cdot P(t2) = P(t0) + P(t4)$$

During equilibrium the average point of operation will not change and hence the output power levels at the start and end of each perturbation cycle are equal. Thus equilibrium occurs if:

$$P(t0) = P(t2) = P(t4)$$

In other words; the delta modulator implementations converge to the point of operation where output power is equal at both limits of the perturbation window. This can only occur if the power peak is within this window.

It can now also be understood that the signal representing the output power only needs to have a monotonic relation with the actual output power. The shape of the "Power" graph in FIG. 47 has no influence on the outcome of the point of equilibrium as long as the sign if its derivative is the same.

Finding the peak in the power curve of PV panels has been considered. According to one embodiment, the invention locks to the nearest peak in the power curve from the current point of operation. For small PV panels this is useful since these typically exhibit one single maximum power point similar to the example shown in FIG. 20 and FIG. 34*b*. Large PV arrays however, may show multiple power peaks and valleys if the individual PV cells are ill matched or exposed to unequal lighting conditions or temperature. Without further measures a MPPT will lock to one of these peaks, which may or may not be the peak with the highest magnitude. In one aspect, the invention includes optimizing power output in these cases would be to split up the array into smaller sections, each with its own MPPT. The reduced complexity MPPT circuits of the current invention make this approach cost effective.

In some prior art embodiments, when a single MPPT is used for the entire PV array, the MPPTs need a more elaborate way of control in order to handle the potential presence of multiple peaks in the power curve. Some prior art implementations find these peaks by periodically scanning the complete range of operation of the PV array. Once the position of the peak with the highest magnitude is known, the MPPT can be locked onto it until the next periodic scan, which may result in a different peak. The control method of such MPPTs is mostly implemented in software algorithms. Despite the more complex control and the fact that the power output is still sub-optimal, these implementations have the advantage of only needing a single MPPT unit.

The maximizing topologies of the current invention can be applied in conjunction with such scanning algorithms with minimal effort. By inverting the orientation of the control loop, the invention will converge to the nearest valley in the power curve instead of the nearest peak. This can be accomplished by e.g. logically inverting the output of the XOR gate. The resulting minimum power point tracking architecture could is applied to systems where the lowest amount of power has to be drawn from an imaginable source that has a minimum power point behavior. It can also be put to use in the aforementioned scanning method in MPPT systems.

If the inversion of the XOR output signal is made controllable, the architecture becomes switchable between a maximizing and a minimizing mode of operation. By applying the mode control signal with proper timing related to the perturbation cycle, the point of operation can be made to hop from one extreme in the PV curve to the adjacent one.

Figure 53:
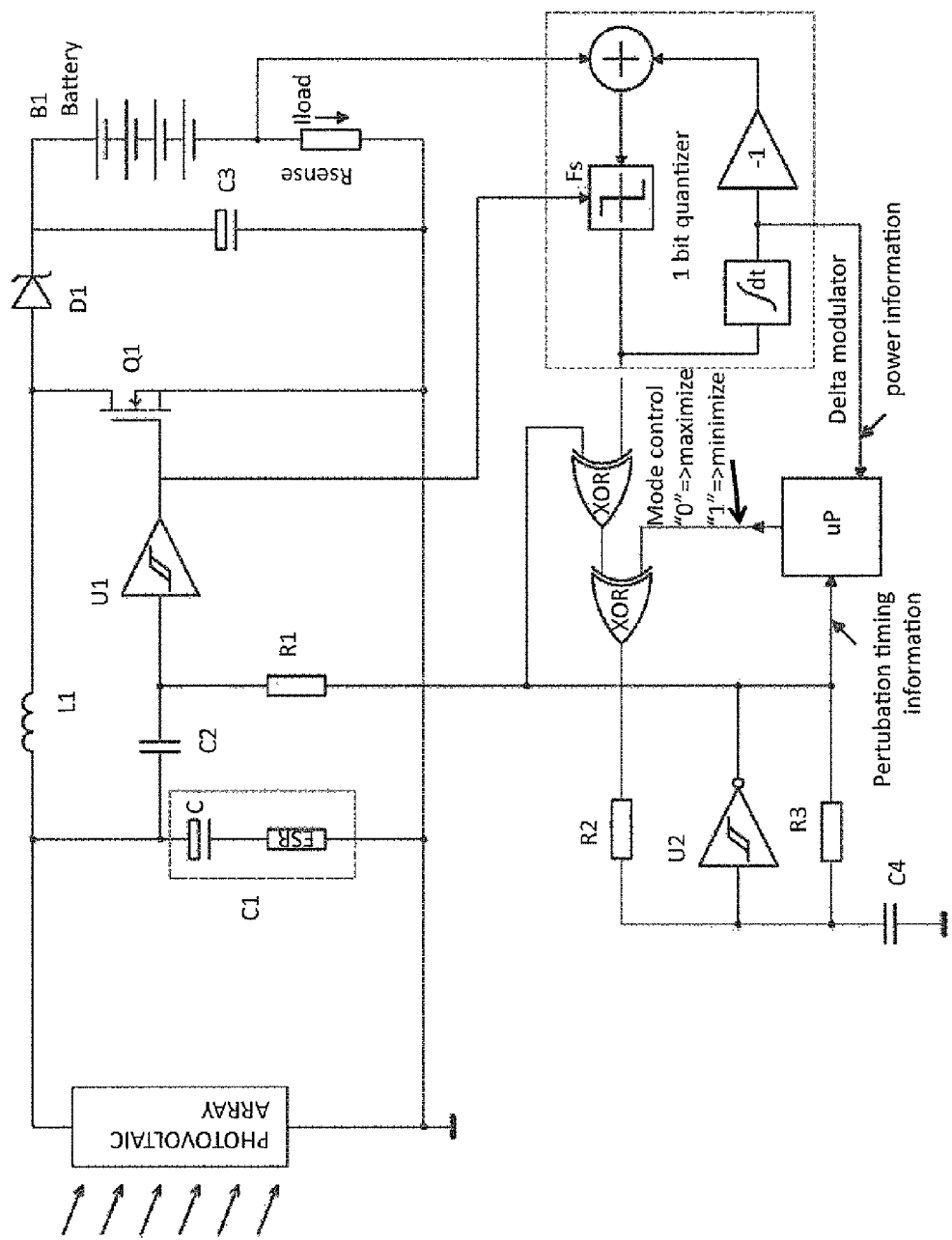
FIG. 53 shows a schematic diagram of an example of an implementation where a micro processor controls the mode of operation by means of an additional XOR gate, according to one embodiments of the invention.

FIG. 53 shows an example of an implementation where a microprocessor controls the mode of operation by means of an additional XOR gate. By toggling this mode at the proper moments it can force the MPPT to hop to the next extreme in the power curve. This way a scan can be performed over the PV panel's operating range. In this embodiment, the microprocessor obtains information related to the output power from the integrator in the delta modulator. This signal has an unambiguous relation with the output current, but lacks the switching noise from the converter, due to the synchronous sampling. By comparing the power levels between found peaks, a decision can be made as to what peak to lock onto. Since the microprocessor only has to perform simple sequential tasks at relative low speeds, no severe performance requirements are needed.

A prototype based on the diagram of FIG. 44 has been built and evaluated. This prototype will be referred to as type A hereafter. Also a delta-modulator version based on the architecture of FIG. 33 has been designed (type B). Both implementations feature much reduced complexity circuits with inexpensive off-the-shelf components. The waveforms measured in the circuits appeared to be nearly identical to the results predicted from the simulations.

Measurements were carried out to find the tracking performance of the prototypes. Tracking accuracy is defined as the ratio between actual produced output power and maximum achievable output power under the same conditions. In order to find this maximum achievable power, the PV voltage was manually forced to assume a certain value where the output power peaks. This was accomplished by imposing a manually controllable voltage across the integrating capacitor, thereby overruling the MPPT control loop. This peak power level is the reference value. Then the control loop was activated and the new power level was measured. The ratio could then be determined and expressed as a percentage. Tracking accuracies of better than 99.8% were established. The settling time for the type A prototype to arrive at the MPP after startup was approximately 45 ms.

There are 2 causes for the tracking accuracy not to be exactly 100%. The main cause is that the intentional perturbance of the PV panel's point of operation makes it differ from its optimum by definition. During each perturbance cycle the optimum point of operation will be passed twice but the remaining time it will be slightly below or above it. This is reason to not make the amplitude of the perturbance larger than required for the control loop to work properly. The amplitude of the perturbance will set a maximum to the theoretically achievable tracking accuracy.

The second reason for loss of tracking performance is inaccuracies and noise in the signal processing of the control loop caused by component tolerances and non-idealities. In the simulations these can be ruled out, resulting in computed tracking accuracies close to the theoretically achievable maximum. It appeared that the difference between measured tracking accuracy and this theoretical maximum was insignificant. From this the conclusion can be drawn that component non-idealities and tolerances have very little effect on tracking performance. Also converter switching noise is rejected very effectively from the control loop's signal processing by the synchronous sampling nature of the delta modulator.

By choosing proper parameters for perturbation frequency, amplitude and delta-modulator sensitivity, an optimum trade-off can be made between tracking accuracy and settling time, for any given requirements.

Figure 48:
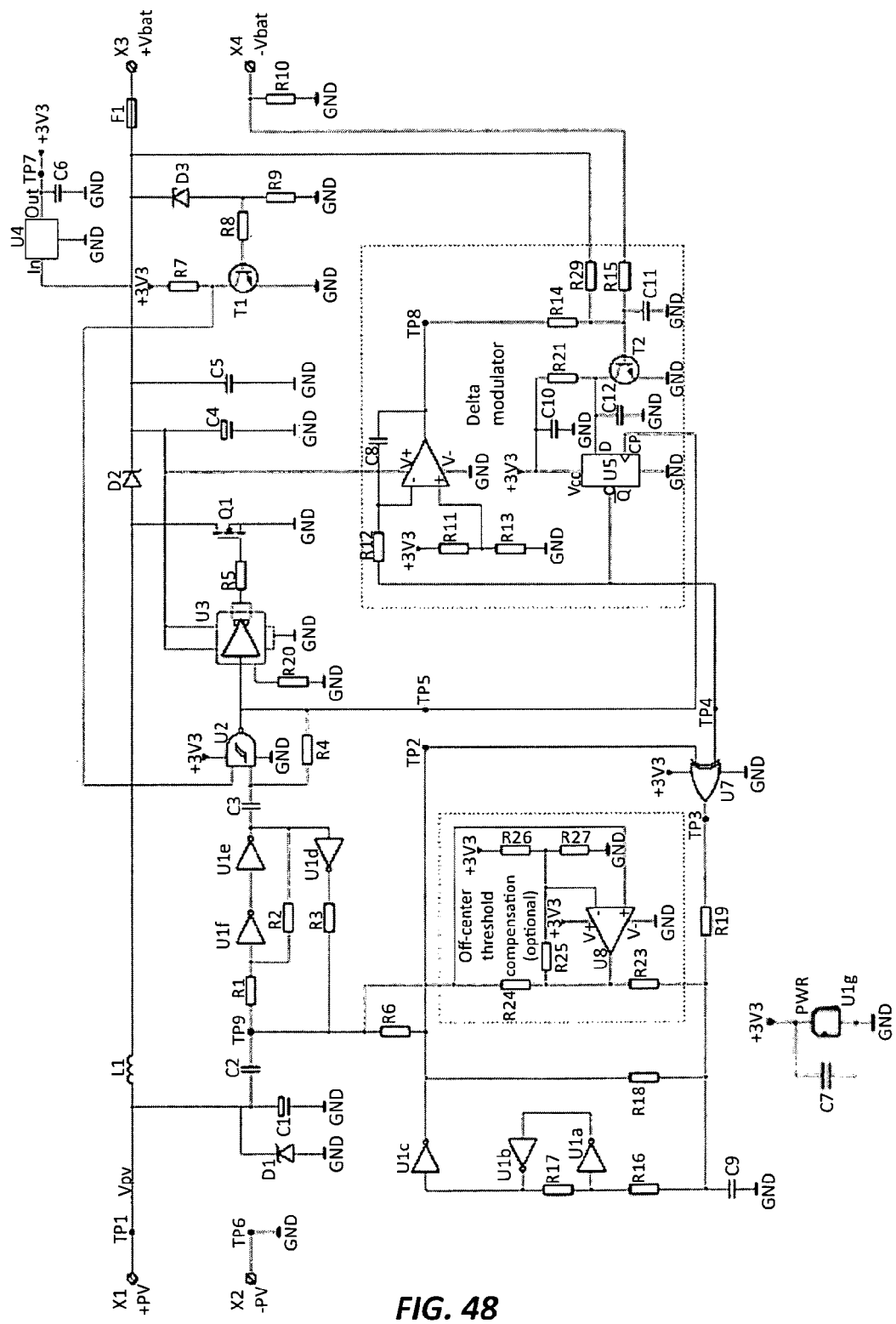
FIG. 48 shows a circuit diagram of one embodiment of the invention that employs a delta modulator.

Implementation type A is based on the diagram of FIG. 44. The circuit diagram can be found in FIG. 48. In this implementation the control loop manipulates the duty-cycle of the oscillator that causes the perturbation. Asymmetry in this duty-cycle results in a difference in the duration of the rising and falling part of the perturbance, thereby shifting the average point of operation.

The structure of the diagram can be recognized in the circuit diagram. Inverters U1e and U1f form the Schmitt-trigger for the hysteretically controlled input voltage boost converter. C2 is the integrating capacitor in the MPPT control loop. U1d injects a current into the integrating node (TP9) in order to compensate for the input current of the Schmitt-trigger. NAND Schmitt-trigger gate U2 guarantees proper recovery if the converter ends up in a latch-up situation. U3 is an off-the-shelf MOSFET driver IC. The actual boost stage is formed by L1, Q1 and D2. C1 is the input bulk capacitor whose ESR is one of the parameters that determine the switching frequency.

The small circuit around T1 and D3 is an overvoltage protection for the output. If the output voltage exceeds approximately 16.5V, the converter is killed via the second input of U2. This prevents damage to the circuit in case the battery is not connected, by preventing the output voltage from climbing unlimited. As such this is not a fundamental part of the MPPT circuit.

The delta modulator is composed by flip-flop U5 and the integrator built around op-amp U6. Its input can be either the current sensing signal across R10 or the output voltage depending on whether current or voltage maximizing is desired. A combination of both is also possible. The output bit-stream from the delta modulator is fed to exclusive-OR gate U7. The other XOR input is connected to the perturbing signal generated by the relaxation oscillator U1a, U1b and U1c. The output of the XOR gate manipulates the duty cycle of this oscillator by means of an average current through R19.

The principle of operation as described earlier relies on the threshold levels of the Schmitt-triggers being centered between the supply rails. If this is not true the control loop will adjust to a point of operation slightly below or above the MPP in order to compensate for this offset. This results in a static tracking error. The Schmitt-triggers in the prototype circuit have been composed by means of logic inverter gates, which typically have a threshold level of half their supply voltage. Deviations of several hundreds of mVolts are possible however. The circuit around op-amp U8 is used to compensate for this effect. It generates a voltage based on the difference between the half supply voltage and the average threshold level measured at testpoint TP9. This voltage is then used to counteract the imbalance due to the off-centre threshold levels.

Figure 49:
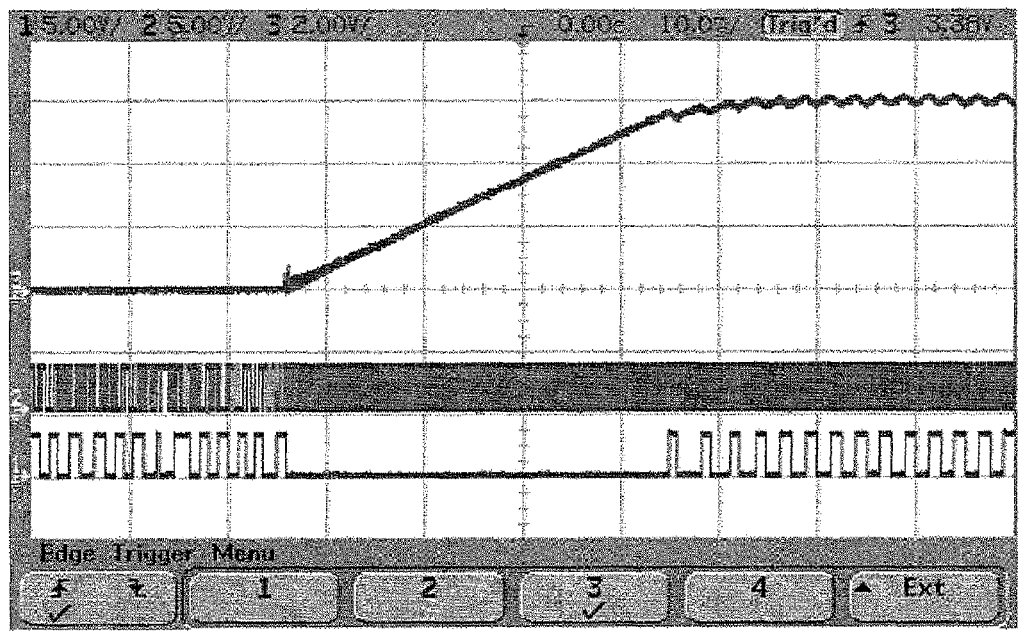
FIG. 49 shows an oscilloscope plot of the type A implementation prototype, directly after startup, according to one embodiment of the invention.

FIG. 49 shows an oscilloscope plot of the type A implementation prototype, directly after startup. The lower trace is the signal from the perturbing oscillator measured at the output of inverter U1c (TP2). The trace in the centre is the bit-stream at the output of XOR gate U7 (TP3). The PV voltage is monitored at TP1 in the top trace of the plot.

Figure 50:
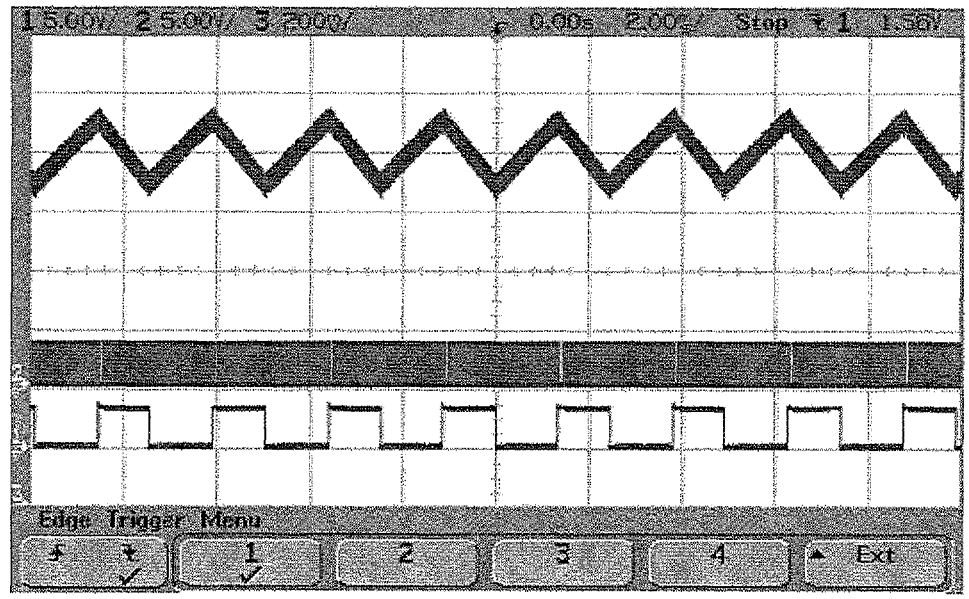
FIG. 50-51 show magnifications of the same signals after steady state has been reached, according to one embodiments of the invention.
Figure 51:
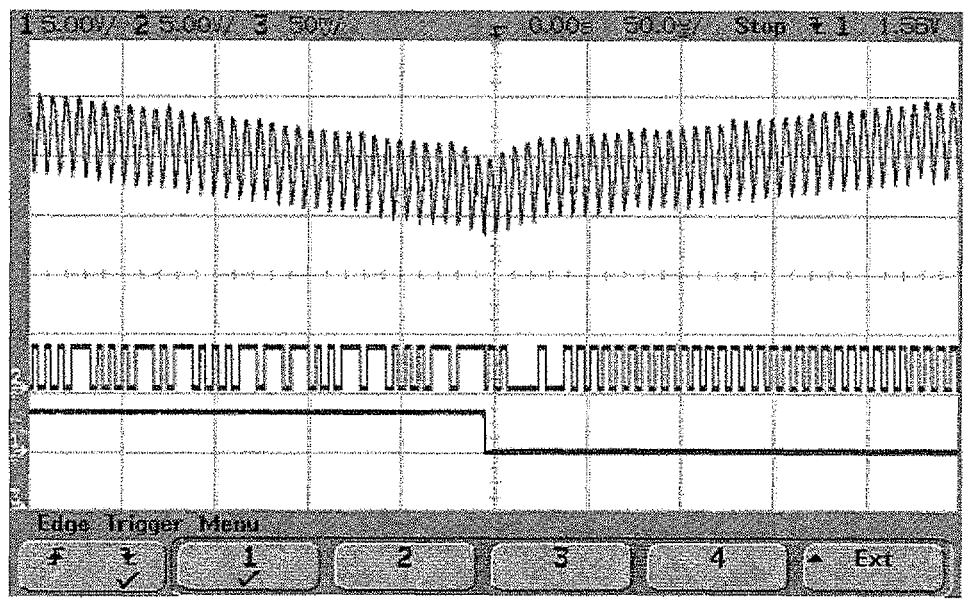

It can be seen that the circuit converges to the MPP in approximately 45 ms. The plots in FIG. 50 and FIG. 51 show magnifications of the same signals after steady state has been reached. In the latter plot the individual bits in the XOR bit-stream can be distinguished.

These measurements were carried out with a simulated PV panel, similar to the model in FIG. 20. This allows for repeatable measurements independent from external conditions. The prototype has also been tested with an actual PV panel with a nominal output power of 12 W. A 12V motorcycle battery served as the load.

Figure 52:
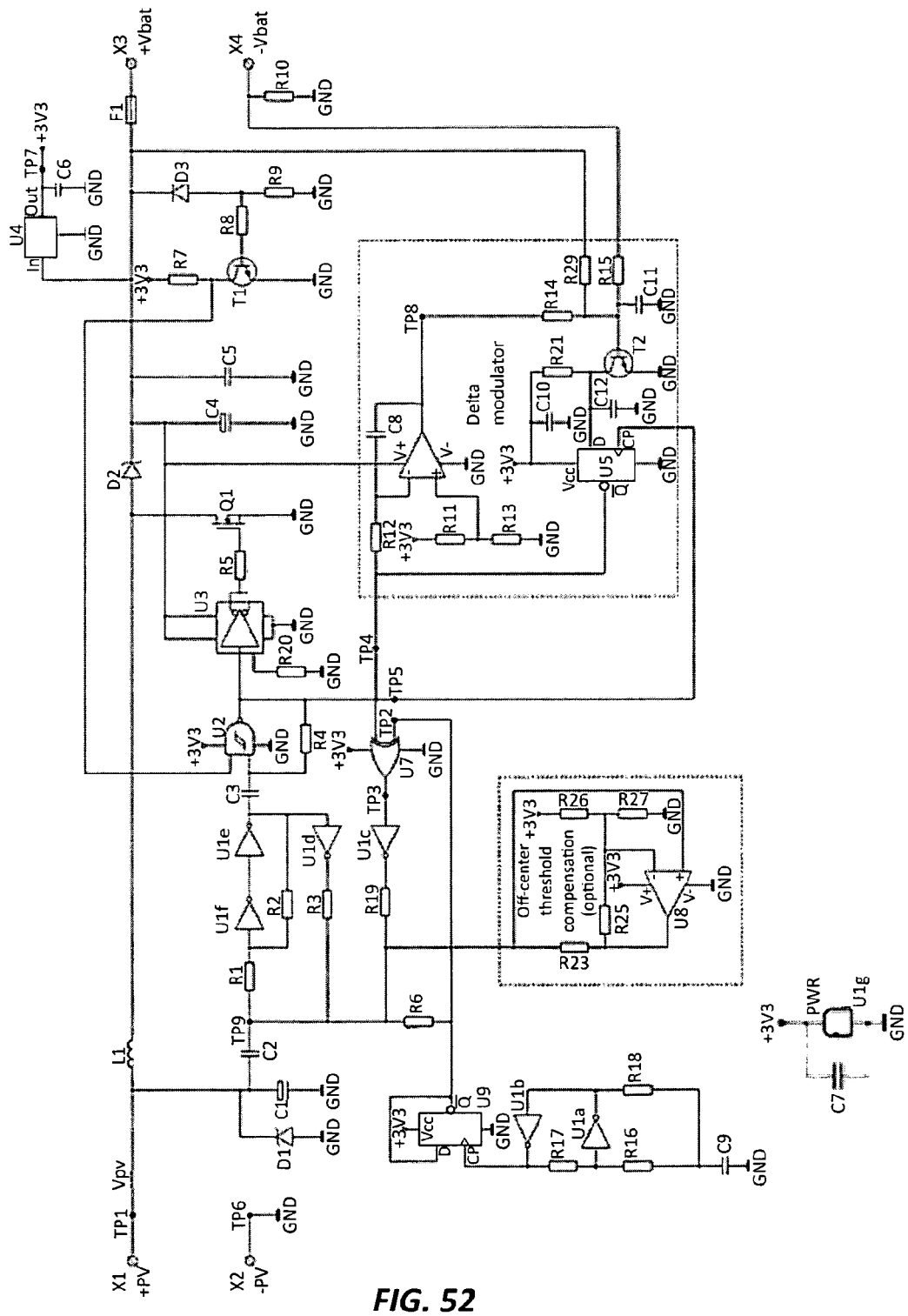
FIG. 52 shows a circuit diagram of another embodiment of the invention that employs a delta modulator.

In the type B implementation (see FIG. 52) the duty-cycle of the perturbing oscillator is fixed at 50%. Here the slope of the perturbation is manipulated by the control loop. It does so by injecting a current directly into the integrating capacitor (C2). Inequality between the rising and falling slope causes the average point of operation to shift and can thus be used as a handle to drive it towards the MPP.

The circuit is identical to the type A version for the most part. The difference is in the location where the XOR gate injects its current. In the type B version this is directly into the integrating capacitor C2. This method of shifting the point of operation puts a constraint on the minimum value of R19. The value of this resistor must always be larger than R6 in order to keep the perturbation oscillator in charge of the direction in which the PV voltage is moving, at all times. This restriction may limit the maximum speed of convergence of this particular embodiment.

Since the perturbing oscillator must be fixed at 50% duty-cycle here, a flip-flop is used in a divide-by-two configuration (U9). This makes the off-centre threshold compensation redundant for the relaxation oscillator U1a and U1b. It is only needed for the Schmitt-trigger in the primary oscillator of the converter.

Examples of a converter topology for use in a maximum power point tracker for photovoltaic arrays have been described herein and presented. The topology features very low complexity and inherent stability. The MPPT algorithm or circuitry has direct and linear control over the voltage at the PV array terminals with minimal time lag and independent of the converter's mode of operation. The magnitude of the PV ripple voltage is constant which makes the topology well suited for ripple correlation control.

The basic topology can be modified to incorporate an integrating function that can be used in the control loop of the MPPT. This modification doesn't add complexity but makes the physical implementation of the converter even less expensive.

In a further embodiment of the invention, a method for generating a signal proportional to the ripple of the PV output power was presented. Such a signal is needed in maximum power point trackers that utilize ripple correlation control. This method eliminates the need for an analog multiplier and generates the ripple signal without an undesired DC bias. Its implementation can be realized with inexpensive operational transconductance amplifiers. In one embodiment, the invention is used in an integrated circuit, which opens the possibility for further simplification.

Lastly, a novel method has been presented for a MPPT that finds the power optimum by maximizing the output current or voltage. These embodiments of the invention feature significantly lower complexity than other topologies, enabled by the use of the earlier described converter topology.

All presented embodiments can aid in reducing the complexity and cost of MPPT systems and improving their robustness. Reduced cost can be a driver towards using MPPTs on a more local scale, which can increase overall efficiency. Reduced cost can also make new applications viable. This creates the potential for a high volume market.

What is claimed:

1. A maximum power point tracking (MPPT) device, comprising:
   a. a power generator variable output value, wherein said power generator variable output value comprises a variable output current or a variable output voltage;
   b. a delta modulator, wherein said delta modulator is capable of determining a time-derivative of a power generator output power;
   c. a perturbing oscillator, wherein said perturbing oscillator comprises a binary level, wherein said binary level is dictating or determining a sign of a time-derivative of said variable output value;
   d. a XOR gate, wherein said XOR gate is capable of outputting a product of said sign of said time-derivative of said variable output value and said determined time-derivative of said power generator output power, wherein said output of said XOR gate is capable of determining a direction to move said power generator variable output value; and
   e. an integrator, wherein said output of said XOR gate input to said integrator, wherein an output of said integrator comprises a magnitude of said power generator variable output value, wherein said variable output value is a constant value when said power generator output power is a maximum power output level.

2. The MPPT device of claim 1 further comprise a DC/DC converter, wherein said DC/DC converter is disposed to vary said power generator variable output value using a variable transfer ratio of said DC/DC converter.

3. The MPPT device of claim 2, wherein said DC/DC converter comprises an hysteretically controlled input voltage, wherein a switching frequency of said DC/DC converter is determined according to a self-oscillating system, wherein said self-oscillating system comprises an input bulk capacitor ESR and a boost inductor.

4. The MPPT device of claim 3, wherein operation of said integrator and operation of said DC/DC converter are combined.

5. The MPPT device of claim 1 further comprises a variable sensing resistor to measure said power generator variable output value.

6. The MPPT device of claim 1, wherein said output power comprises a product of said variable output current and said variable output voltage.

7. The MPPT device of claim 1 further comprises a DC/DC converter, wherein said DC/DC converter comprises a hysteretically controlled input voltage, an input bulk capacitor ESR and a boost inductor to form a self-oscillating system, wherein a switching frequency of said DC/DC converter is determined by said self-oscillating system.

8. The MPPT device of claim 7, wherein a functionality of said integrator and said a functionality of said DC/DC converter are combined.

9. The MPPT device of claim 7, wherein said hysteretically controlled input voltage comprises a ripple correlation control.

10. The MPPT device of claim 1, wherein said MPPT device is configured in series or in parallel with at least one other said MPPT device when a hysteretic control is disposed with a voltage input.

* * * * *